United States Patent
Yen et al.

(10) Patent No.: US 11,580,207 B2
(45) Date of Patent: Feb. 14, 2023

(54) THIRD-PARTY VEHICLE OPERATOR SIGN-IN

(71) Applicant: Uber Technologies, Inc., San Francisco, CA (US)

(72) Inventors: Mark Yen, San Francisco, CA (US); Joseph Maliksi, Pittsburgh, PA (US); Roman Kuzmenko, San Jose, CA (US); Andrii Iasynetskyi, Millbrae, CA (US); Matthew Charles Ellis Wood, Dublin, CA (US)

(73) Assignee: Uber Technologies, Inc., San Francisco, CA (US)

( * ) Notice: Subject to any disclaimer, the term of this patent is extended or adjusted under 35 U.S.C. 154(b) by 619 days.

(21) Appl. No.: 16/660,379

(22) Filed: Oct. 22, 2019

(65) Prior Publication Data

US 2020/0356651 A1 Nov. 12, 2020

Related U.S. Application Data

(60) Provisional application No. 62/844,051, filed on May 6, 2019.

(51) Int. Cl.
*H04W 12/06* (2021.01)
*G06F 21/35* (2013.01)
(Continued)

(52) U.S. Cl.
CPC .............. *G06F 21/35* (2013.01); *B60W 40/08* (2013.01); *G05D 1/0022* (2013.01);
(Continued)

(58) Field of Classification Search
CPC ........ G06F 21/35; G06F 21/42; B60W 40/08; B60W 50/00; B60W 2040/0809;
(Continued)

(56) References Cited

U.S. PATENT DOCUMENTS 10,501,055 B1 * 12/2019 Yi ..................... B60R 25/257
11,042,816 B2 * 6/2021 Zaid .................. H04W 4/027
(Continued)

FOREIGN PATENT DOCUMENTS

WO WO-2019191417 A1 * 10/2019

OTHER PUBLICATIONS

Gig Car Share, YouTube clip entitled "Finding & Reserving a Gig," uploaded on Aug. 7, 2017 by user "GIG Car Share." Retrieved from Internet on Apr. 29, 2022: <https://www.youtube.com/watch?v=GnaIPlzGeSA>) (Year: 2017).*
Turo "Handling Host Cancellations," published Aug. 17, 2017, https://turo.com/blog/news/new-cancellation-policy-for-turo-hosts, Retrieved from Internet on May 2, 2022 (Year: 2017).*

*Primary Examiner* — Donald J Wallace
*Assistant Examiner* — Daniel M. Robert
(74) *Attorney, Agent, or Firm* — Schwegman Lundberg & Woessner, P.A.

(57) ABSTRACT

Systems and methods to authenticate a vehicle operator for an autonomous vehicle on a vehicle service platform are provided. In one example embodiment, a computer-implemented method includes obtaining authentication request data indicative of an authentication request, the authentication request data including at least an operator identifier associated with the vehicle operator and a vehicle identifier associated with the autonomous vehicle. The method includes providing a service code associated with the authentication request to the autonomous vehicle. The method includes obtaining from a user device in response to providing the service code to the autonomous vehicle, operator data associated with the authentication request, the operator data including the service code. The method includes determining an authentication result associated with the authentication request based at least in part on the service code and the operator data. The method includes providing the authentication result to the user device.

20 Claims, 15 Drawing Sheets

(51) Int. Cl.
*G05D 1/00* (2006.01)
*B60W 40/08* (2012.01)
*G01C 21/34* (2006.01)
*B60W 50/00* (2006.01)

(52) U.S. Cl.
CPC ........... *G05D 1/0088* (2013.01); *B60W 50/00* (2013.01); *B60W 2040/0809* (2013.01); *B60W 2050/0065* (2013.01); *G01C 21/3438* (2013.01); *G05D 2201/0213* (2013.01)

(58) Field of Classification Search
CPC ........ B60W 2050/0065; G05D 1/0022; G05D 1/0088; G05D 2201/0213; G01C 21/3438; H04L 63/0838; H04L 2463/121; H04W 4/40; H04W 12/71; H04W 12/77; H04W 12/06

See application file for complete search history.

(56) References Cited

U.S. PATENT DOCUMENTS

| 2014/0129113 | A1* | 5/2014 | Van Wiemeersch ........................ G06Q 30/0645 701/1 |
| 2016/0364823 | A1* | 12/2016 | Cao .................... G06Q 10/1095 |
| 2017/0134382 | A1* | 5/2017 | Darnell ................. H04L 9/3297 |
| 2018/0146374 | A1* | 5/2018 | Golan .................... G07C 9/257 |
| 2019/0001925 | A1* | 1/2019 | Arakawa ............... B60W 40/08 |
| 2019/0109855 | A1* | 4/2019 | Takeuchi ............... H04L 9/3271 |
| 2019/0122449 | A1* | 4/2019 | Rosas-Maxemin .... G07B 15/02 |
| 2019/0193681 | A1* | 6/2019 | Ito ......................... B60R 25/246 |
| 2020/0349666 | A1* | 11/2020 | Hodge ................. G08G 1/0133 |

\* cited by examiner

THIRD-PARTY VEHICLE OPERATOR SIGN-IN

RELATED APPLICATION

This application claims priority to and the benefit of U.S. Provisional Patent Application No. 62/844,051, titled "Third-Party Vehicle Operator Sign-In," and filed on May 6, 2019. U.S. Provisional Patent Application No. 62/844,051 is hereby incorporated by reference herein in its entirety.

FIELD

The present disclosure relates generally to authenticating a vehicle operator for a vehicle such as, for example, an autonomous vehicle to ensure that only authorized vehicle operators are able to provide secondary control of the autonomous vehicle.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion plan through such surrounding environment. The autonomous vehicle can be used by a service entity to provide vehicle services (e.g., ridesharing, food delivery, etc.) on a vehicle service platform. The vehicle service platform may be operated, maintained, managed, etc. by a service entity that coordinates the provision of the vehicle services.

SUMMARY

Aspects and advantages of the present disclosure will be set forth in part in the following description, or may be learned from the description, or may be learned through practice of the embodiments.

One example aspect of the present disclosure is directed to a computer-implemented method to authenticate a vehicle operator for an autonomous vehicle on a vehicle service platform. The method includes obtaining, by a computing system including one or more computing devices, authentication request data indicative of an authentication request, the authentication request data including at least an operator identifier associated with the vehicle operator and a vehicle identifier associated with the autonomous vehicle. The method includes providing, by the computing system, a service code associated with the authentication request to the autonomous vehicle associated with the vehicle identifier. The method includes obtaining, by the computing system from a user device associated with the operator identifier in response to providing the service code to the autonomous vehicle associated with the vehicle identifier, operator data associated with the authentication request, the operator data including the service code. The method includes determining, by the computing system, an authentication result associated with the authentication request based at least in part on the service code and the operator data. The method includes providing, by the computing system, the authentication result to the user device associated with the operator identifier.

Another example aspect of the present disclosure is directed to a computer-implemented method to authenticate a vehicle operator for an autonomous vehicle on a vehicle service platform. The method includes obtaining, by a computing system including one or more computing devices, authentication request data indicative of an authentication request, the authentication request data including at least an operator identifier associated with the vehicle operator, a vehicle identifier associated with the autonomous vehicle, a first operator code associated with the authentication request, and a first vehicle code associated with the authentication request. The method includes providing, by the computing system, a service code associated with the authentication request to the autonomous vehicle associated with the vehicle identifier. The method includes obtaining, by the computing system in response to providing the service code to the autonomous vehicle associated with the vehicle identifier, operator data associated with the authentication request from a user device associated with the operator identifier, the operator data including a second operator code. The method includes determining, by the computing system, an authentication result associated with the authentication request based at least in part on the second operator code and the first vehicle code. The method includes providing, by the computing system, the authentication result to the user device associated with the operator identifier.

Another example aspect of the present disclosure is directed to a computer-implemented method to authenticate a vehicle operator for an autonomous vehicle operated by a third-party entity on a vehicle service platform to provide a vehicle service. The method includes obtaining, by a computing system including one or more computing devices, authentication request data indicative of an authentication request, the authentication request data including at least an operator identifier associated with the vehicle operator and a vehicle identifier associated with the autonomous vehicle. The method includes determining, by the computing system, a validity of the authentication request based at least in part on a security tier associated with the vehicle identifier. The method includes determining, by the computing system, an authentication result associated with the authentication request based at least in part on the validity of the authentication request, the authentication result indicative of whether the vehicle operator is authorized to control the autonomous vehicle to provide the vehicle service. The method includes providing, by the computing system, the authentication result to a user device associated with the operator identifier.

Another example aspect of the present disclosure is directed to a computer-implemented method to authenticate an autonomous vehicle operator. The method includes obtaining, by a computing system including one or more computing devices, a service code associated with an authentication request from a service entity computing system. The service code is generated by the service entity computing system based at least in part on authentication request data including at least an operator identifier associated with the vehicle operator and a vehicle identifier associated with the autonomous vehicle, the authentication request data being provided to the service entity computing system from a user device. The method includes determining, by the computing system, an autonomous vehicle based at least in part on the vehicle identifier. The method includes providing, by the computing system, the service code to the autonomous vehicle. The autonomous vehicle is configured to output the service code such that the service code can be entered into the user device, and the user device is configured to provide the service code to the service entity computing system to authenticate the vehicle operator for the autonomous vehicle.

Another example aspect of the present disclosure is directed to a computer-implemented method to authenticate a vehicle operator for an autonomous vehicle on a vehicle service platform. The method includes obtaining, by a computing system including one or more computing devices, a vehicle identifier associated with the autonomous vehicle and a first vehicle code associated with the autonomous vehicle. The method includes providing, by the computing system, the vehicle identifier and the first vehicle code to a service entity computing system. A communication session associated with the service entity computing system is opened based at least in part on the vehicle identifier rand the first vehicle code. The method includes obtaining, by the computing system from the service entity computing system, a service code, the service code based at least in part on the vehicle identifier, the first vehicle code, and an authentication request that is obtained by the service entity computing system during the open communication session. The method includes providing, by the computing system, the service code to the autonomous vehicle in response to obtaining the service code from the service entity computing system. The method includes obtaining, by the computing system from the service entity computing system, an intermediate authentication result based at least in part on the service code. The method includes providing, by the computing system, the intermediate authentication result to the autonomous vehicle in response to obtaining the intermediate authentication result from the service entity computing system. The method includes obtaining, by the computing system from the autonomous vehicle, an authentication result for the vehicle operator based at least in part on the intermediate authentication result and the first vehicle code. The method includes providing, by the computing system, the authentication result to the service entity computing system.

Yet another example aspect of the present disclosure is directed to a computer-implemented method to authenticate a vehicle operator for an autonomous vehicle operated by a third-party entity on a vehicle service platform to provide a vehicle service. The method includes obtaining, by a computing system including one or more computing devices, authentication request data indicative of an authentication request, the authentication request data including at least an operator identifier associated with the vehicle operator and a vehicle identifier associated with the autonomous vehicle. The method includes providing, by the computing system, the authentication request data to a service entity computing system. The method includes obtaining, by the computing system from the service entity computing system, an authentication result associated with the authentication request based at least in part on a validity of the authentication request determined by the service entity computing system based at least in part on the authentication request data. The method includes providing, by the computing system, the authentication result to a user device associated with the operator identifier.

Other example aspects of the present disclosure are directed to systems, methods, vehicles, apparatuses, tangible, non-transitory computer-readable media, and memory devices for detecting a velocity of an object.

These and other features, aspects, and advantages of various embodiments will become better understood with reference to the following description and appended claims.

The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth below, which make reference to the appended figures, in which.

Figure 1A:
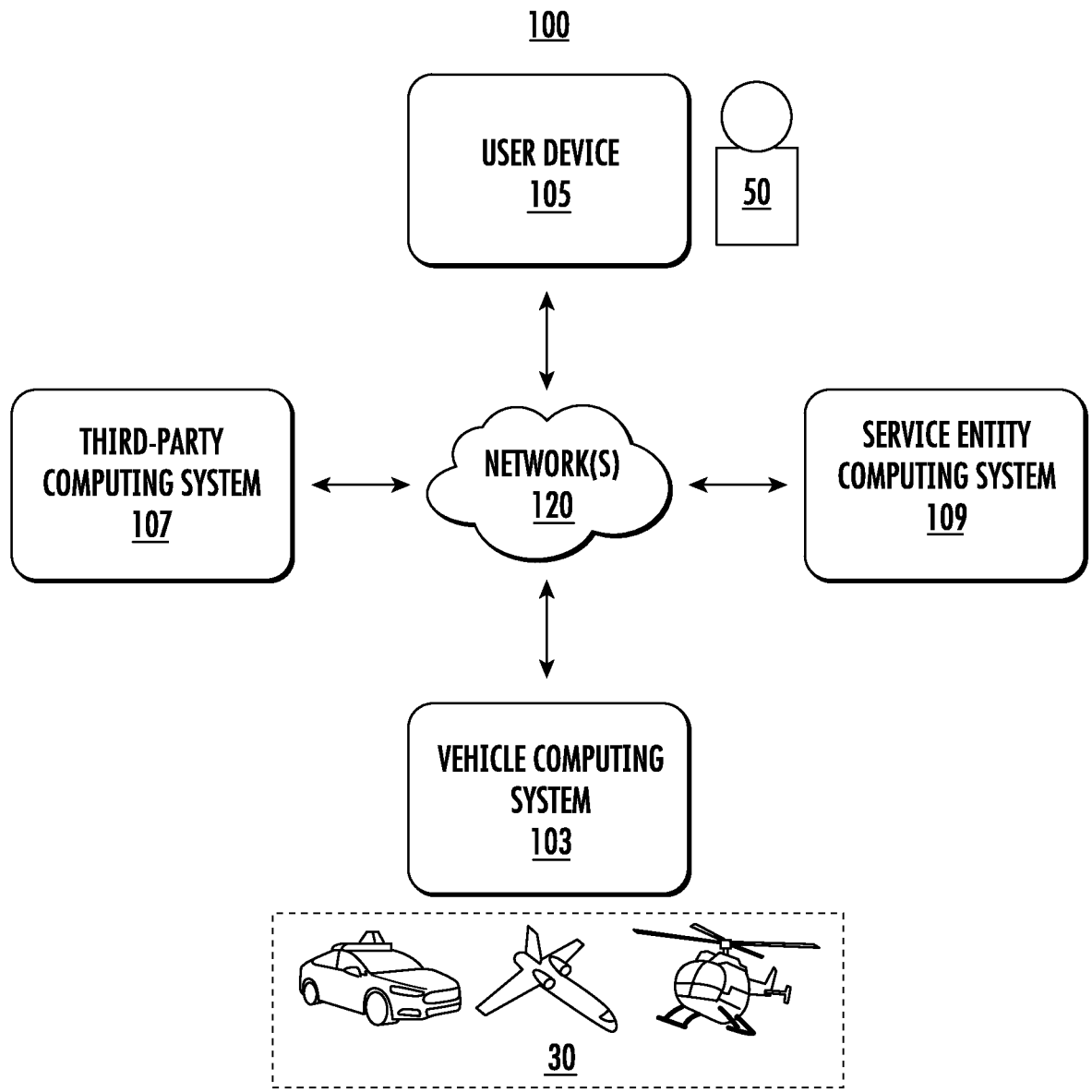
FIG. 1A depicts an example computing system according to example embodiments of the present disclosure.

Reference numerals that are repeated across plural figures are intended to identify the same components or features in various implementations.

DETAILED DESCRIPTION

Example aspects of the present disclosure are generally directed to authenticating a vehicle operator for a vehicle such as, for example, an autonomous vehicle. The autonomous vehicle may provide vehicle services (e.g., ridesharing, food delivery, etc.) on a vehicle service platform. The vehicle service platform may be operated, maintained, managed, etc. by a service entity that coordinates the provision of the vehicle services. The service entity may operate and/or manage a first-party fleet of autonomous vehicles to provide vehicle services on the vehicle service platform. Additionally, or alternatively, one or more third-party entities may operate and/or manage a respective third-party fleet of autonomous vehicles to provide vehicle services on the vehicle service platform. The service entity and/or a third-party entity can identify and provide a vehicle operator from a pool of available vehicle operators for the fleet associated with the entity. The vehicle operator can, for example, provide secondary control of an autonomous vehicle providing a vehicle service when the vehicle traverses, for example, an unmapped area, an area with poor wireless communication reception, an area in which the vehicle will need to perform complex navigational maneuvers, etc. The service entity or the third-party entity needs to authenticate a selected vehicle operator (e.g., when the selected vehicle operator is near the autonomous vehicle) so that the vehicle operator can be authorized to provide secondary control of the autonomous vehicle providing the vehicle service. The vehicle service platform can be configured to authenticate a vehicle operator selected by the service entity or the third-party entity for the respective entity. Additionally, or alternatively, the vehicle service platform can be configured to receive and accept an authentication result from the third-party entity for a vehicle operator selected by the third-party entity to provide secondary control of an autonomous vehicle in the third-party fleet. Systems and methods consistent with the present disclosure can enable the service entity or the third-party entity to authenticate a vehicle operator via the vehicle service platform so that the vehicle operator can be authorized to provide secondary control of an autonomous vehicle in the fleet associated with the entity. In this way, the service entity and the third-party entity can ensure that only authorized vehicle operators are able to provide secondary control of an autonomous vehicle in the first-party fleet or the third-party fleet (available to the platform), and further confirm that the authorized vehicle operator is associated with a particular vehicle in the fleet associated with the entity.

More particularly, a service entity (e.g., service provider, owner, manager) or a third-party entity can use one or more vehicles (e.g., ground-based vehicles such as automobiles, trucks, etc.; flight vehicles; and/or the like) to provide a vehicle service such as a transportation service (e.g., rideshare service), a courier service, a delivery service, etc. For example, the service entity (e.g., via a service entity computing system) or the third-party entity (e.g., via a third-party computing system) can receive requests for vehicle services (e.g., from a user) and generate service assignments (e.g., indicative of a vehicle service type, starting location, ending location, and/or other parameters) for the vehicle(s) to perform. In some implementations, the service entity can operate, maintain, and/or manage a vehicle service platform (e.g., via the service entity computing system) that coordinates the provision of the vehicle services.

An autonomous vehicle (e.g., ground-based vehicle, bikes, scooters, and other light electric vehicles, etc.) can include various systems and devices configured to control the operation of the vehicle. For example, an autonomous vehicle can include an onboard vehicle computing system (e.g., located on or within the autonomous vehicle) that is configured to operate the autonomous vehicle. Generally, the vehicle computing system can obtain sensor data from a sensor system onboard the vehicle, attempt to comprehend the vehicle's surrounding environment by performing various processing techniques on the sensor data, and generate an appropriate motion plan through the vehicle's surrounding environment. The vehicle computing system can also obtain sensor data from the sensor system indicative of one or more actions of a vehicle operator (e.g., entering the vehicle, sitting in the vehicle, fastening a seatbelt, etc.). Additionally, the vehicle computing system can communicate with a remote computing system such as, for example, the service entity computing system and/or the third-party computing system via a communication system onboard the vehicle, output information via one or more output devices (e.g., display device(s), speaker device(s), etc.) onboard the vehicle, and access a private key associated with the autonomous vehicle from a trusted platform module onboard the autonomous vehicle, in order to authenticate a vehicle operator for the autonomous vehicle on the vehicle service platform, as further described herein.

An autonomous vehicle that provides a vehicle service can be associated with a first-party fleet or a third-party fleet. For example, the service entity may own, lease, etc. a fleet of autonomous vehicles (e.g., first party fleet) that can be managed by the service entity (e.g., via system clients) to provide one or more vehicle services. Additionally, or alternatively, the third-party entity may own, lease, etc. a fleet of autonomous vehicles (e.g., third-party fleet) that can be managed by the third-party entity. The third-party entity can include, for example, an individual, an original equipment manufacturer (OEM), or another entity. Even though an autonomous vehicle in the third-party fleet may not be included in the first-party fleet, the platforms of the present disclosure can allow such a third-party autonomous vehicle to still be utilized to provide the vehicles services offered/provisioned by the service entity, access the service entity system clients, etc. The service entity and the third-party entity can each select an autonomous vehicle from the fleet associated with the entity, and instruct the selected autonomous vehicle to provide a vehicle service.

A vehicle operator (e.g., human operator) can be associated with an autonomous vehicle that provides a vehicle service. The vehicle operator can provide secondary control of the autonomous vehicle for one or more segments of a vehicle service being provided by the autonomous vehicle, such as when navigating an unmapped area, an area with poor wireless signal reception, an area in which the autonomous vehicle will need to perform complex navigational maneuvers, etc. The vehicle operator can take control of the autonomous vehicle when, for example, the autonomous vehicle is in a manual or a semi-autonomous mode. In some implementations, the vehicle operator can be selected by the service entity or the third-party entity from a pool of available vehicle operators who are available to provide secondary control of an autonomous vehicle in the fleet associated with the entity. In some implementations, the vehicle operator can be associated with a user device (e.g., laptop, smartphone, or other computing device). The user device can include various systems and devices configured to enable the vehicle operator to submit an authentication request to authorize the vehicle operator to provide secondary control of the autonomous vehicle selected to provide the vehicle service. For example, the user device can be configured to communicate with the service entity computing system to submit an authentication request. Additionally, the user device can be configured to obtain information that is output via the selected autonomous vehicle to complete the authentication request.

A service entity computing system can include various systems and devices configured to facilitate an authentication request to authenticate a vehicle operator from a plurality of vehicle operators (e.g., pool of vehicle operators) for a selected vehicle (e.g., autonomous vehicle) from a plurality of vehicles (e.g., fleet of vehicles). The service entity computing system can be configured to receive the authentication request and determine an authentication result for the authentication request. If the authentication result is positive, then the service entity computing system can authorize the vehicle operator to provide secondary control of the selected vehicle. If the authentication result is negative, then the service entity computing system can deny the authentication request. In some implementations, the service entity computing system can include a vehicle integration platform and a vehicle operator backend service. The service entity computing system can be configured to communicate with a vehicle operating on the vehicle service platform that is selected to provide a vehicle service, via the vehicle integration platform. Additionally, the service entity computing system can be configured to communicate with a user device and/or a third-party computing system via a web backend that interfaces with the vehicle operator backend service. As an example, the user device can include an application that enables the user device to communicate with the service entity computing system via a first communication pathway through the web backend in order to submit the authentication request. As another example, the selected vehicle can communicate with the service entity computing system via a second communication pathway through the vehicle integration platform in order to authorize a vehicle operator to provide secondary control of the vehicle. As another example, the third-party computing system can communicate with the service entity computing system via one or more third communication pathways connecting the third-party computing system with the vehicle integration platform and/or the vehicle operator backend service.

In some implementations, the service entity computing system can be configured to communicate with a user device associated with a vehicle operator to receive data indicative of the authentication request, and a vehicle selected from the first-party fleet (e.g., a vehicle computing system onboard the selected vehicle). The service entity computing system can communicate with the user device via the first communication pathway, and the selected vehicle via the second communication pathway.

In some implementations, the service entity computing system can be configured to communicate with the third-party computing system via the third communication pathway(s). The third-party computing system can include various systems and devices configured to communicate with the service entity computing system on behalf of a vehicle (e.g., autonomous vehicle) selected from the third-party fleet and/or a user device associated with a vehicle operator to receive data indicative of the authentication request. For example, the third-party computing system can receive data indicative of an authentication request from a user device and/or a vehicle computing system, and provide the authentication request to the service entity computing system via the third communication pathway(s). The third-party computing system can also receive data indicative of an authentication result from the service entity computing system via the third communication pathway(s) and provide the authentication result to the user device and/or the vehicle computing system. In some implementations, the third-party computing system can receive a service request from a customer, and in response, the third-party computing system can select a vehicle (e.g., autonomous vehicle) from the third-party fleet to service the request and select a vehicle operator to provide secondary control of the selected vehicle. The third-party computing system can provide an authentication request to the service entity computing system to authorize the vehicle operator to provide secondary control of the selected vehicle, and the third-party computing system can notify the selected vehicle and/or the selected vehicle operator by communicating the selection to the vehicle computing system onboard the selected vehicle and/or the user device associated with the selected vehicle operator.

In some implementations, the service entity computing system can be configured to communicate with the third-party computing system (that is configured to communicate with a vehicle selected from the third-party fleet) via the third communication pathway(s) and a user device associated with a vehicle operator via the first communication pathway, to receive data indicative of the authentication request and determine an authentication result for the authentication request. For example, the service entity computing system can receive data indicative of an authentication request from the user device or the third-party computing system to authorize the vehicle operator to provide secondary control of the selected vehicle.

According to aspects of the present disclosure, each of the plurality of vehicle operators can be associated with a unique operator identifier, and each of the plurality of vehicles can be associated with a unique vehicle identifier. Additionally, each vehicle identifier can be associated with a security tier (e.g., first security tier, second security tier, third security tier, etc.) representing a set of authentication procedures to authenticate a vehicle operator for a vehicle associated with the vehicle identifier. As an example, a third-party entity can operate and/or manage a plurality of third-party fleets including a first fleet of vehicles and a second fleet of vehicles. The third-party entity can set a security tier (e.g., first security tier, second security tier, or third security tier) for each vehicle in the first fleet, and set a different security tier (e.g., first security tier, second security tier, or third security tier) for each vehicle in the second fleet. As another example, a third-party entity can set a security tier (e.g., first security tier, second security tier, or third security tier) for a first vehicle in a first fleet operated and/or managed by the third-party entity, and set a different security tier (e.g., first security tier, second security tier, or third security tier) for a second vehicle in the first fleet.

In some implementations, a vehicle identifier can be associated with a security tier from a predetermined set of security tiers. The predetermined set of security tiers can include, for example, a first security tier, a second security tier, and a third security tier. The first security tier can represent a first set of authentication procedures to authenticate a vehicle operator for a vehicle associated with the vehicle identifier, the second security tier can represent a second set of authentication procedures to authenticate a vehicle operator for a vehicle associated with the vehicle identifier, and the third security tier can represent a third set of authentication procedures to authenticate a vehicle operator for a vehicle associated with the vehicle identifier.

First Security Tier

According to aspects of the present disclosure, the service entity computing system can authenticate a vehicle operator and authorize the vehicle operator to provide secondary control of a vehicle (e.g., autonomous vehicle) that is associated with a first security tier. The service entity computing system can authenticate the vehicle operator in response to receiving data indicative of an authentication request associated with the vehicle operator and the vehicle.

More particularly, a user device associated with the vehicle operator can be configured to generate first operator data indicative of the authentication request, and provide the first operator data to the service entity computing system. The user device can generate the first operator data in response to the vehicle operator initiating the authentication request. As an example, the user device can be configured to enable the vehicle operator to initiate the authentication request by accessing a URL or an application installed on the user device. As another example, the user device can be configured to enable the vehicle operator to initiate the authentication request when the user device is in proximity to the vehicle (e.g., within a threshold distance from the vehicle). The vehicle operator can travel to a location of the vehicle before initiating the authentication request. As another example, the user device can be configured to enable the vehicle operator to submit the authentication request in response to receiving a notification from a third-party computing system indicative of the vehicle operator being selected to provide secondary control of the vehicle. The user device can provide the first operator data to the service entity computing system via a first communication pathway through a web backend that interfaces with a vehicle operator backend service of the service entity computing system.

The first operator data can include an operator identifier associated with the vehicle operator. The user device can obtain the operator identifier based on the vehicle operator. As an example, the user device can be assigned to the vehicle operator and the operator identifier associated with the vehicle operator can be stored in the memory of the user device. As another example the user device can enable the vehicle operator to sign-in via an application on the user device with predetermined credentials (e.g., username and password). The user device can provide the username and password to a login computing system, and obtain the operator identifier associated with the vehicle operator from the login computing system based on the provided credentials.

The first operator data can also include a vehicle identifier associated with the vehicle. The user device can obtain the vehicle identifier based on an input by the vehicle operator. For example, the user device can display a list of vehicles and prompt the vehicle operator to select a vehicle from the list. The user device can determine the vehicle identifier associated with the vehicle selected by the vehicle operator.

The service entity computing system can be configured to obtain the first operator data from the user device, and determine a validity of the authentication request based on the first operator data. The service entity computing system can obtain the first operator data from the user device via the first communication pathway. The service entity computing system can determine the validity of the authentication request in response to receiving the first operator data from the user device. In this case, the service entity computing system can determine the validity of the authentication request based on a first security tier and the corresponding set of authentication procedures (e.g., the first set of authentication procedures). The first set of authentication procedures can include, for example, the service entity computing system determining whether the operator identifier and the vehicle identifier are valid and refer to active accounts, whether the vehicle account and the vehicle operator account belong to the same fleet, and whether the vehicle is configured to provide the vehicle service at a first security tier.

In some implementations, a third-party associated with the vehicle operator and the vehicle can generate and provide authentication request data to the service entity computing system (e.g., via a third-party computing system) instead of the user device providing the first operator data to the service entity computing system. The authentication request data can include an operator identifier associated with the vehicle operator and a vehicle identifier associated with the vehicle. The third-party computing system can provide the authentication request data to the service entity computing system via a third communication pathway.

In some implementations, the service entity computing system can be configured to obtain the authentication request data from the third-party computing system via the third communication pathway, and determine a validity of the authentication request based on the authentication request data. The service entity computing system can determine the validity of the authentication request in response to receiving the authentication request data from the third-party computing system. In this case, the service entity computing system can determine the validity of the authentication request based on the first security tier and the corresponding set of authentication procedures (e.g., the first set of authentication procedures). The first set of authentication procedures can include, for example, the service entity computing system determining whether the operator identifier and the vehicle identifier are valid and refer to active accounts, whether the vehicle account and the vehicle operator account belong to the same fleet, and whether the vehicle is configured to provide the vehicle service at a first security tier.

The service entity computing system can be configured to determine an authentication result for the authentication request based on the validity of the authentication request. If the service entity computing system determines that the authentication request is valid, then the service entity computing system can determine that the authentication result is positive. If the service entity computing system determines that the authentication request is not valid, then the service entity computing system can determine that the authentication result is negative. If the authentication result is positive, then the service entity computing system can authorize the vehicle operator to provide secondary control of the vehicle by generating an association between the operator identifier and the vehicle identifier. If the authentication result is negative, then the service entity computing system can determine that the authentication has failed, and the vehicle operator can be denied access to and/or operation control of the vehicle.

Second Security Tier

According to aspects of the present disclosure, the service entity computing system can authenticate a vehicle operator and authorize the vehicle operator to provide secondary control of a vehicle (e.g., autonomous vehicle) that is associated with a second security tier. The service entity computing system can authenticate the vehicle operator in response to receiving data indicative of an authentication request associated with the vehicle operator and the vehicle.

More particularly, the vehicle operator can sign-in via an application on the user device associated with the vehicle operator, and obtain an authentication token in response to successfully signing-in. The vehicle operator can provide the application with a username and password corresponding to a vehicle operator account, and the user device (e.g., the application) can provide the username and password to the service entity computing system via a first communication pathway through a web backend that interfaces with a vehicle operator backend service of the service entity computing system. The user device can obtain the authentication token from the service entity computing system via the first communication pathway in response to providing a valid username and password. The authentication token can indicate a confidence level that the vehicle operator is associated with the vehicle operator account corresponding to the provided username and password. The user device can use the authentication token in one or more subsequent communications with the service entity computing system.

The user device associated with the vehicle operator can be configured to generate first operator data indicative of the authentication request, and provide the first operator data to the service entity computing system. The user device can generate the first operator data in response to the vehicle operator initiating the authentication request. As an example, the user device can be configured to enable the vehicle operator to initiate the authentication request by accessing a URL or an application installed on the user device. As another example, the user device can be configured to enable the vehicle operator to initiate the authentication request when the user device is in proximity to the vehicle (e.g., within a threshold distance from the vehicle). The vehicle operator can travel to a location of the vehicle before initiating the authentication request. As another example, the user device can be configured to enable the vehicle operator to initiate the authentication request in response to receiving a notification from a third-party computing system indicative of the vehicle operator being selected to provide secondary control of the vehicle. The user device can provide the first operator data to the service entity computing system via the first communication pathway.

The first operator data can include an operator identifier associated with the vehicle operator. The user device can obtain the operator identifier based on the vehicle operator. As an example, the user device can be assigned to the vehicle operator and the operator identifier associated with the vehicle operator can be stored in the memory of the user device. As another example the user device can enable the vehicle operator to login with predetermined credentials (e.g., username and password). The user device can provide the login credentials to a login computing system, and obtain the operator identifier associated with the vehicle operator from the login computing system based on the login credentials.

The first operator data can also include a vehicle identifier associated with the vehicle. The user device can obtain the vehicle identifier based on an input by the vehicle operator. For example, the user device can display a list of vehicles and prompt the vehicle operator to select a vehicle from the list. The user device can determine the vehicle identifier associated with the vehicle selected by the vehicle operator.

The service entity computing system can be configured to obtain the first operator data from the user device, and determine a validity of the authentication request based on the first operator data. The service entity computing system can obtain the first operator data from the user device via the first communication pathway. The service entity computing system can determine the validity of the authentication request in response to receiving the first operator data from the user device. In this case, the service entity computing system can determine the validity of the authentication request based on a second security tier and the corresponding set of authentication procedures (e.g., the second set of authentication procedures). The second set of authentication procedures can include, for example, the service entity computing system determining whether the operator identifier and the vehicle identifier are valid and refer to active accounts, whether the vehicle account and the vehicle operator account belong to the same fleet, and/or whether the vehicle is configured to provide the vehicle service at the second security tier.

In some implementations, a third-party entity associated with the vehicle operator and the vehicle can generate and provide authentication request data to the service entity computing system (e.g., via a third-party computing system) instead of the user device providing the first operator data to the service entity computing system. The third-party associated with the vehicle operator can operate and/or manage a fleet of vehicles including the vehicle. The authentication request data can include an operator identifier associated with the vehicle operator and a vehicle identifier associated with the vehicle. The third-party computing system can provide the authentication request data to the service entity computing system via a third communication pathway.

In some implementations, the service entity computing system can be configured to obtain the authentication request data from the third-party computing system via the third communication pathway, and determine a validity of the authentication request based on the authentication request data. The service entity computing system can determine the validity of the authentication request in response to receiving the authentication request data from the third-party computing system. In this case, the service entity computing system can determine the validity of the authentication request based on the second security tier and the corresponding set of authentication procedures (e.g., the second set of authentication procedures). The second set of authentication procedures can include, for example, the service entity computing system determining whether the operator identifier and the vehicle identifier are valid and refer to active accounts, whether the vehicle account and the vehicle operator account belong to the same fleet, and/or whether the vehicle is configured to provide the vehicle service at the second security tier.

The service entity computing system can be configured to generate a service code associated with the authentication request based on the validity of the authentication request, and provide the service code to the vehicle via a second communication pathway through a vehicle integration platform of the service entity computing system. The service entity computing system can generate the service code in response to determining that the authentication request is valid. As an example, the service entity computing system can generate the service code based on a one-time password (e.g., a randomly generated code). The one-time password can include, for example, a random sequence of alphanumeric characters (e.g., numbers, characters, etc.), a random sequence of audio tones, etc. In some implementations, the service entity computing system can provide the service code to the third-party computing system, and the third-party computing system can provide the service code to the vehicle. The service entity computing system can provide the service code to the third-party computing system via the third communication pathway.

The vehicle can be configured to obtain the service code from the service entity computing system, and output the service code for the vehicle operator and/or user device. In some implementations, the vehicle can obtain the service code from the third-party computing system in response to the service entity computing system providing the service code to the third-party computing system. The vehicle can output the service code in response to receiving the service code. For example, if the service code includes a sequence of alphanumeric characters, then the vehicle can output the service code by displaying the sequence on a display device. In some implementations, the vehicle can generate a two-dimensional code (e.g., QR code) representing the service code, and output the service code by displaying the two-dimensional code on the display device. In some implementations, the vehicle can generate a bar code or other visual representation of the service code, and output the service code by displaying the bar code or other visual representation on the display device. In some implementations, the vehicle can generate an audio signal (e.g., radio, ultrasound, etc.) representing the service code, and output the service code by playing the audio signal on a speaker device. In this way, the vehicle can generate any suitable representation of the service code that can be output via an appropriate output device.

The user device can be configured to obtain the service code from the vehicle, generate second operator data associated with the authentication request based on the service code, and provide the second operator data to the service entity computing system. The user device can obtain the service code in response to the service code being output by the vehicle. Specifically, the user device can receive an input including the service code based on how the service code is output by the vehicle. As an example, if the vehicle displays a sequence of alphanumeric characters on a display, then the vehicle operator can manually input the sequence into the user device. Alternatively, the vehicle operator can position a camera attached to the user device relative to the display to capture an image of the sequence on the display. The user device can process image data from the camera (e.g., using optical character recognition) to determine the sequence and obtain the service code. As another example, if the vehicle displays a two-dimensional code (e.g., QR code), bar code, or other visual representation on the display, then the vehicle operator the user device can capture an image of the two-dimensional code, bar code, or other visual representation on the display. The user device can process image data from the camera (e.g., using various techniques) to decipher the two-dimensional code, bar code, or other visual representation and obtain the service code. As another example, if the vehicle plays an audio signal, then the user device can capture the audio signal via a microphone attached to the user device and process audio data from the microphone (e.g., using various techniques) to decipher the audio signal and obtain the service code. The second operator data can include the service code obtained by the user device and the vehicle identifier in the first operator data previously generated by the user device. The user device can provide the second operator data to the service entity computing system via the first communication pathway. In some implementations, the user device can provide the second operator data to the third-party computing system, and the third-party computing system can provide the second operator data to the service entity computing system via the third communication pathway.

The service entity computing system can be configured to obtain the second operator data from the user device. The service entity computing system can obtain the second operator data from the user device via the first communication pathway. In some implementations, the service entity computing system can be configured to obtain the second operator data from the third-party computing system via the third communication pathway. The service entity computing system can determine an authentication result for the authentication request based on the second operator data, in response to receiving the second operator data from the user device or the third-party computing system. The service entity computing system can determine whether the vehicle identifier in the second operator data matches the vehicle identifier in the first operator data associated with the authentication request that was previously received from the user device, and determine whether the service code in the second operator data matches the service code that was previously generated and provided by the service entity computing system to the vehicle. If the vehicle identifier and the service code in the second operator data match the previously received vehicle identifier and the previously generated service code, respectively, then the service entity computing system can determine that the authentication result is positive. If the vehicle identifier or the service code in the second operator data does not match, then the service entity computing system can determine that the authentication result is negative. If the authentication result is positive, then the service entity computing system can authorize the vehicle operator to control the vehicle by generating an association between the operator identifier and the vehicle identifier. If the authentication result is negative, then the service entity computing system can determine that the authentication has failed, and the vehicle operator can be denied access to and/or operation control of the vehicle.

Third Security Tier

According to aspects of the present disclosure, the service entity computing system can authenticate a vehicle operator for a vehicle (e.g., autonomous vehicle) that is associated with a third security tier. The service entity computing system can authenticate the vehicle operator for the vehicle in response to receiving data indicative of an authentication request associated with the vehicle operator and the vehicle.

More particularly, the vehicle can be configured to generate vehicle data associated with the authentication request, and provide the vehicle data to the service entity computing system. The vehicle can generate the vehicle data in response to, for example, receiving a notification from a third-party computing system indicative of the vehicle being selected to provide a vehicle service and/or detecting one or more actions of the vehicle operator indicative of the authentication request. As an example, the action(s) can include the vehicle operator entering the vehicle, sitting in a driver's seat of the vehicle, and/or fastening the driver's seatbelt of the vehicle. The vehicle can detect an entry by the vehicle operator based on a door sensor, a seating by the vehicle operator based on a seat sensor, and a seatbelt fastening by the vehicle operator based on a seatbelt sensor. Additionally, or alternatively, the vehicle can detect the entry, seating, and seatbelt fastening by performing object detection and tracking analysis on image data from an interior camera. As another example, the action(s) can include the vehicle operator activating vehicle/operator interface(s) (e.g., a set of paddle shifters) in a predetermined order. The vehicle can detect the activation of the vehicle/operator interface(s) (e.g., paddle shifters) based on one or more associated sensors. The vehicle can provide the vehicle data to the third-party computing system, and the third-party computing system can provide the vehicle data to the service entity computing system via a communication pathway (e.g., third communication pathway) through a vehicle integration platform of the service entity computing system. The third-party computing system can be associated with a third-party entity that operates and/or manages a fleet of vehicles that includes the vehicle. The third-party computing system can open a communication session associated with the authentication request with the service entity computing system. In some implementations, the vehicle can be associated with a first-party fleet and can provide the vehicle data to the service entity computing system via a communication pathway (e.g., second communication pathway) through the vehicle integration platform of the service entity computing system.

The vehicle data can include a vehicle identifier associated with the vehicle. The vehicle can obtain the vehicle identifier from an onboard memory device that stores the vehicle identifier. The vehicle data can also include a vehicle timestamp associated with the authentication request. The vehicle can generate the vehicle timestamp in response to receiving the notification from the third-party computing system or detecting the action(s) of the vehicle operator to indicate a time when the notification was received or the action(s) were detected. The vehicle data can also include a first vehicle code associated with the authentication request. Specifically, the vehicle can generate a cryptographic nonce N and a cryptographic nonce V_k associated with the authentication request, and generate the first vehicle code (N (xor) V_k) by performing a logical xor operation on the nonce N and the nonce V_k.

The vehicle can also be configured to generate signed vehicle data associated with the authentication request, and output the signed vehicle data for the vehicle operator and/or user device. The vehicle can generate the signed vehicle data based on the vehicle data by signing the vehicle data with a private key associated with the vehicle. In some implementations, the vehicle can generate the signed vehicle data by signing a portion of the vehicle data with the private key, such as the vehicle identifier and/or the vehicle timestamp. The vehicle can obtain the private key from an onboard trusted platform module accessible to the vehicle. In some implementations, the vehicle can generate a two-dimensional code (e.g., QR code) representing the signed vehicle data, and output the signed vehicle data by displaying the two-dimensional code on a display device. In some implementations, the vehicle can generate a bar code or other visual representation of the signed vehicle data, and output the signed vehicle data by displaying the bar code or other visual representation on the display device. In some implementations, the vehicle can generate an audio signal (e.g., radio, ultrasound, etc.) representing the signed vehicle data, and output the signed vehicle data by playing the audio signal on a speaker device. In this way, the vehicle can generate any suitable representation of the signed vehicle data that can be output via an appropriate output device.

The vehicle operator can sign-in via an application on the user device associated with the vehicle operator, and obtain an authentication token in response to successfully signing-in. The vehicle operator can provide the application with a username and password corresponding to a vehicle operator account, and the user device (e.g., the application) can provide the username and password to the service entity computing system via a communication pathway (e.g., first communication pathway) through a web backend that interfaces with a vehicle operator backend service of the service entity computing system. The user device can obtain the authentication token from the service entity computing system via the first communication pathway in response to providing a valid username and password. The authentication token can indicate a confidence level that the vehicle operator is associated with the vehicle operator account corresponding to the provided username and password. The user device can use the authentication token in one or more subsequent communications with the service entity computing system. In some implementations, the user device (e.g., the application) can provide the username and password to the third-party computing system, and in response, the user device can obtain the authentication token from the third-party computing system. The user device can use the authentication token in one or more subsequent communications with the third-party computing system. In some implementations, the user device (e.g., the application) can provide the username and password to a login computing system that is part of or associated with the service entity computing system and/or the third-party computing system.

The user device can be configured to obtain the signed vehicle data from the vehicle, generate first operator data associated with the authentication request, and provide the first operator data to the service entity computing system. The user device can obtain the signed vehicle data in response to the signed vehicle data being output by the vehicle. Specifically, the user device can receive an input including the signed vehicle data based on how the signed vehicle data is output by the vehicle. As an example, if the vehicle displays a two-dimensional code, bar code, or other visual representation on a display device, then the user device can capture an image of the two-dimensional code, bar code, or other visual representation on the display device. In some implementations, the user device can prompt the vehicle operator to position a camera attached to the user device relative to the display device to capture the image. The user device can prompt the vehicle operator in response to, for example, receiving a notification indicative of the vehicle operator being selected to provide secondary control of the vehicle and/or indicative of the signed vehicle data being output by the vehicle. The user device can process image data from the camera (e.g., using various techniques) to decipher the two-dimensional code, bar code, or other visual representation and obtain the signed vehicle data. As another example, if the vehicle outputs an audio signal on a speaker device, then the user device can capture a recording of the audio signal. In some implementations, the user device can prompt the vehicle operator to position a microphone attached to the user device relative to the speaker device to capture the recording. The user device can process audio data from the microphone (e.g., using various techniques) to decipher the audio signal and obtain the signed vehicle data. The user device can generate the first operator data based at least in part on the signed vehicle data, and provide the first operator data to the service entity computing system via the first communication pathway. In some implementations, the user device can provide the first operator data to the third-party computing system, and the third-party computing system can provide the first operator data to the service entity computing system via a third communication pathway through the vehicle operator backend service of the service entity computing system.

The first operator data can include the signed vehicle data that the user device obtained from the vehicle. In some implementations, the first operator data can include a portion of the signed vehicle data, such as the vehicle identifier and/or the vehicle timestamp. The first operator data can also include an operator identifier associated with the vehicle operator. The user device can obtain the operator identifier based on the vehicle operator. As an example, the user device can be assigned to the vehicle operator and the operator identifier associated with the vehicle operator can be stored in the memory of the user device. As another example the user device can enable the vehicle operator to sign-in via an application on the user device with predetermined credentials (e.g., username and password). The user device can provide the username and password to the login computing system, and obtain the operator identifier associated with the vehicle operator from the login computing system based on the provided credentials. The first operator data can also include an operator timestamp associated with the authentication request. The user device can generate the operator timestamp in response to obtaining the signed vehicle data to indicate a time when the user device obtained the signed vehicle data, when the user device received the notification causing the user device to prompt the vehicle operator, and/or when the user device provides the first operator data to the service entity computing system. The first operator data can also include a first operator code associated with the authentication request. Specifically, the user device can generate a cryptographic nonce O associated with the authentication request, and generate the first operator code based on the nonce O (e.g., by setting the nonce O to be the first operator code).

The service entity computing system can be configured to obtain the vehicle data from the vehicle, obtain the first operator data from the user device, and determine a validity of the authentication request based on the vehicle data and the first operator data. The service entity computing system can obtain the vehicle data from the third-party computing system via the third communication pathway in response to the third-party computing system obtaining the vehicle data from the vehicle, and the service entity computing system can obtain the first operator data from the user device during the open communication session between the third-party computing system and the service entity computing system. In some implementations, the service entity computing system can obtain the first operator data from the third-party computing system via the third communication pathway in response to the third-party computing system obtaining the first operator data from the user device. In some implementations, the vehicle can be associated with the first-party fleet and the service entity computing system can obtain the vehicle data from the vehicle via the second communication pathway.

The service entity computing system can determine the validity of the authentication request in response to receiving the vehicle data and the first operator data. In this case, the service entity computing system can determine the validity of the authentication request based on a third security tier and the corresponding set of authentication procedures (e.g., the third set of authentication procedures). The third set of authentication procedures can include, for example, the service entity computing system determining whether the vehicle identifier is valid and refers to an active account, whether the vehicle account is allowed to be operated by a vehicle operator, whether the vehicle account belongs to an vehicle, whether the vehicle is configured to provide the vehicle service at the third security tier, whether the private key used for the signed vehicle data is a valid private key, whether the vehicle account and the vehicle operator account belong to the same fleet, and/or whether the vehicle timestamp is not too far in the past with respect to the operator timestamp (e.g., less than a threshold difference).

The service entity computing system can be configured to generate a service code associated with the authentication request based on the validity of the authentication request, and provide the service code to the vehicle. The service entity computing system can determine the service code in response to determining that the authentication request is valid. Specifically, the service entity computing system can generate a cryptographic nonce S associated with the authentication request, and generate the service code (S (xor) O) by performing a logical xor operation on the nonce S and the first operator code (e.g., the nonce O) in the first operator data. The service entity computing system can provide the service code to the third-party computing system via the third communication pathway, and the third-party computing system can provide the service code to the vehicle. In some implementations, the vehicle can be associated with the first-party fleet and the service entity computing system can provide the service code to the vehicle via the second communication pathway The vehicle can be configured to obtain the service code from the service entity computing system, generate a second vehicle code associated with the authentication request, and output the second vehicle code for the vehicle operator and/or user device. The vehicle can obtain the service code from the third-party computing system in response to the third-party computing system obtaining the service code from the service entity computing system. In some implementations, the vehicle can be associated with the first-party fleet and the vehicle can obtain the service code from the service entity computing system via the second communication pathway. The vehicle can generate the second vehicle code in response to receiving the service code. Specifically, the vehicle can generate the second vehicle code (S (xor) O (xor) N) by performing a logical xor operation on the service code (S (xor) O) and the nonce N associated with the authentication request that was previously generated by the vehicle. In some implementations, the vehicle can generate a two-dimensional code (e.g., QR code) representing the second vehicle code, and output the second vehicle code by displaying the two-dimensional code on a display device. In some implementations, the vehicle can generate a bar code or other visual representation of the second vehicle code, and output the second vehicle code by displaying the bar code or other visual representation on the display device. In some implementations, the vehicle can generate an audio signal (e.g., radio, ultrasound, etc.) representing the second vehicle code, and output the second vehicle code by playing the audio signal on a speaker device. In this way, the vehicle can generate any suitable representation of the second vehicle code that can be output via an appropriate output device.

The user device can be configured to obtain the second vehicle code from the vehicle, generate second operator data associated with the authentication request, and provide the second operator data to the service entity computing system. The user device can obtain the second vehicle code in response to the second vehicle code being output by the vehicle. Specifically, the user device can receive an input including the second vehicle code based on how the second vehicle code is output by the vehicle. As an example, if the vehicle displays a two-dimensional code (e.g., QR code), bar code, or other visual representation on a display device, then the user device can capture an image of the two-dimensional code, bar code, or other visual representation on the display device. In some implementations, the user device can prompt the vehicle operator to position a camera attached to the user device relative to the display device to capture the image. The user device can process image data from the camera (e.g., using various techniques) to decipher the two-dimensional code, bar code, or other visual representation and obtain the second vehicle code. As another example, if the vehicle outputs an audio signal on a speaker device, then the user device can capture a recording of the audio signal. In some implementations, the user device can prompt the vehicle operator to position a microphone attached to the user device relative to the speaker device to capture the recording. The user device can process audio data from the microphone (e.g., using various techniques) to decipher the audio signal and obtain the second vehicle code. The user device can generate the second operator data based at least in part on the second vehicle code, and provide the second operator data to the service entity computing system via the first communication pathway. In some implementations, the user device can provide the second operator data to the third-party computing system, and the third-party computing system can provide the second operator data to the service entity computing system via the third communication pathway.

The second operator data can include a second operator code associated with the authentication request. Specifically, the user device can generate the second operator code (S (xor) N) by performing a logical operation on the second vehicle code (S (xor) O (xor) N) and the nonce O associated with the authentication request that was previously generated by the user device. The second operator data can also include the vehicle identifier in the signed vehicle data associated with the authentication request that was previously obtained from the vehicle.

The service entity computing system can be configured to obtain the second operator data from the user device, and determine an authentication result for the authentication request based on the second operator data. The service entity computing system can obtain the second operator data from the user device via the first communication pathway. The service entity computing system can determine the authentication result in response to receiving the second operator data from the user device. The service entity computing system can determine if the vehicle identifier in the second operator data matches the vehicle identifier in the vehicle data associated with the authentication request that was previously received from the vehicle. If the vehicle identifier in the second operator data does not match the vehicle identifier previously received from the vehicle, then the service entity computing system can determine that the authentication result is negative. If the vehicle identifier in the second operator data matches the vehicle identifier previously received from the vehicle, then the service entity computing system can determine an intermediate result associated with the authentication request, provide the intermediate result to the vehicle, and obtain the authentication result from the vehicle in response to providing the intermediate result. Specifically, the service entity computing system can generate the intermediate result (V_k) by performing a logical xor operation on the second operator code (S (xor) N), the first vehicle code (N (xor) V_k) associated with the authentication request that was previously received from the vehicle (e.g., in the vehicle data associated with the authentication request that was previously received from the vehicle), and the nonce S associated with the authentication request that was previously generated by the service entity computing system. The service entity computing system can provide the intermediate result to the third-party computing system via the second communication pathway, and the third-party computing system can provide the intermediate result to the vehicle.

The vehicle can be configured to obtain the intermediate result from the service entity computing system, determine the authentication result for the authentication request based on the intermediate result, and provide the authentication result to the service entity computing system. The vehicle can obtain the intermediate result from the third-party computing system in response to the service entity computing system providing the intermediate result to the third-party computing system. The vehicle can determine the authentication result in response to receiving the intermediate result from the service entity computing system. The vehicle can compare the intermediate result received from the service entity computing system with the nonce V_k associated with the authentication request that was previously generated by the vehicle. If the intermediate result matches the previously generated nonce V_k, then the vehicle can determine that the authentication result is positive. If the intermediate result does not match, then the vehicle can determine that the authentication result is negative. The vehicle can provide the authentication result to the third-party computing system, and the third-party computing system can provide the authentication result to the service entity computing system via the second communication pathway.

The service entity computing system can be configured to obtain the authentication result from the vehicle. The service entity computing system can obtain the authentication result from the third-party computing system via the second communication pathway in response to the vehicle providing the authentication result to the third-party computing system. If the authentication result is positive, then the service entity computing system can authorize the vehicle operator to control the vehicle by generating an association between the operator identifier and the vehicle identifier. If the authentication result is negative, then the service entity computing system can determine that the authentication has failed, and the vehicle operator can be denied access to and/or operation control of the vehicle. In some implementations, the service entity computing system can obtain the authentication result from the third-party computing system in response to the vehicle providing the authentication result to the third-party computing system.

The communication flow and pathways described herein are not meant to be limiting. For example, in some implementations, the user device can provide data to a third-party computing system, and the third-party computing system can provide such data to the service entity computing system (e.g., via the first communication pathway, second communication pathway, etc.).

The systems and methods described herein may provide a number of technical effects and benefits. For instance, by enabling a vehicle operator to be authenticated for a vehicle (e.g., autonomous vehicle) before authorizing the vehicle operator to control the vehicle, a third-party entity that manages or operates a fleet including the vehicle can ensure that only authorized operators are able to provide secondary control of the vehicle, and further confirm that the authorized operator is associated with a particular vehicle in the third-party fleet. In addition, by enabling a vehicle operator to be authenticated based on a variety of different security tiers, a plurality of different third-party entities that each manage or operate a respective fleet can select a security tier that meets individual requirements for each third-party entity.

Additionally, example aspects of the present disclosure can provide an improvement to computing technology, such as autonomous vehicle computing technology. For example, a service entity computing system can receive data indicative of an authentication request from a vehicle and/or user device. The authentication request data can include at least a vehicle identifier associated with the vehicle and an operator identifier associated with the vehicle operator. The service entity computing system can provide a service code associated with the authentication request to the vehicle, and the vehicle can further output the service code or a vehicle code based at least in part on the service code. The user device can obtain data indicative of the service code or the vehicle code, and provide the service code or an operator code based at least in part on the vehicle code to the service entity computing system. The service entity computing system can determine an authentication result based at least in part on the service code or operator code from the user device, and authorize the vehicle operator for the vehicle.

The autonomous vehicle technology described herein can also help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

Example Embodiments

With reference now to the FIGS., example embodiments of the present invention will be discussed in further detail. FIG. 1A depicts an example system 100 according to example embodiments of the present disclosure. The system 100 can include a vehicle computing system 103 associated with a vehicle 30, a user device 105 associated with a vehicle operator 50, a third-party computing system 107 associated with a third-party entity, and a service entity computing system 109 associated with a service entity. The service entity can use the service entity computing system 109 to operate, maintain, manage, etc. a vehicle service platform that coordinates the provision of vehicle services, and the vehicle 30 can provide a vehicle service on the vehicle service platform.

Vehicle 30 can be a ground-based autonomous vehicle (e.g., car, truck, bus), an air-based autonomous vehicle (e.g., airplane, drone, helicopter, or other aircraft), an autonomous light electric vehicle (e.g., bike, scooter, etc.), or other types of vehicle (e.g., boat, ship, or other watercraft). Vehicle 30 can be capable of sensing its environment, navigating its environment with minimal or no human input, and/or the like. Vehicle 30 can be an autonomous vehicle that can drive, navigate, operate, etc. with minimal and/or no interaction from a human driver, or vehicle 30 can be manually controlled by a human operator (e.g., vehicle operator). Vehicle 30 can be capable of operating in a plurality of modes, such as a fully autonomous mode, a semi-autonomous mode, or a manual mode.

Vehicle 30 can include various systems and devices configured to control the operation of the vehicle. For example, the vehicle 30 can include an onboard vehicle computing system 103 (e.g., located on or within the vehicle 30) that is configured to operate the vehicle 30. Generally, the vehicle computing system 103 can obtain sensor data from a sensor system onboard the vehicle 30, attempt to comprehend the vehicle's surrounding environment by performing various processing techniques on the sensor data, and generate an appropriate motion plan through the surrounding environment of the vehicle 30. Vehicle computing system 103 can also obtain sensor data from the sensor system indicative of one or more actions of the vehicle operator 50 (e.g., entering the vehicle 30, sitting in the vehicle 30, fastening a seatbelt of the vehicle 30, etc.). Vehicle computing system 103 can communicate across the network(s) 120 with a remote computing system (e.g., service entity computing system 109, third-party computing system 107, etc.) via a communication system onboard the vehicle 30 in order to facilitate an authentication request for providing a vehicle service. For example, the vehicle computing system 103 can communicate across the network(s) 120 with a vehicle integration platform 93 (shown in FIG. 1B) on the service entity computing system 109 to send or receive data indicative of the authentication request. Alternatively, the vehicle computing system 103 can communicate across the network(s) 120 with the third-party computing system 107, and the third-party computing system 107 can communicate across the network(s) 120 with the vehicle integration platform 93. Vehicle computing system 103 can also output information via one or more output devices onboard the vehicle 30 (e.g., display device(s), speaker device(s), etc.), and access a private key associated with the vehicle 30 from a trusted platform module onboard the vehicle 30, in order to authenticate the vehicle operator 50, as further described herein.

In some implementations, the vehicle 30 can be part of a fleet of vehicles that are operated and/or managed by the service entity. As an example, the service entity computing system 109 can receive a request for a vehicle service (e.g., from a user) and generate a service assignment (e.g., indicative of the vehicle service type, origin location, destination location, and/or other parameters) for the vehicle 30 to perform. Additionally, the service entity computing system 109 can the select the vehicle operator 50 from a pool of available vehicle operators for the fleet to provide secondary control of the vehicle 30 for the vehicle service. Vehicle operator 50 can provide secondary control of the vehicle 30 when, for example, the vehicle 30 travels in an unmapped area, an area with poor wireless communication reception, an area in which the vehicle 30 will need to perform complex navigational maneuvers, etc. Vehicle operator 50 can take control of the vehicle 30 when the vehicle 30 is in a manual and/or semi-autonomous mode.

In some implementations, the vehicle 30 can be part of a third-party fleet of vehicles that are operated and/or managed by the third-party entity. As an example, the third-party computing system 107 can receive a request for a vehicle service (e.g., from a user) and generate a service assignment (e.g., indicative of the vehicle service type, origin location, destination location, and/or other parameters) for the vehicle 30 to perform. Additionally, the third-party computing system 107 can select the vehicle operator 50 from a pool of available vehicle operators for the third-party fleet to provide secondary control of the vehicle 30 for the vehicle service. Vehicle operator 50 can provide secondary control of the vehicle 30 when, for example, the vehicle 30 travels in an unmapped area, an area with poor wireless communication reception, an area in which the vehicle 30 will need to perform complex navigational maneuvers, etc. Vehicle operator 50 can take control of the vehicle 30 when the vehicle 30 is in a manual or semi-autonomous mode.

User device 105 can include various systems and devices configured to enable the vehicle operator 50 to initiate and complete an authentication request to authenticate the vehicle operator 50 for the vehicle 30. For example, the user device 105 can include a vehicle operator application 51 that can communicate over the network(s) 120 with a web backend 92 of a vehicle operator backend service 91 on the service entity computing system 109, to send or receive data indicative of an authentication request. The vehicle operator application 51 can also obtain information associated with the authentication request that is output by the vehicle computing system 103 via the vehicle 30.

Service entity computing system 109 can include various systems and devices configured to facilitate an authentication request to authenticate the vehicle operator 50 for the vehicle 30. For example, the service entity computing system 109 can include the vehicle operator backend service 91, web backend 92, and vehicle integration platform 93. Service entity computing system 109 can communicate over networks(s) 120 with the vehicle 30 (e.g., vehicle computing system 103) or the third-party computing system 107 via the vehicle integration platform 93, and communicate over network(s) 120 with the user device 105 via the vehicle operator backend service 91 and web backend 92, in order to send or receive data indicative of an authentication request. Additionally, the service entity computing system 109 can determine an authentication result for the authentication result. If the authentication result is positive, then the service entity computing system 109 can authorize the vehicle operator 50 to provide secondary control of the vehicle 30. If the authentication result is negative, then the service entity computing system 109 can deny the authentication request.

Third-party computing system 107 can include various systems and devices configured to facilitate an authentication request to authenticate the vehicle operator 50 for the vehicle 30. Third-party computing system 107 can communicate over the network(s) 120 with the service entity computing system 109 on behalf of the vehicle computing system 103 and/or the user device 105, to send or receive data indicative of an authentication request. For example, the third-party computing system 107 can receive data indicative of an authentication request from the vehicle computing system 103 and/or the user device 105, and provide the authentication request to the service entity computing system 109. Third-party computing system 107 can also receive data indicative of an authentication result from the service entity computing system 109 and provide the authentication result to the vehicle computing system 103 and/or the user device 105. In some implementations, third-party computing system 107 can receive a service request from a user, select the vehicle 30 to service the request and select the vehicle operator 50 to provide secondary control of the vehicle 30 for the service. Third-party computing system 107 can communicate the selection to notify the vehicle 30 (e.g., vehicle computing system 103) and/or the vehicle operator 50 (e.g., user device 105).

Figure 1B:
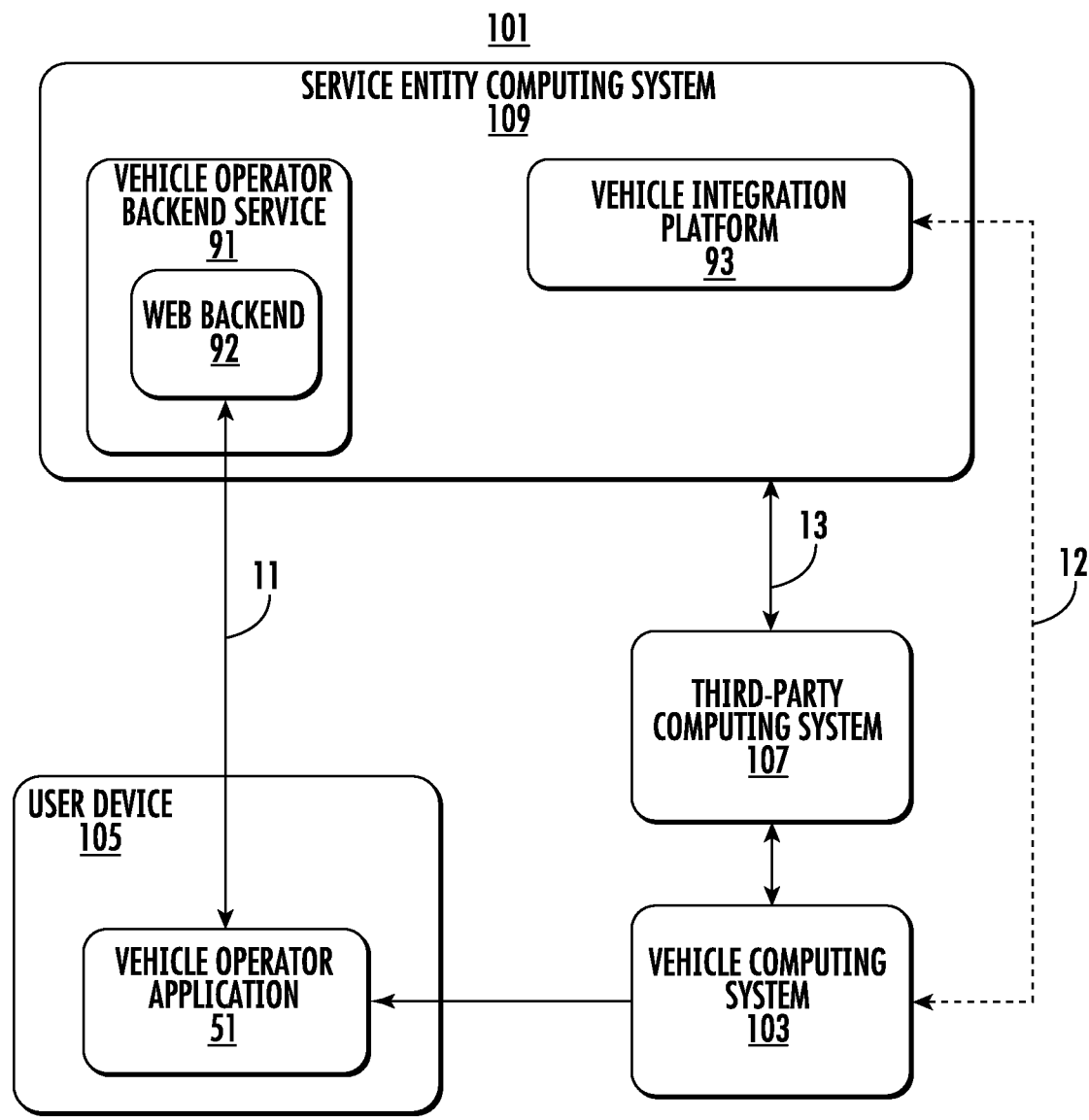
FIG. 1B depicts an example computing system according to example embodiments of the present disclosure.

FIG. 1B depicts an example system 101 according to example embodiments of the present disclosure. The system 101 can include the vehicle computing system 103 associated with the vehicle 30, the user device 105 associated with the vehicle operator 50, the third-party computing system 107 associated with the third-party entity, and the service entity computing system 109 associated with the service entity.

Service entity computing system 109 can include a vehicle integration platform 93 and a vehicle operator backend service 91. Service entity computing system 109 can be configured to communicate with vehicle computing system 103 that is associated with the vehicle 30 (that is operating on the vehicle service platform and is selected to provide a vehicle service) via the vehicle integration platform 93. Additionally, the service entity computing system 109 can be configured to communicate with the user device 105 and/or the third-party computing system 107 via a web backend 92 that interfaces with the vehicle operator backend service 91. As an example, the user device 105 can include a vehicle operator application 51 that enables the user device 105 to communicate with the service entity computing system 109 via a first communication pathway 11 through the web backend 92 in order to submit an authentication request. As another example, the third-party computing system 107 can communicate with the service entity computing system 109 (e.g., on behalf of the user device 105) via one or more third communication pathways 13 through the web backend 92. As another example, if the vehicle 30 is associated with a first-party fleet, then the vehicle computing system 103 can communicate with the service entity computing system 109 via a second communication pathway 12 through the vehicle integration platform 93 in order to authorize the vehicle operator 50 to provide secondary control of the vehicle 30. As another example, the third-party computing system 107 can communicate with the service entity computing system 109 (e.g., on behalf of the vehicle computing system 103) via the third communication pathway(s) 13 through the vehicle integration platform 93. One or more of the first communication pathway 11, second communication pathway 12, and third communication pathway(s) 13 can include/utilize the network(s) 120.

Figure 2A:
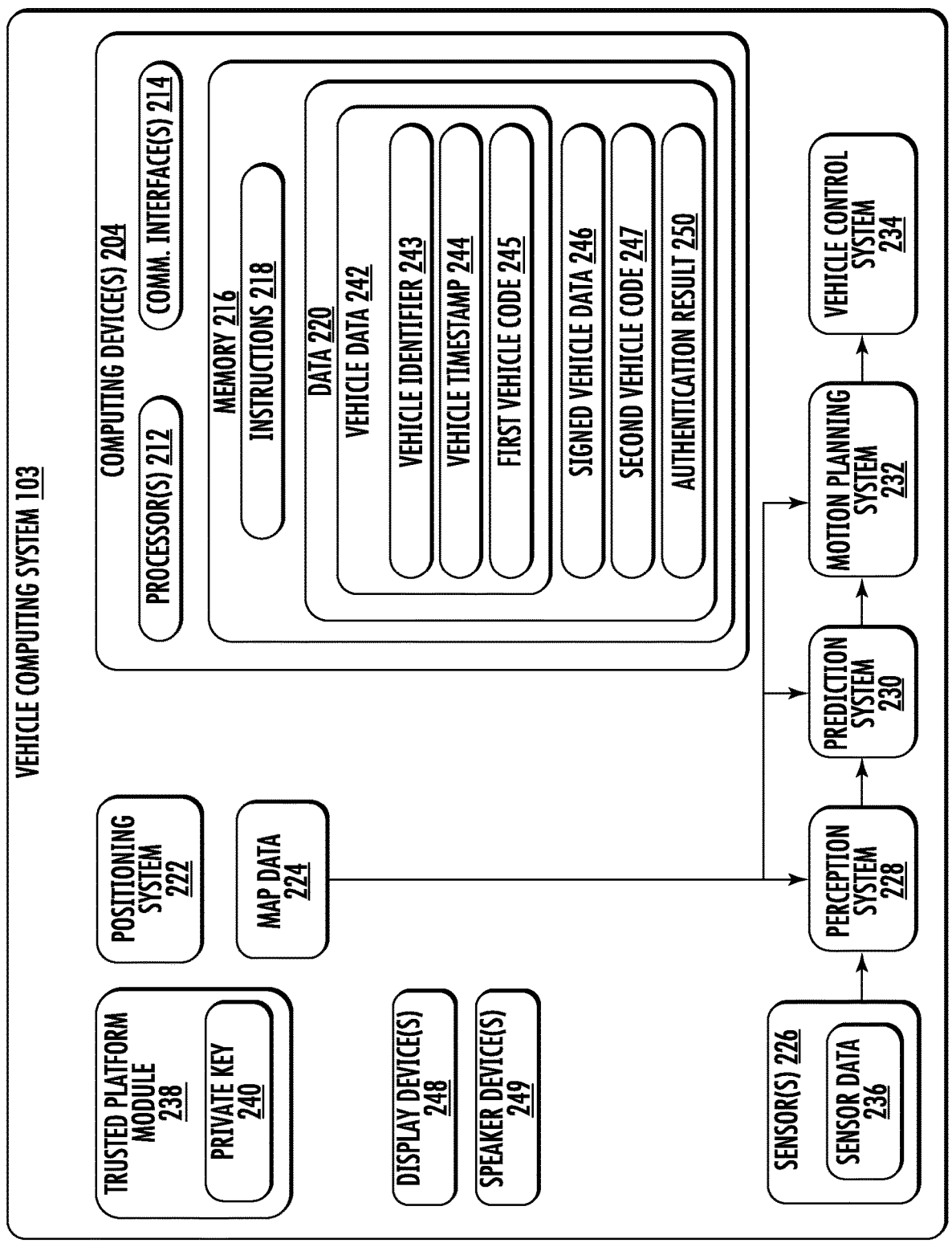
FIG. 2A depicts an example vehicle computing system according to example embodiments of the present disclosure.

As shown in FIG. 2A, the vehicle computing system 103 can include one or more computing devices 204. Computing device(s) 204 can include circuitry configured to perform one or more operations, functions, and/or the like described herein. For example, the computing device(s) 204 can include one or more processors 212, one or more communication interfaces 214, and memory 216 (e.g., one or more hardware components for storing executable instructions, data, and/or the like). Communication interface(s) 214 can enable the computing device(s) 204 to communicate with one another, and/or enable the vehicle computing system 103 (e.g., computing device(s) 204, and/or the like) to communicate with one or more computing systems, computing devices, and/or the like distinct from the vehicle computing system 103. Memory 216 can include (e.g., store, and/or the like) instructions 218 and data 220. When executed by the processor(s) 212, the instructions 218 can cause the vehicle computing system 103 (e.g., computing device(s) 204, and/or the like) to perform one or more operations, functions, and/or the like described herein. Data 220 can include information associated with such operations, functions, and/or the like, and data generated by one or more sensors 226, and/or the like.

In some implementations, data 220 can include vehicle data 242 associated with an authentication request. Vehicle data 242 can include a unique vehicle identifier 243 associated with the vehicle 30. Vehicle data 242 can also include a vehicle timestamp 244 that indicates a time associated with the authentication request. As an example, the vehicle timestamp 244 can indicate a time when the vehicle computing system 103 receives a notification from the third-party computing system 107 indicative of the vehicle 30 being selected to provide a vehicle service for which the vehicle operator 50 is selected to provide secondary control of the vehicle 30. As another example, the vehicle timestamp 244 can indicate a time when the vehicle computing system 103 detects one or more actions of the vehicle operator 50 indicative of the authentication request. Vehicle data 242 can also include a first vehicle code 245 associated with the authentication request. First vehicle code 245 can be based on a cryptographic nonce N and a cryptographic nonce V_k associated with the authentication that are generated by the vehicle computing system 103 and stored in the memory 216.

In some implementations, data 220 can include signed vehicle data 246 associated with the authentication request. Signed vehicle data 246 can include at least a portion of the vehicle data 242 signed with a private key 240. For example, signed vehicle data 246 can include vehicle identifier 243, vehicle timestamp 244, and/or first vehicle code 245 signed with the private key 240.

In some implementations, data 220 can include second vehicle code 247 associated with the authentication request. Vehicle computing system 103 can generate second vehicle code 247, for example, if the vehicle 30 is associated with a third-security tier. In such case, the vehicle computing system 103 can obtain a service code from the service entity computing system 109 or third-party computing system 107, and generate second vehicle code 247 associated with an authentication request based at least in part on the service code and the nonce N associated with the authentication request that was previously generated by the vehicle computing system 103 (e.g., to generate first vehicle code 245).

In some implementations, data 220 can include authentication result 250 associated with the authentication request. Vehicle computing system 103 can generate authentication result 250, for example, if the vehicle computing system 103 receives an intermediate result from the service entity computing system 109. Authentication result 250 can indicate whether the authentication request is accepted or rejected.

Vehicle computing system 103 can assist in controlling the vehicle 30. As an example, the vehicle computing system 103 can receive data generated by the sensor(s) 226, attempt to comprehend an environment at least partially surrounding the vehicle 30 by performing various processing techniques on the data generated by the sensor(s) 226, and generate a motion plan for navigating the vehicle 30 through such surrounding environment. As another example, the vehicle computing system 103 can receive data generated by the sensor(s) 226, attempt to comprehend the action(s) by the vehicle operator 50 indicative of the authentication request by performing various processing techniques on the data generated by sensor(s) 226, and generate the vehicle data 242 in response to detecting the action(s) by the vehicle operator 50. Vehicle computing system 103 can interface with one or more vehicle controls (e.g., vehicle control system 245, one or more display devices 248, one or more speaker devices 249, etc.) to operate the vehicle 30 (e.g., in accordance with the motion plan, and/or the like).

Sensor(s) 226 can include, for example, one or more cameras (e.g., visible spectrum cameras, infrared cameras, and/or the like), light detection and ranging (LIDAR) systems, radio detection and ranging (RADAR) systems, and/or the like. Sensor(s) 226 can generate sensor data 236 that is descriptive of the environment proximate to the sensor(s) 226; including information that describes one or more locations, velocities, vectors, and/or the like of objects in the environment surrounding vehicle 30. For example, a LIDAR system can generate data indicating the relative location (e.g., in three-dimensional space relative to the LIDAR system, and/or the like) of a number of points corresponding to objects that have reflected a ranging laser of the LIDAR system. Such a LIDAR system can, for example, measure distances by measuring the interference between outgoing and incoming light waves, measure the time of flight (TOF) it takes a short laser pulse to travel from a sensor to an object and back, calculate the distance based at least in part on the TOF with respect to the known speed of light, based at least in part on a phase-shift with known wavelength, and/or the like. As another example, a RADAR system can generate data indicating one or more relative locations (e.g., in three-dimensional space relative to the RADAR system, and/or the like) of a number of points corresponding to objects that have reflected a ranging radio wave of the RADAR system. For example, radio waves (e.g., pulsed, continuous, and/or the like) transmitted by such a RADAR system can reflect off an object and return to a receiver of the RADAR system, generating data from which information about the object's location, speed, and/or the like can be determined. As another example, for one or more cameras, various processing techniques, for example, range-imaging techniques (e.g., structure from motion, structured light, stereo triangulation, and/or the like) can be performed to identify one or more locations (e.g., in three-dimensional space relative to the camera(s), and/or the like) of a number of points corresponding to objects depicted in imagery captured by the camera(s). Other sensor systems can identify the location of points that correspond to objects as well. Thus, sensor(s) 226 can be used to collect sensor data 236 that includes information that describes the location (e.g., in three-dimensional space relative to the vehicle 30) of points that correspond to objects within the surrounding environment of the vehicle 30.

Sensor(s) 226 can also include, for example, one or more sensors that can identify one or more actions of a vehicle operator. Such sensor(s) can include, for example, one or more door sensors that can detect when the vehicle operator 50 enters the vehicle 30, one or more seatbelt sensors that can detect when the vehicle operator 50 is seated in the vehicle 30, and one or more seatbelt sensors that can detect when the vehicle operator 50 fastens a seatbelt of the vehicle 30. Additionally, or alternatively, such sensor(s) can include one or more cameras configured to capture interior image data of an interior of the vehicle 30. Vehicle computing system 103 can detect when the vehicle operator 50 enters, sits, or fastens a seatbelt by performing object detection and tracking analysis on the interior image data. In some implementations, sensor(s) 226 can include one or more sensors associated with various vehicle/operator interface(s) (e.g., knobs, levers, buttons, paddles, touchscreen, etc.) that can detect when a vehicle operator activates such interface(s). As an example, such sensor(s) can include a set of paddle shifter sensors associated with a set of paddle shifters. The paddle shifter sensors can detect when the vehicle operator 50 activates the paddle shifters in a predetermined sequence that is indicative of an authentication request. Thus, sensor(s) 226 can be used to collect sensor data 236 that includes information that describes the action(s) of the vehicle operator.

Positioning system 222 can determine a current position of the vehicle 30. The positioning system 222 can be any device or circuitry for analyzing the position of the vehicle 30. For example, the positioning system 222 can determine position by using one or more of inertial sensors, a satellite positioning system, based on IP address, by using triangulation and/or proximity to network access points or other network components (e.g., cellular towers, WiFi access points, etc.) and/or other suitable techniques. The position of the vehicle 30 can be used by various systems of the vehicle computing system 103.

In addition to sensor data 236, the perception system 228 can retrieve or otherwise obtain map data 224 that provides detailed information about the surrounding environment of the vehicle 30. Map data 224 can provide information regarding: the identity and location of different travel ways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way); traffic control data (e.g., the location and instructions of signage, traffic lights, or other traffic control devices); and/or any other map data that provides information that assists the vehicle computing system 103 in comprehending and perceiving its surrounding environment and its relationship thereto.

Perception system 228 can identify one or more objects that are proximate to the vehicle 30 based on sensor data 236 received from the sensor(s) 226 and/or the map data 224. In particular, in some implementations, the perception system 228 can determine, for each object, state data that describes a current state of such object. As examples, the state data for each object can describe an estimate of the object's: current location (also referred to as position); current speed (also referred to as velocity); current acceleration; current heading; current orientation; size/footprint (e.g., as represented by a bounding shape such as a bounding polygon or polyhedron); class (e.g., vehicle versus pedestrian versus bicycle versus other); yaw rate; and/or other state information.

Prediction system 230 can receive the state data from the perception system 228 and predict one or more future locations for each object based on such state data. For example, the prediction system 230 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

Motion-planning system 232 can generate, determine, select, and/or the like a motion plan for vehicle 30, for example, based at least in part on state data of object(s) provided by perception system 228, predicted future location(s) of object(s) provided by prediction system 230, and/or the like. For example, utilizing information about current location(s) of object(s), predicted future location(s) of object(s), and/or the like, motion-planning system 232 can generate, determine, select, and/or the like a motion plan for vehicle 30 that it determines (e.g., based at least in part on one or more operation parameters, and/or the like) best navigates vehicle 30 relative to the object(s). Motion-planning system 232 can provide the motion plan to vehicle control system 234, which can directly and/or indirectly control vehicle 30 via the one or more vehicle controls (e.g., one or more actuators, devices, and/or the like that control gas, power flow, steering, braking, and/or the like) in accordance with the motion plan.

Perception system 228, prediction system 230, motion-planning system 232, and/or vehicle control system 234 can include logic utilized to provide functionality described herein. Perception system 228, prediction system 230, motion-planning system 232, and/or vehicle control system 234 can be implemented in hardware (e.g., circuitry, and/or the like), firmware, software configured to control one or more processors, one or more combinations thereof, and/or the like. For example, instructions 218, when executed by processor(s) 212, can cause vehicle 30 (e.g., vehicle computing system 103, computing device(s) 204, and/or the like) to implement functionality of perception system 228, prediction system 230, motion-planning system 232, and/or vehicle-control system 234 described herein.

Figure 2B:
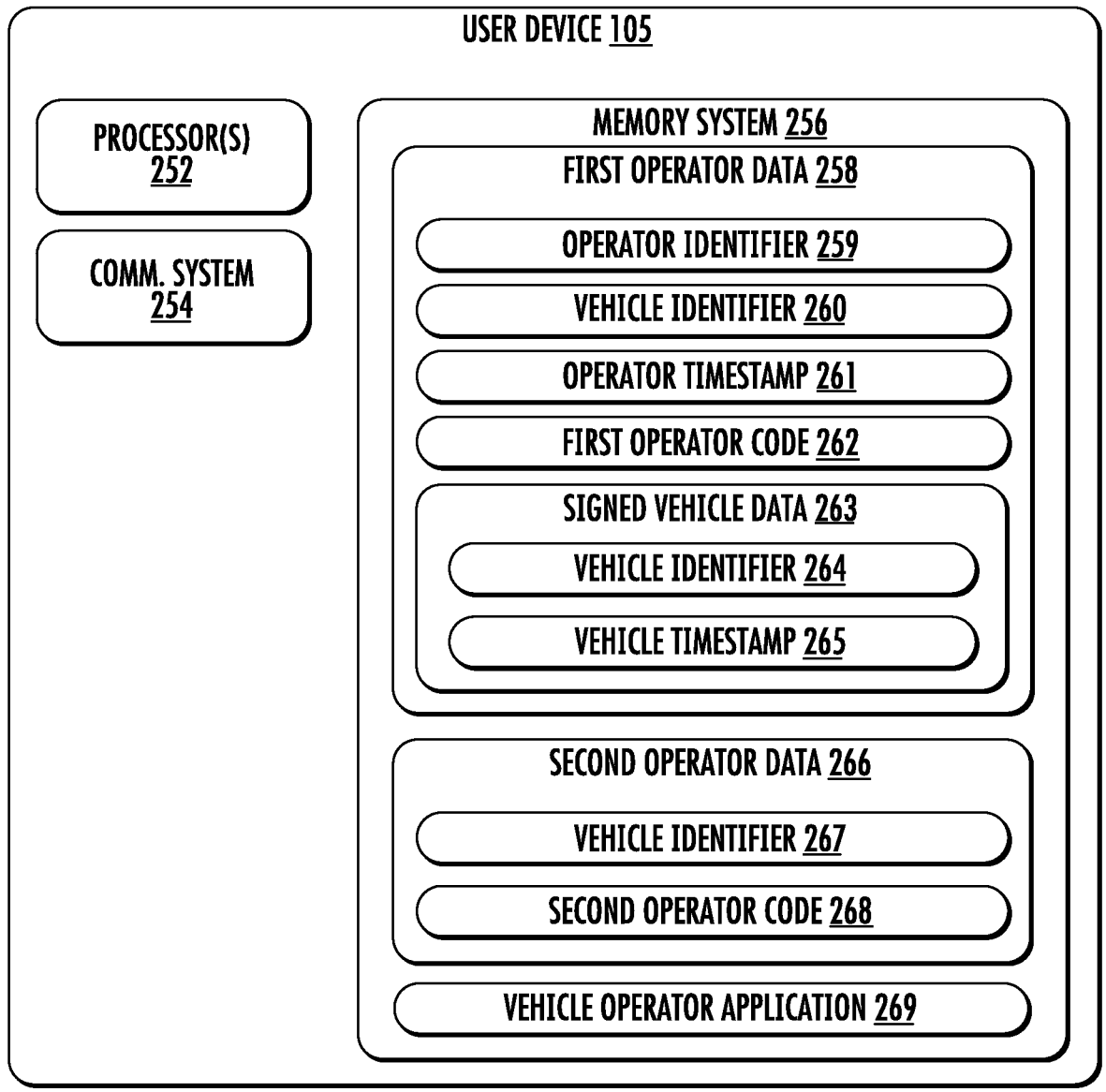
FIG. 2B depicts an example user device according to example embodiments of the present disclosure.

As shown in FIG. 2B, user device 105 can include one or more processors 252, communications system 254, and memory system 256. Memory system 256 can include first operator data 258 and second operator data 266 associated with an authentication request. First operator data 258 can include operator identifier 259 and vehicle identifier 260. Operator identifier 259 can represent an identifier associated with a vehicle operator account corresponding to the vehicle operator 50. Vehicle identifier 260 can represent an identifier associated with the vehicle 30. In some implementations, first operator data 258 can include operator timestamp 261. Operator timestamp 261 can indicate a time when the user device 105 receives an input including signed vehicle data 246, and/or when the user device 105 sends first operator data 258 to the service entity computing system 109. In some implementations, first operator data 258 can include first operator code 262. First operator code 262 can represent a copy or reference to a cryptographic nonce O associated with the authentication request. In some implementations, first operator data 258 can include signed vehicle data 263. Signed vehicle data 263 can represent a copy or reference to signed vehicle data 246 generated by the vehicle computing system 103. Signed vehicle data 263 can include vehicle identifier 264 that corresponds to vehicle identifier 243, and vehicle timestamp 265 that corresponds to vehicle timestamp 244.

Second operator data 266 can include vehicle identifier 267 and second operator code 268. Vehicle identifier 267 can represent a copy or reference to vehicle identifier 260, and the user device 105 can generate second operator code 268 based at least in part on second vehicle code 247 and the nonce O associated with the authentication request that was previously generated by the user device 105.

Figure 2C:
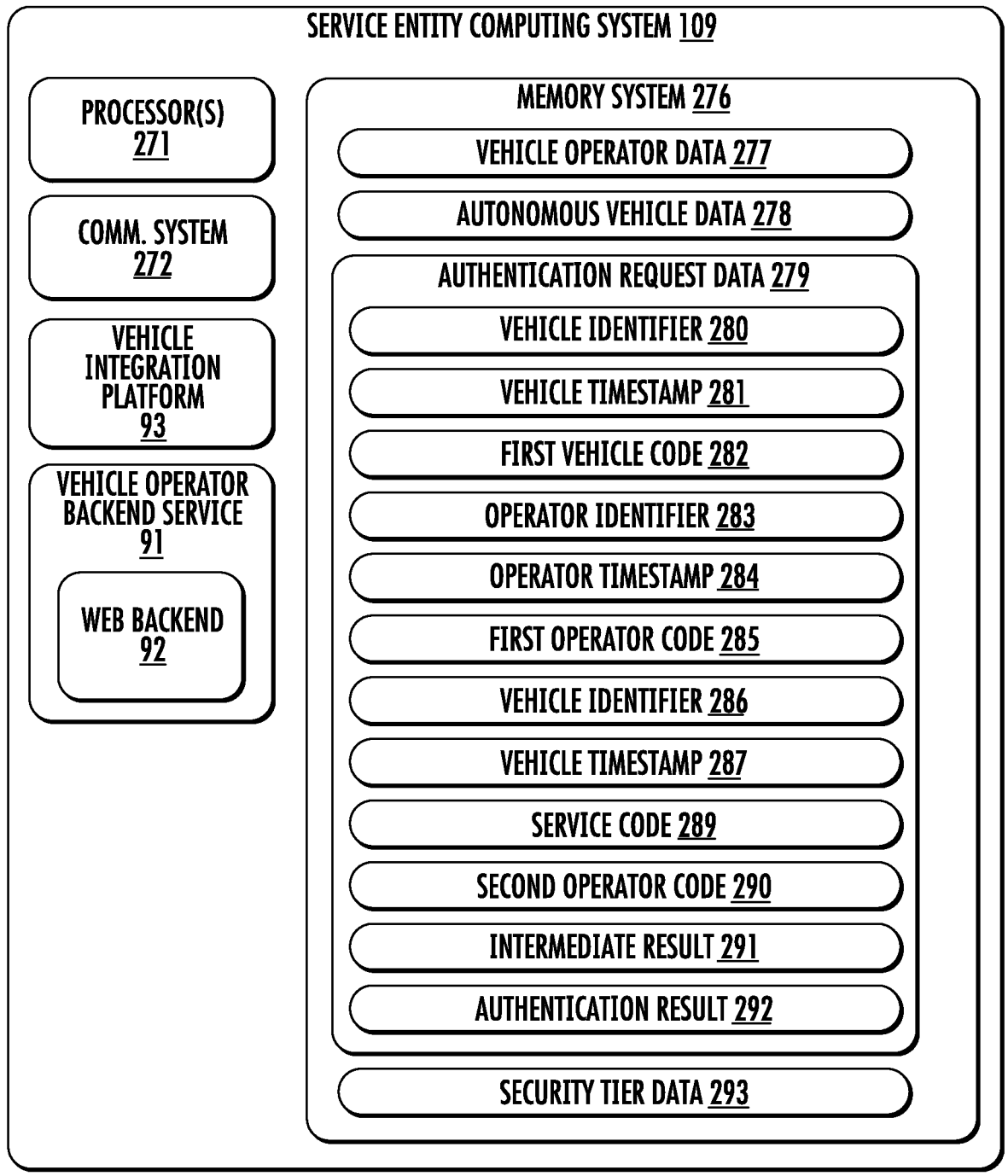
FIG. 2C depicts an example service entity computing system according to example embodiments of the present disclosure.

As shown in FIG. 2C, the service entity computing system 109 can include one or more processors 271, communications system 272, vehicle integration platform 93, vehicle operator backend service 91 and web backend 92, and memory system 276. Memory system 276 can include vehicle operator data 277, autonomous vehicle data 278, authentication request data 279, and security tier data 293. Vehicle operator data 277 can include, for example, an operator identifier associated with each of one or more vehicle operator accounts, credential information (e.g., username and password) associated with each operator identifier, an account status associated with each operator identifier (e.g., active/inactive), one or more fleets associated with each of the operator identifier, etc.

Autonomous vehicle data 278 can include, for example, a vehicle identifier associated with each of one or more vehicle accounts for vehicle(s) operating on the vehicle service platform, an account status associated with each vehicle identifier (e.g., active/inactive), an operable status associated with each vehicle identifier (whether the corresponding vehicle is allowed to be operated by a vehicle operator), a private key signature associated with each vehicle identifier, one or more fleets associated with each vehicle identifier, a security tier associated with each vehicle identifier, etc.

Authentication request data 279 can include vehicle identifier 280, vehicle timestamp 281, and first vehicle code 282, that are based at least in part on vehicle identifier 243, vehicle timestamp 244, and first vehicle code 245, respectively, in vehicle data 242. In some implementations, authentication request data 279 can include operator identifier 283, first operator code 285, vehicle identifier 286, and vehicle timestamp 287, that are based at least in part on operator identifier 259, first operator code 262, vehicle identifier 260, and vehicle timestamp 265, respectively, in first operator data 258. In some implementations, authentication request data 279 can include operator timestamp 284. If the vehicle 30 is associated with the first security tier, then operator timestamp 284 can be based at least in part on operator timestamp 261 in first operator data 258. If the vehicle 30 is associated with the third security tier, then operator timestamp 284 can be based at least in part on vehicle timestamp 265 in first operator data 258. In some implementations, authentication request data 279 can include service code 289 associated with the authentication request. Service entity computing system 109 can generate service code 289 based at least in part on a one-time password or a plurality of cryptographic nonces. In some implementations, authentication request data 279 can include second operator code 290. Service entity computing system 109 can generate second operator code 290 as a copy or reference to second operator code 268 in second operator data 266. In some implementations, authentication request data 279 can include intermediate result 291. Service entity computing system 109 can generate intermediate result 291 based at least in part on second operator code 290, a cryptographic nonce associated with the authentication request that was previously generated by the service entity computing system 109, and first vehicle code 282. In some implementations, authentication request data 279 can include authentication result 292. If authentication result 292 is positive, then the service entity computing system 109 can authorize the vehicle operator 50 to provide secondary control of the vehicle 30 by generating an association between operator identifier 283 and vehicle identifier 280. If authentication result 292 is negative, then the service entity computing system 109 can determine that the authentication has failed, and the vehicle operator 50 can be denied access to and/or operation control of the vehicle 30.

Security tier data 293 can include one or more predetermined security tiers (e.g., first tier, second tier, third tier, etc.), and a set of authentication procedures associated with each of the security tier(s) (e.g., first set, second set, third set, etc.).

Figure 3:
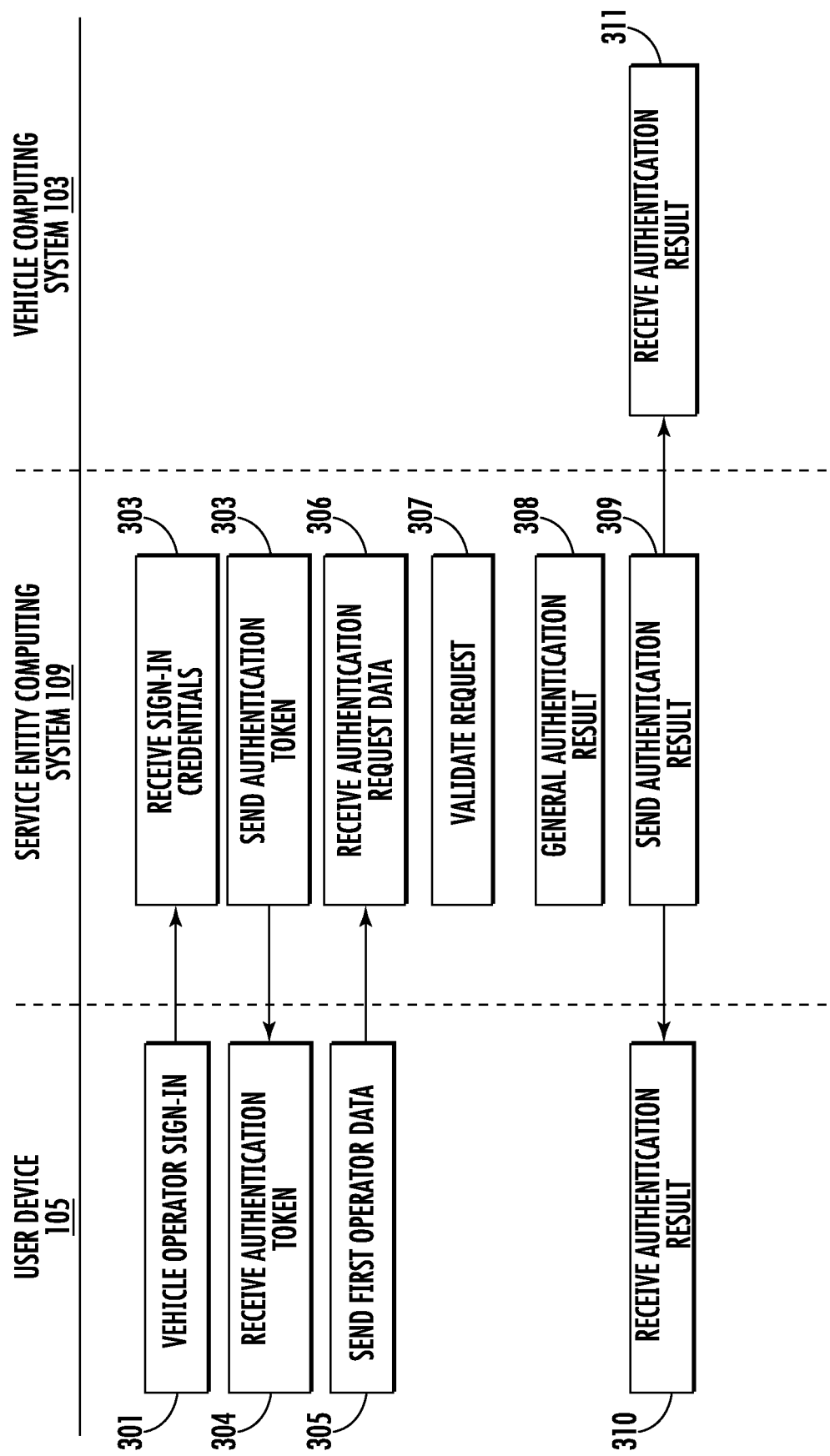
FIG. 3 depicts a flow diagram of an example method to authenticate a vehicle operator for an autonomous vehicle associated with a first security tier according to example embodiments of the present disclosure.

FIG. 3 depicts an example flow diagram of an authentication procedure to authenticate a vehicle operator for a vehicle that is associated with a first security tier. At (301), the vehicle operator 50 can sign-in. For example, the vehicle operator 50 can load the vehicle operator application 269 on the user device 105. The vehicle operator 50 can sign-in to a vehicle operator account via the vehicle operator application 269 by providing predetermined credential information (e.g., username and password) associated with the vehicle operator 50. User device 105 (e.g., vehicle operator application 269) can send the credentials provided by the vehicle operator 50 to the service entity computing system 109 via the first communication pathway 11.

At (302), the service entity computing system 109 can receive sign-in credentials from the user device 105. For example, the service entity computing system 109 can receive the credentials (e.g., username and password) that the vehicle operator 50 input into the vehicle operator application 269 on the user device 105.

At (303), the service entity computing system 109 can send an authentication token to the user device 105. For example, the service entity computing system 109 can search for a vehicle operator account associated with the credentials received from the user device 105. Service entity computing system 109 can identify the vehicle operator account based at least in part on vehicle operator data 277. If the vehicle operator account is valid (e.g., if the account exists and the account status is active), then the service entity computing system 109 can send an authentication token to the user device 105. The authentication token can indicate a confidence level that the vehicle operator account belongs to the vehicle operator 50.

At (304), the user device 105 can receive the authentication token from the service entity computing system 109. For example, the user device 105 can receive the authentication token in response to sending the credential information to the service entity computing system 109. Once the user device 105 receives the authentication token, the user device 105 can use the authentication token in subsequent communications between the user device 105 and the service entity computing system 109.

At (305), the user device 105 can generate and send first operator data to the service entity computing system 109. For example, the user device 105 can generate first operator data 258 indicative of an authentication request in response to the vehicle operator 50 initiating the authentication request by signing-in via the vehicle operator application 269 and arriving (with the user device 105) at a location that is proximate to the vehicle 30 (e.g., within a threshold distance from the vehicle 30).

First operator data 258 can include operator identifier 259 and vehicle identifier 260. Operator identifier 259 represent an identifier (e.g., operator identifier) associated with the vehicle operator account corresponding to the credential information provided by the vehicle operator 50. User device 105 can receive data representing operator identifier 259 from the service entity computing system 109 in response to sending the credential information (e.g., as part of the authentication token). Vehicle identifier 260 can represent an identifier (e.g., vehicle identifier) associated with the vehicle 30. User device 105 can determine vehicle identifier 260 based at least in part on input by the vehicle operator 50. For example, the vehicle operator 50 can select the vehicle 30 from a list of vehicles. User device 105 can display the list of vehicles for the vehicle operator 50, and prompt the vehicle operator 50 to select a vehicle from the list. User device 105 can send first operator data 258 to the service entity computing system 109 via the first communication pathway 11.

At (306), the service entity computing system 109 can receive authentication request data. For example, the service entity computing system 109 can receive first operator data 258 from the user device 105 and store a copy of first operator data 258 in authentication request data 279. Specifically, the service entity computing system 109 can store a copy of operator identifier 259 in operator identifier 283, and store a copy of vehicle identifier 260 in vehicle identifier 286.

At (307), the service entity computing system 109 can validate the authentication request. For example, the service entity computing system 109 can validate the authentication request associated with authentication request data 279. Service entity computing system 109 can validate the authentication request based at least in part on security level data 293. Specifically, the service entity computing system 109 can determine the set of authentication procedures corresponding to the first security tier (e.g., the first set of authentication procedures) based at least in part on the predetermined set of security tiers stored in security level data 293. The first set of authentication procedures can include, for example, the service entity computing system 109 determining whether the vehicle operator account associated with the operator identifier 283 and the vehicle account associated with the vehicle identifier 286 are valid accounts and belong to the same fleet, and whether the vehicle 30 is configured to provide a vehicle service at the first security tier.

At (308), the service entity computing system 109 can generate an authentication result. For example, the service entity computing system 109 can generate authentication result 292 based at least in part on the validity of the authentication request. If the service entity computing system 109 determines that the authentication request is valid, then the service entity computing system 109 can determine that authentication result 292 is positive. If the service entity computing system 109 determines that the authentication request is not valid, then the service entity computing system 109 can determine that authentication result 292 is negative. If authentication result 292 is positive, then the service entity computing system 109 can authorize the vehicle operator 50 to provide secondary control of the vehicle 30 by generating an association between operator identifier 283 and vehicle identifier 286 (e.g., in vehicle operator data 277 and/or autonomous vehicle data 278). If authentication result 292 is negative, then the service entity computing system 109 can determine that the authentication has failed, and the vehicle operator 50 can be denied access to and/or operation control of the vehicle 30.

At (309), the service entity computing system 109 can send the authentication result to the user device 105 and the vehicle computing system 103. For example, the service entity computing system 109 can send authentication result 292 to the user device 105 via the first communication pathway 11, and send authentication result 292 to the vehicle computing system 103 via the second communication pathway 12.

At (310), the user device 105 can receive the authentication result from the service entity computing system 109. For example, the user device 105 can receive authentication result 292 from the service entity computing system 109. The user device 105 can output an indication representing authentication result 292 for the vehicle operator 50, in response to receiving authentication result 292.

At (311), the vehicle computing system 103 can receive the authentication result from the service entity computing system 109. For example, the vehicle computing system 103 can receive authentication result 292 from the service entity computing system 109. The vehicle computing system 103 can be configured to enable the vehicle operator 50 to provide secondary control of the vehicle 30 in response to receiving authentication result 292 that includes a positive authentication result.

Figure 4:
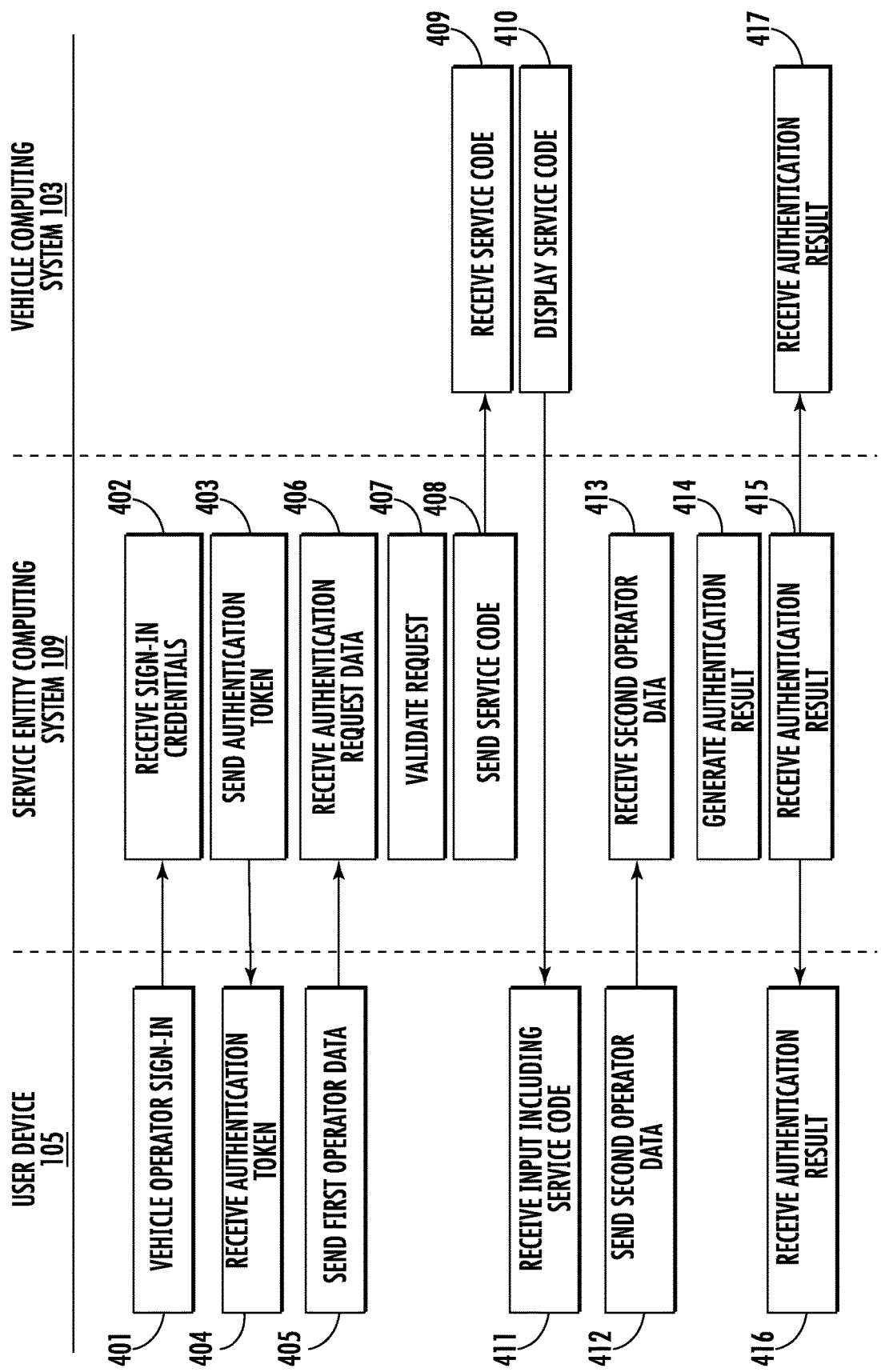
FIG. 4 depicts a flow diagram of an example method to authenticate a vehicle operator for an autonomous vehicle associated with a second security tier according to example embodiments of the present disclosure.

FIG. 4 depicts an example flow diagram of an authentication procedure to authenticate a vehicle operator for a vehicle that is associated with a second security tier. At (401), the vehicle operator 50 can sign-in. For example, the vehicle operator 50 can load the vehicle operator application 269 on the user device 105. The vehicle operator 50 can sign-in to a vehicle operator account via the vehicle operator application 269 by providing predetermined credential information (e.g., username and password) associated with the vehicle operator 50. User device 105 (e.g., vehicle operator application 269) can send the credentials provided by the vehicle operator 50 to the service entity computing system 109 via the first communication pathway 11.

At (402), the service entity computing system 109 can receive sign-in credentials from the user device 105. For example, the service entity computing system 109 can receive the credentials (e.g., username and password) that the vehicle operator 50 input into the vehicle operator application 269 on the user device 105.

At (403), the service entity computing system 109 can send an authentication token to the user device 105. For example, the service entity computing system 109 can search for a vehicle operator account associated with the credentials received from the user device 105. Service entity computing system 109 can identify the vehicle operator account based at least in part on vehicle operator data 277. If the vehicle operator account is valid (e.g., if the account exists and the account status is active), then the service entity computing system 109 can send an authentication token to the user device 105. The authentication token can indicate a confidence level that the vehicle operator account belongs to the vehicle operator 50.

At (404), the user device 105 can receive the authentication token from the service entity computing system 109. For example, the user device 105 can receive the authentication token in response to sending the credential information to the service entity computing system 109. Once the user device 105 receives the authentication token, the user device 105 can use the authentication token in subsequent communications between the user device 105 and the service entity computing system 109.

At (405), the user device 105 can generate and send first operator data to the service entity computing system 109. For example, the user device 105 can generate first operator data 258 associated with an authentication request in response to the vehicle operator 50 initiating the authentication request by signing-in via the vehicle operator application 269 and arriving (with the user device 105) at a location that is proximate to the vehicle 30 (e.g., within a threshold distance from the vehicle 30).

First operator data 258 can include operator identifier 259 and vehicle identifier 260. Operator identifier 259 can include an operator identifier associated with the vehicle operator account corresponding to the credential information provided by the vehicle operator 50. User device 105 can receive data representing operator identifier 259 from the service entity computing system 109 in response to sending the credential information (e.g., as part of the authentication token). Vehicle identifier 260 can include a vehicle identifier associated with the vehicle 30. User device 105 can determine vehicle identifier 260 based at least in part on input by the vehicle operator 50. For example, the vehicle operator 50 can select the vehicle 30 from a list of vehicles. User device 105 can display the list of vehicles for the vehicle operator 50, and prompt the vehicle operator 50 to select a vehicle from the list). User device 105 can send first operator data 258 to the service entity computing system 109 via the first communication pathway 11.

At (406), the service entity computing system 109 can receive authentication request data. For example, the service entity computing system 109 can receive first operator data 258 from the user device 105. In response to receiving first operator data 258, the service entity computing system 109 can generate authentication request data 279. Specifically, the service entity computing system 109 can generate operator identifier 283 and vehicle identifier 286. Operator identifier 283 can represent a copy or reference to operator identifier 259 in first operator data 258. Vehicle identifier 286 can represent a copy or reference to vehicle identifier 260 in first operator data 258.

At (407), the service entity computing system 109 can validate the authentication request. For example, the service entity computing system 109 can validate the authentication request associated with authentication request data 279. Service entity computing system 109 can validate the authentication request based at least in part on security tier data 293. Specifically, the service entity computing system 109 can determine the set of authentication procedures corresponding to the second security tier (e.g., the second set of authentication procedures) based at least in part on the predetermined set of security tiers in security tier data 293. The second set of authentication procedures can include, for example, the service entity computing system 109 determining whether the vehicle operator account associated with operator identifier 283 and the vehicle account associated with vehicle identifier 286 are valid accounts and belong to the same fleet, and whether the vehicle 30 is configured to provide a vehicle service at the second security tier.

At (408), the service entity computing system 109 can generate and send a service code to the vehicle computing system 103. For example, the service entity computing system 109 can generate service code 289 associated with the authentication request. Service entity computing system 109 can generate service code 289 in response to determining that the authentication request is valid. Service entity computing system 109 can generate service code 289 based at least in part on a one-time password (e.g., a random generated code), and send service code 289 to the vehicle computing system 103 via the second communication pathway 12.

At (409), the vehicle computing system 103 can receive the service code from the service entity computing system 109. For example, the vehicle computing system 103 can receive service code 289 from the service entity computing system 109.

At (410), the vehicle computing system 103 can display the service code. For example, the vehicle computing system 103 can display service code 289 in response to receiving service code 289 from the service entity computing system 109. If service code 289 includes a sequence of alphanumeric characters, then the vehicle computing system 103 can display service code 289 by displaying the sequence on display device(s) 248. In some implementations, the vehicle computing system 103 can generate a two-dimensional code (e.g., QR code) based on service code 289. Vehicle computing system 103 can output service code 289 by displaying the two-dimensional code on the display device(s) 248. Alternatively, the vehicle computing system 103 can generate a bar code or other visual representation based on service code 289, and display service code 289 by displaying the bar code or other visual representation on the display device(s) 248.

At (411), the user device 105 can receive input including the service code. For example, the user device 105 can receive input including service code 289 in response to service code 289 being displayed by the vehicle computing system 103. If the vehicle computing system 103 displays a bar code, two-dimensional code, or other visual representation based on service code 289, then the vehicle operator application 269 can display a scanner interface (e.g., that uses a camera attached to the user device 105), and the vehicle operator 50 can use the scanner interface to scan service code 289 being displayed on the display device(s) 248. User device 105 can process the scan (e.g., image data representing service code 289) using various techniques to decipher the bar code, two-dimensional code, or other visual representation and obtain service code 289. If the vehicle computing system 103 displays a sequence of alphanumeric characters on the display device(s) 248, then the vehicle operator 50 can manually input the sequence into the user device 105, or the vehicle operator 50 can use the scanner interface to scan the sequence of alphanumeric characters and process the scan using optical character recognition to obtain service code 289.

At (412), the user device 105 can generate and send second operator data to the service entity computing system 109. For example, the user device 105 can generate second operator data 266 associated with the authentication request in response to receiving the input including service code 289. Second operator data 266 can include vehicle identifier 267 and second operator code 268. Vehicle identifier 267 can represent a copy or reference to vehicle identifier 260. Second operator code 268 can represent a copy or reference to service code 289. User device 105 can send second operator data 266 to the service entity computing system 109 via the first communication pathway 11.

At (413), the service entity computing system 109 can receive the second operator data from the user device 105. For example, the service entity computing system 109 can receive second operator data 266 from the user device 105. In response to receiving second operator data 266, the service entity computing system 109 can generate second operator code 290. Second operator code 290 can represent a copy or reference to second operator code 268 in second operator data 266.

At (414), the service entity computing system 109 can generate an authentication result. For example, the service entity computing system 109 can generate authentication result 292 for the authentication request associated with authentication request data 279, based at least in part on second operator data 266. Service entity computing system 109 can check if vehicle identifier 267 matches vehicle identifier 286, and if so, then the service entity computing system 109 can check if second operator code 290 matches service code 289. If second operator code 290 matches service code 289, then the service entity computing system 109 can determine that authentication result 292 is positive. If vehicle identifier 267 does not match vehicle identifier 286, or if second operator code 290 does not match service code 289, then the service entity computing system 109 can determine that authentication result 292 is negative. If authentication result 292 is positive, then the service entity computing system 109 can authorize the vehicle operator 50 to provide secondary control of the vehicle 30 by generating an association between operator identifier 283 and vehicle identifier 286 (e.g., in vehicle operator data 277 and/or autonomous vehicle data 278). If authentication result 292 is negative, then the service entity computing system 109 can determine that the authentication has failed, and the vehicle operator 50 can be denied access to and/or operation control of the vehicle 30.

At (415), the service entity computing system 109 can send the authentication result to the user device 105 and the vehicle computing system 103. For example, the service entity computing system 109 can send authentication result 292 to the user device 105 via the first communication pathway 11, and send authentication result 292 to the vehicle computing system 103 via the second communication pathway 12.

At (416), the user device 105 can receive the authentication result from the service entity computing system 109. For example, the user device 105 can receive authentication result 292 from the service entity computing system 109. User device 105 can output an indication representing authentication result 292 for the vehicle operator 50 in response to receiving authentication result 292.

At (417), the vehicle computing system 103 can receive the authentication result from the service entity computing system 109. For example, the vehicle computing system 103 can receive authentication result 292 from the service entity computing system 109. If authentication result 292 is positive, then the vehicle computing system 103 can enable the vehicle operator 50 to provide secondary control of the vehicle 30.

Figure 5:
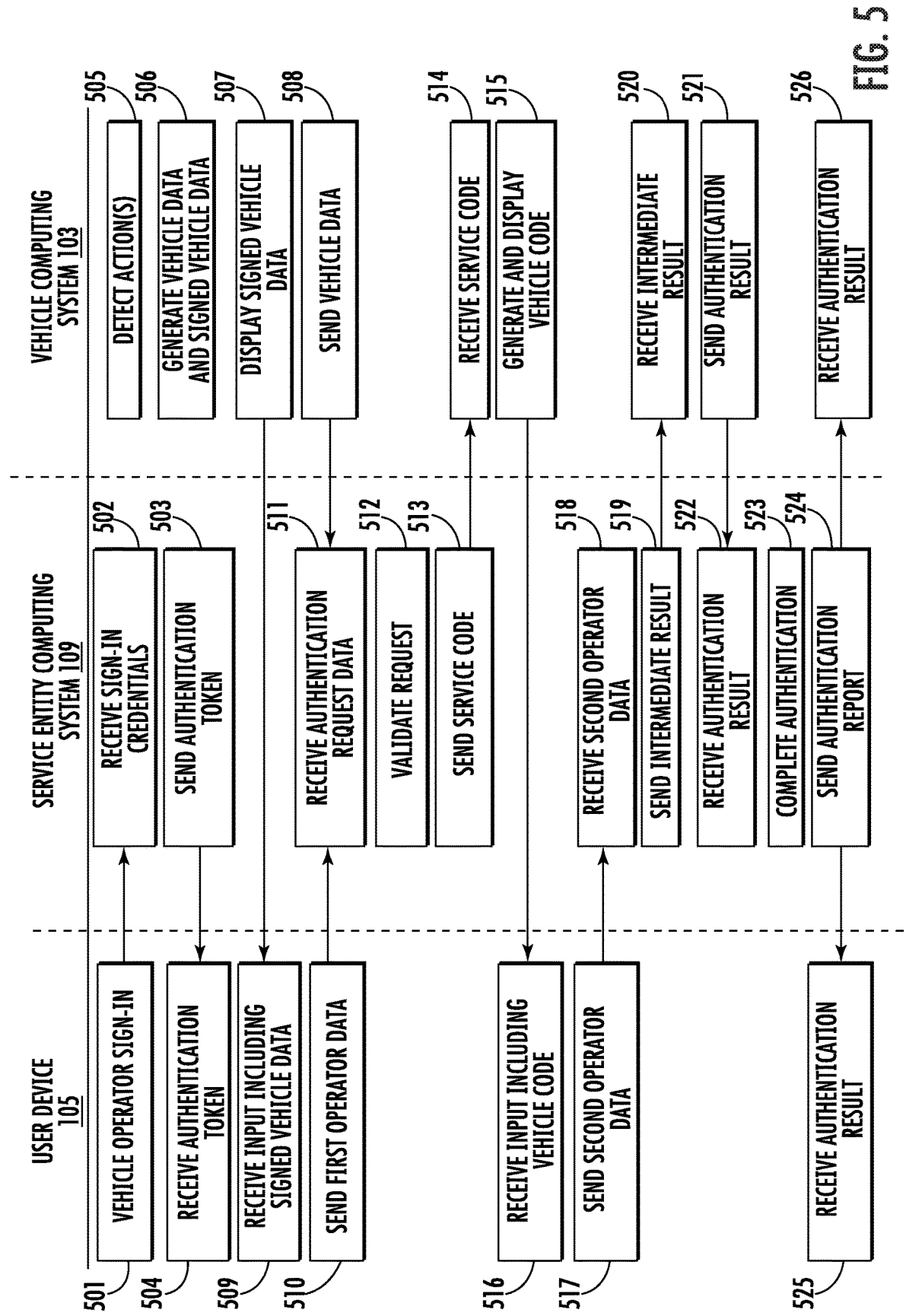
FIG. 5 depicts a flow diagram of an example method to authenticate a vehicle operator for an autonomous vehicle associated with a third security tier according to example embodiments of the present disclosure.

FIG. 5 depicts an example flow diagram of an authentication procedure to authenticate a vehicle operator for a vehicle that is associated with a third security tier. At (501), the vehicle operator 50 can sign-in. For example, the vehicle operator 50 can load the vehicle operator application 269 on the user device 105. The vehicle operator 50 can sign-in to a vehicle operator account via the vehicle operator application 269 by providing predetermined credential information (e.g., username and password) associated with the vehicle operator 50. User device 105 (e.g., vehicle operator application 269) can send the credentials provided by the vehicle operator 50 to the service entity computing system 109 via the first communication pathway 11.

At (502), the service entity computing system 109 can receive sign-in credentials from the user device 105. For example, the service entity computing system 109 can receive the credentials (e.g., username and password) that the vehicle operator 50 input into the vehicle operator application 269 on the user device 105.

At (503), the service entity computing system 109 can send an authentication token to the user device 105. For example, the service entity computing system 109 can search for a vehicle operator account associated with the credentials received from the user device 105. Service entity computing system 109 can identify the vehicle operator account based at least in part on vehicle operator data 277. If the vehicle operator account is valid (e.g., if the account exists and the account status is active), then the service entity computing system 109 can send an authentication token to the user device 105. The authentication token can indicate a confidence level that the vehicle operator account belongs to the vehicle operator 50.

At (504), the user device 105 can receive the authentication token from the service entity computing system 109. For example, the user device 105 can receive the authentication token in response to sending the credential information to the service entity computing system 109. Once the user device 105 receives the authentication token, the user device 105 can use the authentication token in subsequent communications between the user device 105 and the service entity computing system 109.

At (505), the vehicle computing system 103 can detect one or more actions indicative of an authentication request. For example, the vehicle computing system 103 can detect one or more actions by the vehicle operator 50 indicative of the authentication request. The action(s) by the vehicle operator 50 detected by the vehicle computing system 103 can include (as a non-limiting set of examples) detecting the vehicle operator 50 entering into the vehicle 30, detecting the vehicle operator 50 sitting in a driver's seat of the vehicle 30, and detecting the vehicle operator 50 fastening a driver's seatbelt.

At (506), the vehicle computing system 103 can generate vehicle data and signed vehicle data. For example, the vehicle computing system 103 can generate vehicle data 242 and signed vehicle data 246 associated with the authentication request. Vehicle computing system 103 can generate vehicle data 242 and signed vehicle data 246 in response to detecting the action(s) by the vehicle operator 50 indicative of the authentication request.

Vehicle data 242 can include vehicle identifier 243, vehicle timestamp 244, and first vehicle code 245. Vehicle identifier 243 can represent a copy or reference to a predetermined vehicle identifier associated with the vehicle 30. The predetermined vehicle identifier can stored at a predetermined location in memory 326. In some implementations, the predetermined vehicle identifier can be assigned to the vehicle 30 by the service entity (e.g., via the service entity computing system 109) or the third-party entity (e.g., via the third-party computing system 107), and provided to the vehicle computing system 103 at an earlier time. Vehicle timestamp 244 can indicate a time when the vehicle computing system 103 detects the action(s) by the vehicle operator 50 indicative of the authentication request. First vehicle code 245 can represent a result of an operation performed on two or more cryptographic nonces. Specifically, the vehicle computing system 103 can generate a cryptographic nonce N and a cryptographic nonce V_k associated with the authentication request (and store the nonce N and the nonce V_k in memory 216), and the vehicle computing system 103 can perform a logical xor operation on the nonce N and the nonce V_k to generate first vehicle code 245.

Signed vehicle data 246 can be based at least in part on vehicle data 242 and private key 240. Vehicle computing system 103 can obtain private key 240 associated with the vehicle 30 from the trusted platform module 238 onboard the vehicle 30, and generate signed vehicle data 246 by signing vehicle data 242 with private key 240. In some implementations, the vehicle computing system 103 can generate signed vehicle data 246 by signing a portion of vehicle data 246 with private key 240, such as vehicle identifier 243 and/or vehicle timestamp 244. Signed vehicle data 263 can include vehicle identifier 264 and vehicle timestamp 265. Vehicle identifier 264 can represent vehicle identifier 243 signed with private key 240, and vehicle timestamp 265 can represent vehicle timestamp 244 signed with private key 240.

At (507), the vehicle computing system 103 can display the signed vehicle data. For example, the vehicle computing system 103 can generate a bar code, two-dimensional code (e.g., QR code), or other visual representation of signed vehicle data 246, and display the bar code, two-dimensional code, or other visual representation of signed vehicle data 246 on the display device(s) 248.

At (508), the vehicle computing system 103 can send the vehicle data to the service entity computing system 109. For example, the vehicle computing system 103 can send vehicle data 242 to the service entity computing system 109 via the second communication pathway 12.

At (509), the user device 105 can receive input including the signed vehicle data. For example, the user device 105 can receive an input including signed vehicle data 246 in response to signed vehicle data 246 being displayed by the vehicle computing system 103. If the vehicle computing system 103 displays a bar code, two-dimensional code, or other visual representation, then the vehicle operator application 269 can display a scanner interface (e.g., that uses a camera attached to the user device 105), and the vehicle operator 50 can use the scanner interface to scan signed vehicle data 246 being displayed on the display device(s) 248. User device 105 can process the scan (e.g., image data representing signed vehicle data 246) using various techniques to decipher the bar code, two-dimensional code, or other visual representation and obtain signed vehicle data 246. If the vehicle computing system 103 displays a sequence of alphanumeric characters on the display device(s) 248, then the vehicle operator 50 can manually input the sequence into the user device 105, or the vehicle operator 50 can use the scanner interface to scan the sequence of alphanumeric characters and process the scan using optical character recognition to obtain signed vehicle data 246.

At (510), the user device 105 can generate and send first operator data to the service entity computing system 109. For example, the user device 105 can generate first operator data 258 associated with the authentication request in response to the vehicle operator 50 initiating the authentication request by signing-in via the vehicle operator application 269, arriving with the user device 105 at a location that is proximate to the vehicle 30 (e.g., within a threshold distance from the vehicle 30), and providing the input including signed vehicle data 246. User device 105 can send first operator data 258 to the service entity computing system 109 via the first communication pathway 11.

First operator data 258 can include signed vehicle data 263. User device 105 can generate signed vehicle data 263 in response to obtaining signed vehicle data 246 from the vehicle 30. Signed vehicle data 263 can represent a copy or reference to signed vehicle data 246. In some implementations, signed vehicle data 263 can include vehicle identifier 264 and/or vehicle timestamp 265. If signed vehicle data 246 includes vehicle identifier 243 and/or vehicle timestamp 244, then user device 105 can generate vehicle identifier 264 and/or vehicle timestamp 265, respectively. Vehicle identifier 264 can represent a copy or reference to vehicle identifier 243, and vehicle timestamp 265 can represent a copy or reference to vehicle timestamp 244.

First operator data 258 can include operator identifier 259. Operator identifier 259 can include an operator identifier associated with the vehicle operator account corresponding to the credential information provided by the vehicle operator 50. User device 105 can receive data representing operator identifier 259 from the service entity computing system 109 in response to sending the credential information (e.g., as part of the authentication token).

First operator data 258 can include operator timestamp 261. Operator timestamp 261 can indicate a time when the user device 105 receives the input including signed vehicle data 246, and/or when the user device 105 sends first operator data 258 to the service entity computing system 109.

First operator data 258 can include first operator code 262. Specifically, the user device 105 can generate a cryptographic nonce O associated with the authentication request (and store the nonce O in the memory system 256). First operator code 262 can represent a copy or reference to the nonce O.

At (511), the service entity computing system 109 can receive authentication request data. The authentication request data can include the vehicle data from the vehicle computing system 103 and the first operator data from the user device 105. For example, the service entity computing system 109 can receive vehicle data 242 from the vehicle computing system 103, and first operator data 258 from the user device 105. In response to receiving vehicle data 242 and first operator data 258, the service entity computing system 109 can check if the signature on signed vehicle data 263 in first operator data 258 is associated with a vehicle account that corresponds to vehicle identifier 243 in vehicle data 242, based at least in part on autonomous vehicle data 278. If so, then the service entity computing system 109 can generate authentication request data 279 associated with the authentication request. Authentication request data 279 can include vehicle identifier 280, vehicle timestamp 281, first vehicle code 282, operator identifier 283, operator timestamp 284, first operator code 285, vehicle identifier 286, and vehicle timestamp 287. Vehicle identifier 280 can represent a copy or reference to vehicle identifier 243 in vehicle data 242. Vehicle timestamp 281 can represent a copy or reference to vehicle timestamp 244 in vehicle data 242. First vehicle code 282 can represent a copy or reference to first vehicle code 245 in vehicle data 242. Operator identifier 283 can represent a copy or reference to operator identifier 259 in first operator data 258. Operator timestamp 284 can represent a copy or reference to operator timestamp 261 in first operator data 258. First operator code 285 can represent a copy or reference to first operator code 262 in first operator data 258. Vehicle identifier 286 can represent a copy or reference to vehicle identifier 264 in first operator data 258. Vehicle timestamp 287 can represent a copy or reference to vehicle timestamp 265 in first operator data 258.

At (512), the service entity computing system 109 can validate the authentication request. For example, the service entity computing system 109 can validate the authentication request associated with authentication request data 279 based at least in part on security tier data 293. Specifically, the service entity computing system 109 can determine the set of authentication procedures corresponding to the third security tier (e.g., the third set of authentication procedures) based at least in part on the predetermined set of security tiers in security level data 293. The third set of authentication procedures can include, for example, the service entity computing system 109 determining whether the vehicle account associated with vehicle identifier 280 and the vehicle operator account associated with operator identifier 283 are valid accounts and belong to the same fleet, whether the vehicle 30 is configured to provide a vehicle service at the third security tier, whether the signature on signed vehicle data 263 is associated with vehicle identifier 280, whether vehicle identifier 280 matches vehicle identifier 286, whether vehicle timestamp 281 matches vehicle timestamp 287, and whether vehicle timestamp 281 is not too far in the past with respect to operator timestamp 284 (e.g., less than a threshold difference).

At (513), the service entity computing system 109 can generate and send a service code to the vehicle computing system 103. For example, the service entity computing system 109 can generate service code 289 associated with the authentication request. Service entity computing system 109 can generate service code 289 in response to determining that the authentication request is valid. Specifically, the service entity computing system 109 can generate a cryptographic nonce S associated with the authentication request (and store the nonce S in the memory system 276). Service entity computing system 109 can generate service code 289 by performing a logical xor operation on the nonce S and the nonce O. Service entity computing system 109 can send service code 289 to the vehicle computing system 103 via the second communication pathway 12.

At (514), the vehicle computing system 103 can receive the service code from the service entity computing system 109. For example, the vehicle computing system 103 can receive service code 289 from the service entity computing system 109.

At (515), the vehicle computing system 103 can generate and display a vehicle code. For example, the vehicle computing system 103 can generate second vehicle code 247 associated with the authentication request, based at least in part on service code 289. Vehicle computing system 103 can display second vehicle code 247 on the display device(s) 248. Vehicle computing system 103 can generate second vehicle code 247 in response to receiving service code 289 from the service entity computing system 109. Specifically, the vehicle computing system 103 can perform a logical xor operation on service code 289 (S (xor) O) and the nonce N associated with the authentication request that was previously generated by the vehicle computing system 103. In some implementations, the vehicle computing system 103 can generate a bar code, two-dimensional code (e.g., QR code), or other visual representation of second vehicle code 247, and display the bar code, two-dimensional code, or other visual representation of signed vehicle code 247 on the display device(s) 248.

At (516), the user device 105 can receive input including the vehicle code. For example, the user device 105 can receive an input including second vehicle code 247 in response to second vehicle code 247 being displayed on the display device(s) 248. If the vehicle computing system 103 displays a bar code, two-dimensional code, or other visual representation, then the vehicle operator application 269 can display a scanner interface (e.g., that uses a camera attached to the user device 105), and the vehicle operator 50 can use the scanner interface to scan second vehicle code 247 being displayed on the display device(s) 248. User device 105 can process the scan (e.g., image data representing second vehicle code 247) using various techniques to decipher the bar code, two-dimensional code, or other visual representation and obtain second vehicle code 247. If the vehicle computing system 103 displays a sequence of alphanumeric characters on the display device(s) 248, then the vehicle operator 50 can manually input the sequence into the user device 105, or the vehicle operator 50 can use the scanner interface to scan the sequence of alphanumeric characters and process the scan using optical character recognition to obtain second vehicle code 247.

At (517), the user device 105 can generate and send second operator data to the service entity computing system 109. For example, the user device 105 can generate second operator data 266 associated with the authentication request, based at least in part on second vehicle code 247, in response to receiving the input including second vehicle code 247. Second operator data 266 can include vehicle identifier 267 and second operator code 268. Vehicle identifier 267 can represent a copy or reference to vehicle identifier 260. User device 105 can generate second operator code 268 (S (xor) N) by performing a logical xor operation on second vehicle code 247 (S (xor) O (xor) N) and the nonce O associated with the authentication request that was previously generated by the user device 105. User device 105 can send second operator data 268 to the service entity computing system 109 via the first communication pathway 11.

At (518), the service entity computing system 109 can receive the second operator data from the user device 105. For example, the service entity computing system 109 can receive second operator data 266 from the user device 105. If vehicle identifier 267 matches vehicle identifier 280, then the service entity computing system 109 can generate second operator code 290. Second operator code 290 can represent a copy or reference to second operator code 268. If vehicle identifier 267 does not match vehicle identifier 280, then the service entity computing system 109 can determine that authentication result 292 is negative and skip to (524).

At (519), the service entity computing system 109 can generate and send an intermediate result to the vehicle computing system 103. For example, the service entity computing system 109 can generate intermediate result 291 by performing a logical xor operation on second operator code 290 (S (xor) N), the nonce S associated with the authentication request that was previously generated by the service entity computing system 109, and first vehicle code 282 (N (xor) V_k). Service entity computing system 109 can send intermediate result 291 (V_k) to the vehicle computing system 103 via the second communication pathway 12.

At (520), the vehicle computing system 103 can receive the intermediate result from the service entity computing system 109. For example, the vehicle computing system 103 can receive intermediate result 291 from the service entity computing system 109.

At (521), the vehicle computing system 103 can generate and send an authentication result to the service entity computing system 109. For example, the vehicle computing system 103 can generate authentication result 250 in response to receiving intermediate result 291. Specifically, the vehicle computing system 103 can determine if intermediate result 291 matches the nonce V_k associated with the authentication request that was previously generated by the vehicle computing system 103. If intermediate result 291 matches the nonce V_k, then the vehicle computing system 103 can determine that authentication result 250 is positive. If intermediate result 291 does not match the nonce V_k, then the vehicle computing system 103 can determine that authentication result 250 is negative. Vehicle computing system 103 can send authentication result 250 to the service entity computing system 109 via the second communication pathway 12.

At (522), the service entity computing system 109 can receive the authentication result from the vehicle computing system 103. For example, the service entity computing system 109 can receive authentication result 250 from the vehicle computing system 103. In response to receiving authentication result 250, the service entity computing system 109 can generate authentication result 292. Authentication result 292 can represent a copy or reference to authentication result 250.

At (523), the service entity computing system 109 can complete the authentication. For example, if authentication result 292 is positive, then the service entity computing system 109 can authorize the vehicle operator 50 to provide secondary control of the vehicle 30 by generating an association between operator identifier 283 and vehicle identifier 280. If authentication result 292 is negative, then the service entity computing system 109 can determine that the authentication has failed, and the vehicle operator 50 can be denied access to and/or operation control of the vehicle 30.

At (524), the service entity computing system 109 can send the authentication result to the user device 105 and the vehicle computing system 103. For example, the service entity computing system 109 can send authentication result 292 to the user device 105 via the first communication pathway 11, and send authentication result 292 to the vehicle computing system 103 via the second communication pathway 12.

At (525), the user device 105 can receive the authentication result from the service entity computing system 109. For example, the user device 105 can receive authentication result 292 from the service entity computing system 109. The user device 105 can output an indication representing authentication result 292 for the vehicle operator 50 in response to receiving authentication result 292.

At (526), the vehicle computing system 103 can receive the authentication result from the service entity computing system 109. For example, the vehicle computing system 103 can receive authentication result 292 from the service entity computing system 109. If authentication result 292 is positive, then the vehicle computing system 103 can enable the vehicle operator 50 to provide secondary control of the vehicle 30.

Figure 6:
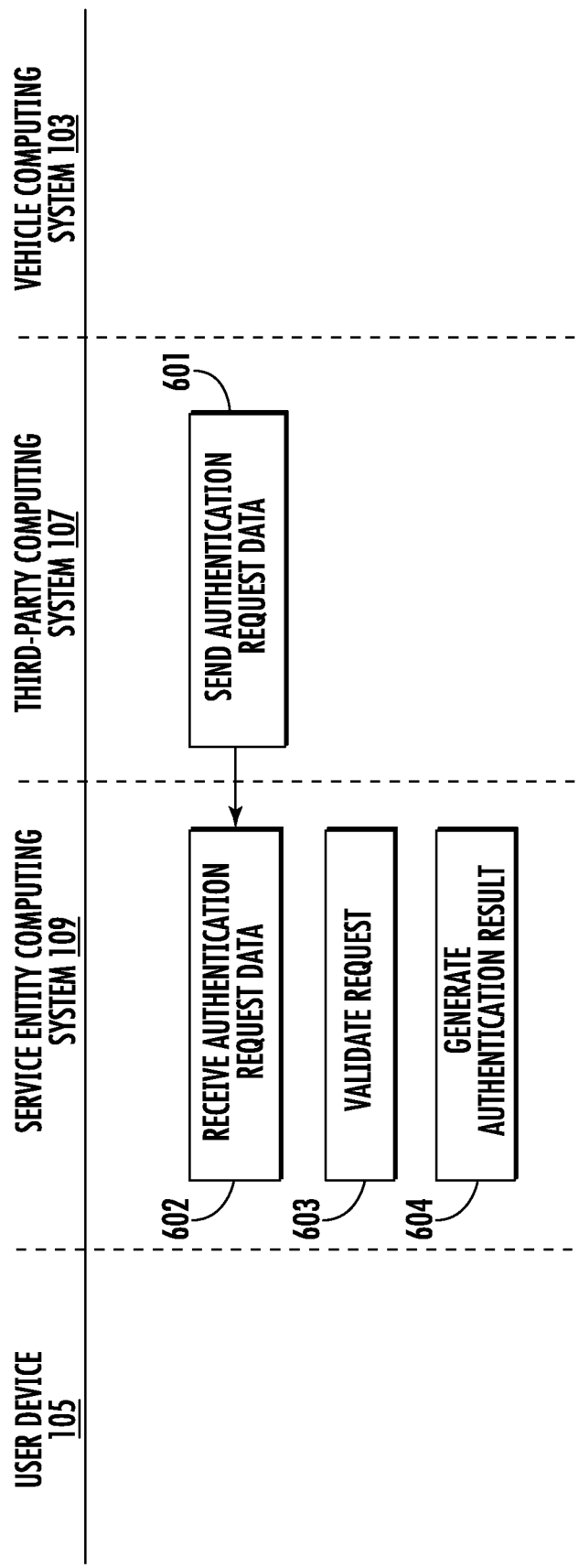
FIG. 6 depicts a flow diagram of an example method to authenticate a vehicle operator for an autonomous vehicle associated with a first security tier according to example embodiments of the present disclosure.

FIG. 6 depicts an example flow diagram of an authentication procedure to authenticate a vehicle operator for a vehicle in a third-party fleet that is associated with a first security tier. At (601), the third-party computing system 107 can generate and send authentication request data to the service entity computing system 109. For example, the third-party computing system 107 can be associated with a third-party entity that operates and/or manages a third-party fleet. The vehicle 30 and the vehicle operator 50 can be associated with the third-party fleet and the third-party entity. Third-party computing system 107 can communicate with vehicle computing system 103 and/or user device 105 to obtain information associated with an authentication request, such as a vehicle identifier associated with the vehicle 30 and an operator identifier associated with the vehicle operator 50. Third-party computing system 107 can generate the authentication request data based on the obtained information, and send the authentication request data to service entity computing system 109.

In some implementations, the vehicle operator 50 can load the vehicle operator application 269 on the user device 105. The vehicle operator 50 can sign-in to their vehicle operator account via the vehicle operator application 269 by inputting predetermined credential information (e.g., username and password) associated with the vehicle operator 50. User device 105 (e.g., vehicle operator application 269) can send the credentials provided by the vehicle operator 50 to the third-party computing system 107. In response, the third-party computing system 107 can send an authentication token to the user device 105 for the vehicle operator application 269 to use in subsequent communications from the user device 105 to the third-party computing system 107.

In some implementations, user device 105 can generate first operator data 258 associated with the authentication request in response to the vehicle operator 50 initiating the authentication request by signing-in via the vehicle operator application 269 and arriving (with the user device 105) at a location that is proximate to the vehicle 30 (e.g., within a threshold distance from the vehicle 30).

First operator data 258 can include operator identifier 259 and vehicle identifier 260. Operator identifier 259 can include an operator identifier associated with the vehicle operator account corresponding to the credential information provided by the vehicle operator 50. User device 105 can receive data representing operator identifier 259 from the service entity computing system 109 in response to sending the credential information (e.g., as part of the authentication token). Vehicle identifier 260 can include a vehicle identifier associated with the vehicle 30. User device 105 can determine vehicle identifier 260 based at least in part on input by the vehicle operator 50. For example, the vehicle operator 50 can select the vehicle 30 from a list of vehicles. User device 105 can display the list of vehicles for the vehicle operator 50, and prompt the vehicle operator 50 to select a vehicle from the list).

User device 105 can send first operator data 258 to the third-party computing system 107. In response, the third-party computing system 107 can generate the authentication request data based on first operator data 258. The authentication request data can represent a copy or reference to operator identifier 259 and vehicle identifier 260 in first operator data 258. Third-party computing system 107 can send the authentication request data to the service entity computing system 109 via the third communication pathway(s) 13.

At (602), the service entity computing system 109 can receive authentication request data from the third-party computing system 107. For example, the service entity computing system 109 can receive the authentication request data from the third-party computing system 107. In response, the service entity computing system 109 can generate authentication request data 279 associated with the authentication request. Specifically, the service entity computing system 109 can generate operator identifier 283 and vehicle identifier 286. Operator identifier 283 can represent a copy or reference to operator identifier 259, and vehicle identifier 286 can represent a copy or reference to vehicle identifier 260.

At (603), the service entity computing system 109 can validate the authentication request. For example, the service entity computing system 109 can validate the authentication request based at least in part on authentication request data 279 and security tier data 293. In some implementations, the service entity computing system 109 can determine the set of authentication procedures corresponding to the first security tier (e.g., the first set of authentication procedures) based at least in part on the predetermined set of security tiers stored in security level data 293. The first set of authentication procedures can include, for example, the service entity computing system 109 determining whether the vehicle operator account associated with the operator identifier 283 and the vehicle account associated with the vehicle identifier 286 are valid accounts and belong to the same fleet, and whether the vehicle 30 is configured to provide a vehicle service at the first security tier.

In some implementations, security tier data 293 can include a predetermined clearance/trust level associated with the third-party entity. If the predetermined clearance/trust level is above a threshold value associated with the first security tier, then the service entity computing system 109 can determine that the authentication request is valid without validating the authentication request based at least in part on authentication request data 279 and security tier data 293.

At (604), the service entity computing system 109 can generate an authentication result. For example, the service entity computing system 109 can generate authentication result 292 based at least in part on the validity of the authentication request. If the service entity computing system 109 determines that the authentication request is valid, then the service entity computing system 109 can determine that authentication result 292 is positive. If the service entity computing system 109 determines that the authentication request is not valid, then the service entity computing system 109 can determine that authentication result 292 is negative. If authentication result 292 is positive, then the service entity computing system 109 can authorize the vehicle operator 50 to provide secondary control of the vehicle 30 by generating an association between operator identifier 283 and vehicle identifier 286 (e.g., in vehicle operator data 277 and/or autonomous vehicle data 278). If authentication result 292 is negative, then the service entity computing system 109 can determine that the authentication has failed, and the vehicle operator 50 can be denied access to and/or operation control of the vehicle 30.

Figure 7:
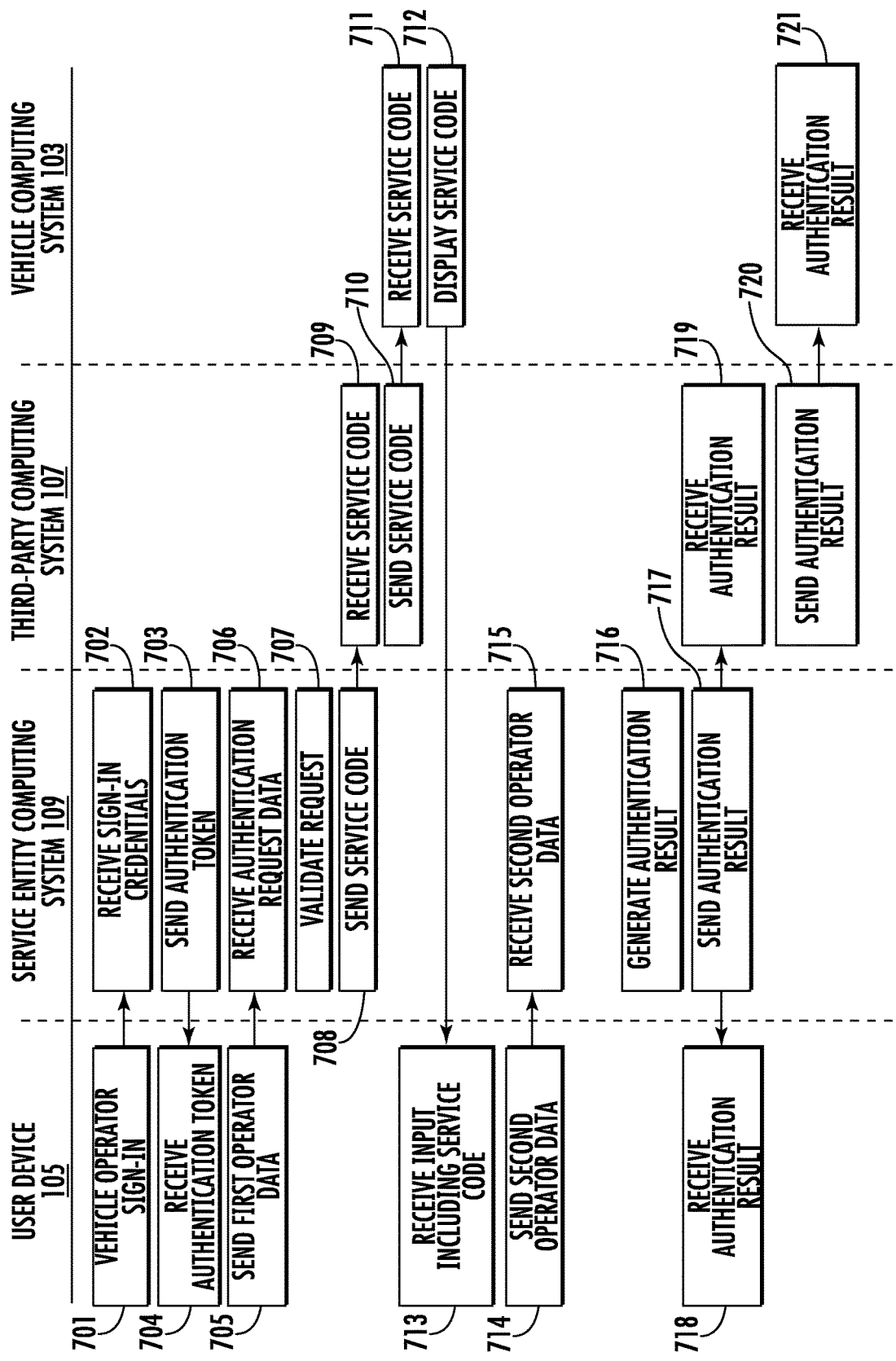
FIG. 7 depicts a flow diagram of an example method to authenticate a vehicle operator for an autonomous vehicle associated with a second security tier according to example embodiments of the present disclosure.

FIG. 7 depicts an example flow diagram of an authentication procedure to authenticate a vehicle operator for a vehicle in a third-party fleet that is associated with a second security tier. At (701), the vehicle operator 50 can sign-in.

For example, the vehicle operator 50 can load the vehicle operator application 269 on the user device 105. The vehicle operator 50 can sign-in to a vehicle operator account via the vehicle operator application 269 by providing predetermined credential information (e.g., username and password) associated with the vehicle operator 50. User device 105 (e.g., vehicle operator application 269) can send the credentials provided by the vehicle operator 50 to the service entity computing system 109 via the first communication pathway 11. In some implementations, the user device 105 can send the credentials provided by the vehicle operator 50 to the third-party computing system 107, as discussed with respect to element (601) in FIG. 6, and the third-party computing system 107 can communicate with the service entity computing system 109 via the third communication pathway(s) on behalf of the user device 105 (and on behalf of the vehicle computing system 103).

At (702), the service entity computing system 109 can receive sign-in credentials from the user device 105. For example, the service entity computing system 109 can receive the predetermined credentials (e.g., username and password) that the vehicle operator 50 input via the vehicle operator application 269 on the user device 105.

At (703), the service entity computing system 109 can send an authentication token to the user device 105. For example, the service entity computing system 109 can search for a vehicle operator account associated with the credentials received from the user device 105. Service entity computing system 109 can identify the vehicle operator account based at least in part on vehicle operator data 277. If the vehicle operator account is valid (e.g., if the account exists and the account status is active), then the service entity computing system 109 can send an authentication token to the user device 105. The authentication token can indicate a confidence level that the vehicle operator account belongs to the vehicle operator 50.

At (704), the user device 105 can receive the authentication token from the service entity computing system 109. For example, the user device 105 can receive the authentication token in response to sending the predetermined credentials to the service entity computing system 109. Once the user device 105 receives the authentication token, the user device 105 can use the authentication token in subsequent communications between the user device 105 and the service entity computing system 109.

At (705), the user device 105 can generate and send first operator data to the service entity computing system 109. For example, the user device 105 can generate first operator data 258 associated with an authentication request in response to the vehicle operator 50 initiating the authentication request by signing-in via the vehicle operator application 269 and arriving (with the user device 105) at a location that is proximate to the vehicle 30 (e.g., within a threshold distance from the vehicle 30).

First operator data 258 can include operator identifier 259 and vehicle identifier 260. Operator identifier 259 can include an operator identifier associated with the vehicle operator account corresponding to the credential information provided by the vehicle operator 50. User device 105 can receive data representing operator identifier 259 from the service entity computing system 109 in response to sending the credential information (e.g., as part of the authentication token). Vehicle identifier 260 can include a vehicle identifier associated with the vehicle 30. User device 105 can determine vehicle identifier 260 based at least in part on input by the vehicle operator 50. For example, the vehicle operator 50 can select the vehicle 30 from a list of vehicles. User device 105 can display the list of vehicles for the vehicle operator 50, and prompt the vehicle operator 50 to select a vehicle from the list). User device 105 can send first operator data 258 to the service entity computing system 109 via the first communication pathway 11.

At (706), the service entity computing system 109 can receive authentication request data. For example, the service entity computing system 109 can receive first operator data 258 from the user device 105. In response to receiving first operator data 258, the service entity computing system 109 can generate authentication request data 279. Specifically, the service entity computing system 109 can generate operator identifier 283 and vehicle identifier 286. Operator identifier 283 can represent a copy or reference to operator identifier 259 in first operator data 258. Vehicle identifier 286 can represent a copy or reference to vehicle identifier 260 in first operator data 258.

At (707), the service entity computing system 109 can validate the authentication request. For example, the service entity computing system 109 can validate the authentication request based at least in part on authentication request data 279 and security tier data 293. In some implementations, the service entity computing system 109 can determine the set of authentication procedures corresponding to the first security tier (e.g., the first set of authentication procedures) based at least in part on the predetermined set of security tiers stored in security level data 293. The first set of authentication procedures can include, for example, the service entity computing system 109 determining whether the vehicle operator account associated with the operator identifier 283 and the vehicle account associated with the vehicle identifier 286 are valid accounts and belong to the same fleet, and whether the vehicle 30 is configured to provide a vehicle service at the first security tier.

In some implementations, security tier data 293 can include a predetermined clearance/trust level associated with the third-party entity. If the predetermined clearance/trust level is above a threshold value associated with the first security tier, then the service entity computing system 109 can determine that the authentication request is valid without validating the authentication request based at least in part on authentication request data 279 and security tier data 293.

At (708), the service entity computing system 109 can generate and send a service code to the third-party computing system 107. For example, the service entity computing system 109 can generate service code 289 associated with the authentication request. Service entity computing system 109 can generate service code 289 in response to determining that the authentication request is valid. Service entity computing system 109 can generate service code 289 based at least in part on a one-time password (e.g., a randomly generated code), and send service code 289 to the third-party computing system 107 via the third communication pathway(s) 13. Third-party computing system 107 can be associated with a third-party entity that operates and/or manages a third-party fleet. The vehicle 30 and the vehicle operator 50 can be associated with the third-party fleet and the third-party entity.

At (709), the third-party computing system 107 can receive the service code from the service entity computing system 109. For example, the third-party computing system 107 can receive service code 289 from the service entity computing system 109.

At (710), the third-party computing system 107 can send the service code to the vehicle computing system 103. For example, the third-party computing system 107 can send service code 289 to the vehicle computing system 103.

At (711), the vehicle computing system 103 can receive the service code from the third-party computing system 107. For example, the vehicle computing system 103 can receive service code 289 from the third-party computing system 107.

At (712), the vehicle computing system 103 can display the service code. For example, the vehicle computing system 103 can display service code 289 in response to receiving service code 289 from the third-party computing system 107. If service code 289 includes a sequence of alphanumeric characters, then the vehicle computing system 103 can display service code 289 by displaying the sequence on display device(s) 248. In some implementations, the vehicle computing system 103 can generate a two-dimensional code (e.g., QR code) based on service code 289. Vehicle computing system 103 can output service code 289 by displaying the two-dimensional code on the display device(s) 248. Alternatively, the vehicle computing system 103 can generate a bar code or other visual representation based on service code 289, and display service code 289 by displaying the bar code or other visual representation on the display device(s) 248.

At (713), the user device 105 can receive input including the service code. For example, the user device 105 can receive input including service code 289 in response to service code 289 being displayed by the vehicle computing system 103. If the vehicle computing system 103 displays a bar code, two-dimensional code, or other visual representation based on service code 289, then the vehicle operator application 269 can display a scanner interface (e.g., that uses a camera attached to the user device 105), and the vehicle operator 50 can use the scanner interface to scan service code 289 being displayed on the display device(s) 248. User device 105 can process the scan (e.g., image data representing service code 289) using various techniques to decipher the bar code, two-dimensional code, or other visual representation and obtain service code 289. If the vehicle computing system 103 displays a sequence of alphanumeric characters on the display device(s) 248, then the vehicle operator 50 can manually input the sequence into the user device 105, or the vehicle operator 50 can use the scanner interface to scan the sequence of alphanumeric characters and process the scan using optical character recognition to obtain service code 289.

At (714), the user device 105 can generate and send second operator data to the service entity computing system 109. For example, the user device 105 can generate second operator data 266 associated with the authentication request in response to receiving the input including service code 289. Second operator data 266 can include vehicle identifier 267 and second operator code 268. Vehicle identifier 267 can represent a copy or reference to vehicle identifier 260. Second operator code 268 can represent a copy or reference to service code 289. User device 105 can send second operator data 266 to the service entity computing system 109 via the first communication pathway 11.

At (715), the service entity computing system 109 can receive the second operator data from the user device 105. For example, the service entity computing system 109 can receive second operator data 266 from the user device 105. In response to receiving second operator data 266, the service entity computing system 109 can generate second operator code 290. Second operator code 290 can represent a copy or reference to second operator code 268 in second operator data 266.

At (716), the service entity computing system 109 can generate an authentication result. For example, the service entity computing system 109 can generate authentication result 292 for the authentication request associated with authentication request data 279, based at least in part on second operator data 266. Service entity computing system 109 can check if vehicle identifier 267 matches vehicle identifier 286, and if so, then the service entity computing system 109 can check if second operator code 290 matches service code 289. If second operator code 290 matches service code 289, then the service entity computing system 109 can determine that authentication result 292 is positive. If vehicle identifier 267 does not match vehicle identifier 286, or if second operator code 290 does not match service code 289, then the service entity computing system 109 can determine that authentication result 292 is negative. If authentication result 292 is positive, then the service entity computing system 109 can authorize the vehicle operator 50 to provide secondary control of the vehicle 30 by generating an association between operator identifier 283 and vehicle identifier 286 (e.g., in vehicle operator data 277 and/or autonomous vehicle data 278). If authentication result 292 is negative, then the service entity computing system 109 can determine that the authentication has failed, and the vehicle operator 50 can be denied access to and/or operation control of the vehicle 30.

At (717), the service entity computing system 109 can send the authentication result to the user device 105 and the third-party computing system 107. For example, the service entity computing system 109 can send authentication result 292 to the user device 105 via the first communication pathway 11, and send authentication result 292 to the third-party computing system 107 via the third communication pathway(s) 13.

At (718), the user device 105 can receive the authentication result from the service entity computing system 109. For example, the user device 105 can receive authentication result 292 from the service entity computing system 109. User device 105 can output an indication representing authentication result 292 for the vehicle operator 50 in response to receiving authentication result 292.

At (719), the third-party computing system 107 can receive the authentication result from the service entity computing system 109. For example, the third-party computing system 107 can receive authentication result 292 from the service entity computing system 109. If authentication result 292 is positive, then the third-party computing system 107 can enable the vehicle operator 50 to provide secondary control of the vehicle 30.

At (720), the third-party computing system 107 can send the authentication result to the vehicle computing system 103. For example, the third-party computing system 107 can send authentication result 292 to the vehicle computing system 103.

At (721), the vehicle computing system 103 can receive the authentication result from the third-party computing system 107. For example, the vehicle computing system 103 can receive authentication result 292 from the third-party computing system 107. If authentication result 292 is positive, then the vehicle computing system 103 can enable the vehicle operator 50 to provide secondary control of the vehicle 30.

Figure 8A:
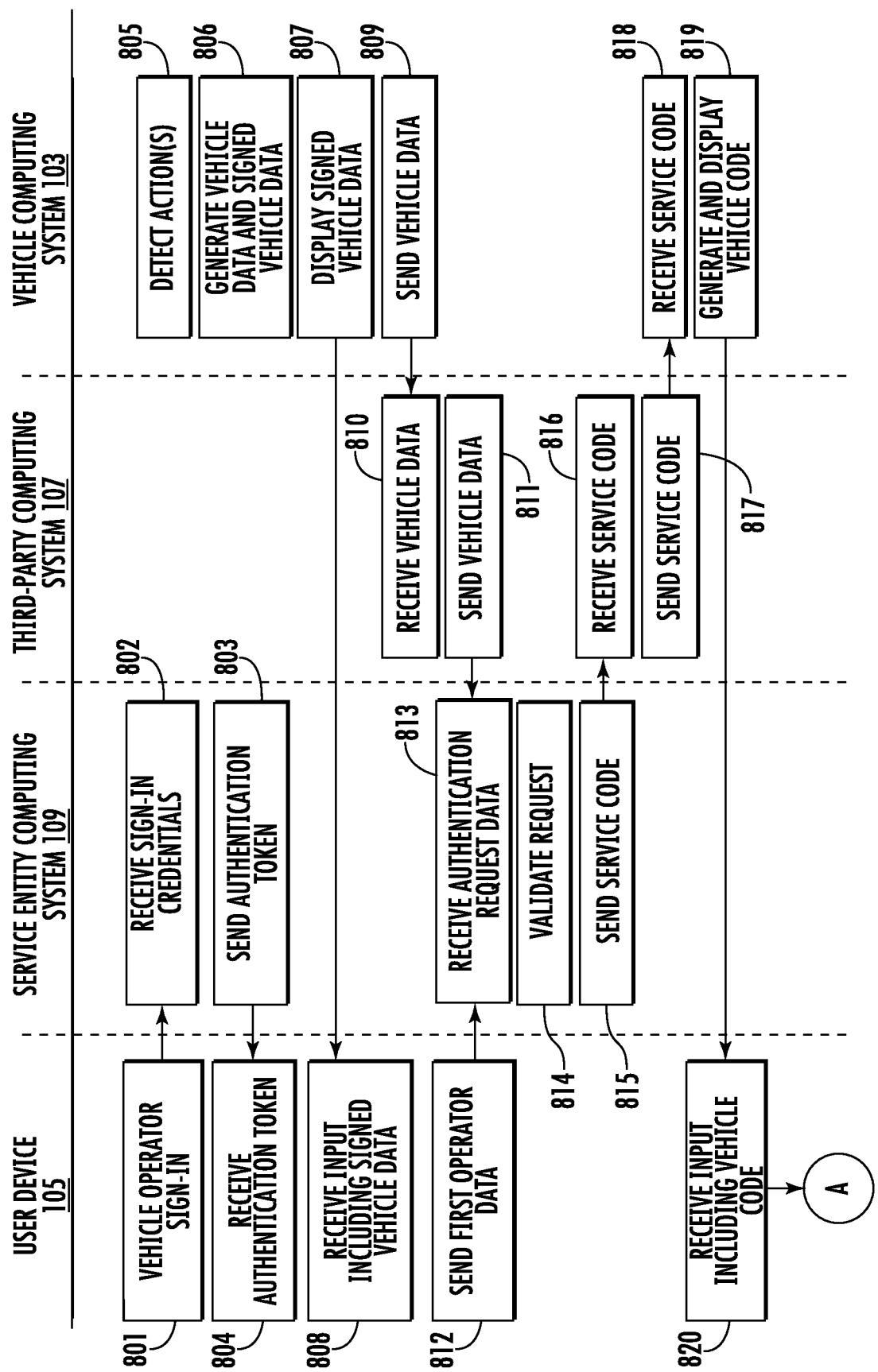
FIG. 8A-8B depict a flow diagram of an example method to authenticate a vehicle operator for an autonomous vehicle associated with a third security tier according to example embodiments of the present disclosure.
Figure 8B:
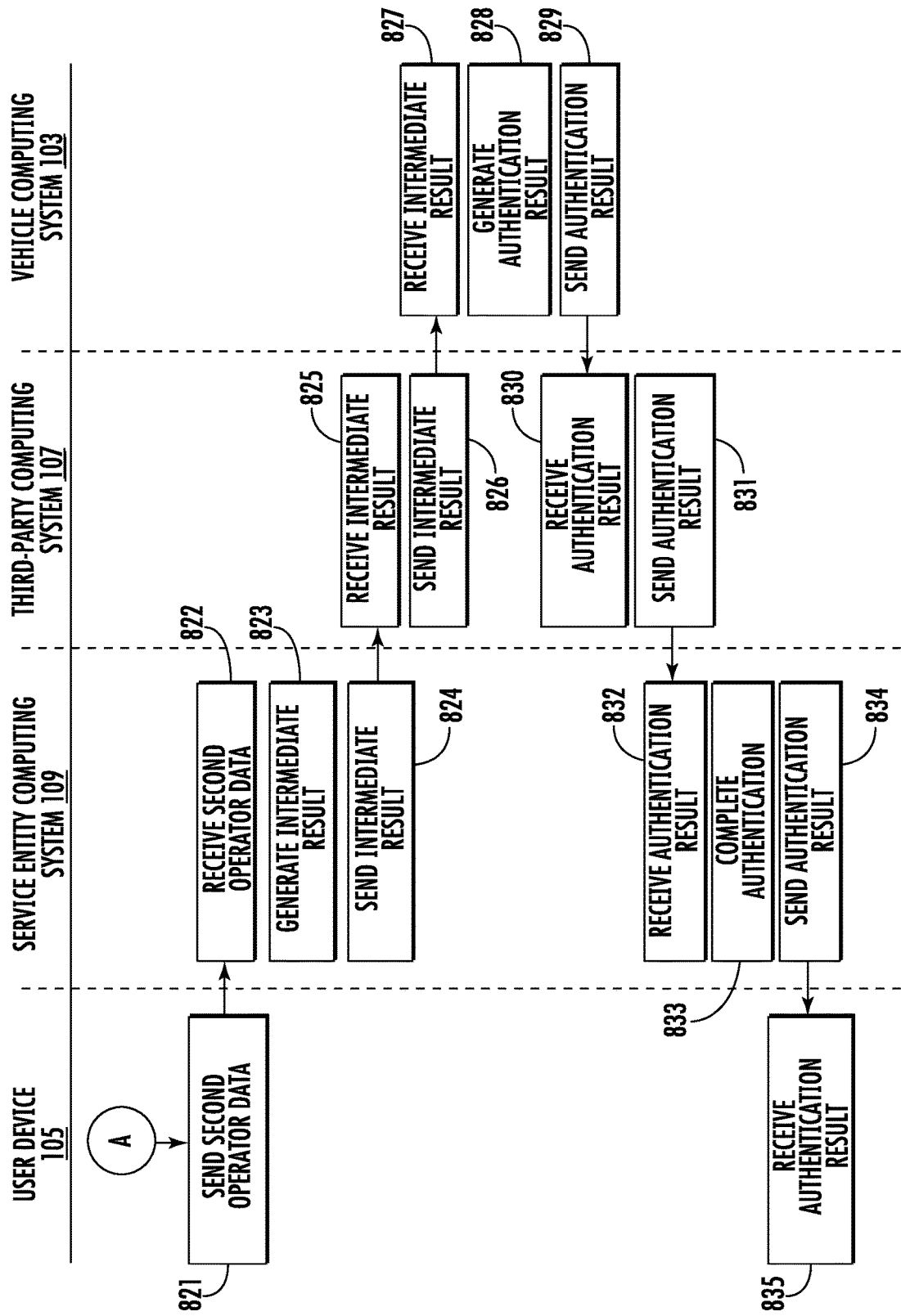

FIGS. 8A and 8B depict an example flow diagram of an authentication procedure to authenticate a vehicle operator for a vehicle in a third-party fleet that is associated with a third security tier. At (801), the vehicle operator 50 can sign-in. For example, the vehicle operator 50 can load the vehicle operator application 269 on the user device 105. The vehicle operator 50 can sign-in to a vehicle operator account via the vehicle operator application 269 by providing predetermined credential information (e.g., username and password) associated with the vehicle operator 50. User device 105 (e.g., vehicle operator application 269) can send the credentials provided by the vehicle operator 50 to the service entity computing system 109 via the first communication pathway 11. In some implementations, the user device 105 can send the credentials provided by the vehicle operator 50 to the third-party computing system 107, as discussed with respect to element (601) in FIG. 6, and the third-party computing system 107 can communicate with the service entity computing system 109 via the third communication pathway(s), on behalf of the user device 105 (and on behalf of the vehicle computing system 103).

At (802), the service entity computing system 109 can receive sign-in credentials from the user device 105. For example, the service entity computing system 109 can receive the predetermined credentials (e.g., username and password) that the vehicle operator 50 input via the vehicle operator application 269 on the user device 105.

At (803), the service entity computing system 109 can send an authentication token to the user device 105. For example, the service entity computing system 109 can search for a vehicle operator account associated with the credentials received from the user device 105. Service entity computing system 109 can identify the vehicle operator account based at least in part on vehicle operator data 277. If the vehicle operator account is valid (e.g., if the account exists and the account status is active), then the service entity computing system 109 can send an authentication token to the user device 105. The authentication token can indicate a confidence level that the vehicle operator account belongs to the vehicle operator 50.

At (804), the user device 105 can receive the authentication token from the service entity computing system 109. For example, the user device 105 can receive the authentication token in response to sending the predetermined credentials to the service entity computing system 109. Once the user device 105 receives the authentication token, the user device 105 can use the authentication token in subsequent communications between the user device 105 and the service entity computing system 109.

At (805), the vehicle computing system 103 can detect one or more actions indicative of an authentication request. For example, the vehicle computing system 103 can detect one or more actions by the vehicle operator 50 indicative of the authentication request. The action(s) by the vehicle operator 50 detected by the vehicle computing system 103 can include (as a non-limiting set of examples) detecting the vehicle operator 50 entering into the vehicle 30, detecting the vehicle operator 50 sitting in a driver's seat of the vehicle 30, and detecting the vehicle operator 50 fastening a driver's seatbelt.

At (806), the vehicle computing system 103 can generate vehicle data and signed vehicle data. For example, the vehicle computing system 103 can generate vehicle data 242 and signed vehicle data 246 associated with the authentication request. Vehicle computing system 103 can generate vehicle data 242 and signed vehicle data 246 in response to detecting the action(s) by the vehicle operator 50 indicative of the authentication request.

Vehicle data 242 can include vehicle identifier 243, vehicle timestamp 244, and first vehicle code 245. Vehicle identifier 243 can represent a copy or reference to a predetermined vehicle identifier associated with the vehicle 30. The predetermined vehicle identifier can stored at a predetermined location in memory 326. In some implementations, the predetermined vehicle identifier can be assigned to the vehicle 30 by the service entity (e.g., via the service entity computing system 109) or the third-party entity (e.g., via the third-party computing system 107), and provided to the vehicle computing system 103 at an earlier time. Vehicle timestamp 244 can indicate a time when the vehicle computing system 103 detects the action(s) by the vehicle operator 50 indicative of the authentication request. First vehicle code 245 can represent a result of an operation performed on two or more cryptographic nonces. Specifically, the vehicle computing system 103 can generate a cryptographic nonce N and a cryptographic nonce V_k associated with the authentication request (and store the nonce N and the nonce V_k in memory 216), and the vehicle computing system 103 can perform a logical xor operation on the nonce N and the nonce V_k to generate first vehicle code 245.

Signed vehicle data 246 can be based at least in part on vehicle data 242 and private key 240. Vehicle computing system 103 can obtain private key 240 associated with the vehicle 30 from the trusted platform module 238 onboard the vehicle 30, and generate signed vehicle data 246 by signing vehicle data 242 with private key 240. In some implementations, the vehicle computing system 103 can generate signed vehicle data 246 by signing a portion of vehicle data 246 with private key 240, such as vehicle identifier 243 and/or vehicle timestamp 244. Signed vehicle data 263 can include vehicle identifier 264 and vehicle timestamp 265. Vehicle identifier 264 can represent vehicle identifier 243 signed with private key 240, and vehicle timestamp 265 can represent vehicle timestamp 244 signed with private key 240.

At (807), the vehicle computing system 103 can display the signed vehicle data. For example, the vehicle computing system 103 can generate a bar code, two-dimensional code (e.g., QR code), or other visual representation of signed vehicle data 246, and display the bar code, two-dimensional code, or other visual representation of signed vehicle data 246 on the display device(s) 248.

At (808), the user device 105 can receive input including the signed vehicle data. For example, the user device 105 can receive an input including signed vehicle data 246 in response to signed vehicle data 246 being displayed by the vehicle computing system 103. If the vehicle computing system 103 displays a bar code, two-dimensional code, or other visual representation, then the vehicle operator application 269 can display a scanner interface (e.g., that uses a camera attached to the user device 105), and the vehicle operator 50 can use the scanner interface to scan signed vehicle data 246 being displayed on the display device(s) 248. User device 105 can process the scan (e.g., image data representing signed vehicle data 246) using various techniques to decipher the bar code, two-dimensional code, or other visual representation and obtain signed vehicle data 246. If the vehicle computing system 103 displays a sequence of alphanumeric characters on the display device(s) 248, then the vehicle operator 50 can manually input the sequence into the user device 105, or the vehicle operator 50 can use the scanner interface to scan the sequence of alphanumeric characters and process the scan using optical character recognition to obtain signed vehicle data 246.

At (809), the vehicle computing system 103 can send the vehicle data to the third-party computing system 107. For example, the vehicle computing system 103 can send vehicle data 242 to the third-party computing system 107.

At (810), the third-party computing system 107 can receive the vehicle data from the vehicle computing system 103. For example, the third-party computing system 107 can receive vehicle data 242 from the vehicle computing system 103.

At (811), the third-party computing system 107 can send the vehicle data to the service entity computing system 109. For example, the third-party computing system 107 can send vehicle data 242 (received from the vehicle computing system 103) to the service entity computing system 109 via the third communication pathway(s) 13.

At (812), the user device 105 can generate and send first operator data to the service entity computing system 109. For example, the user device 105 can generate first operator data 258 associated with the authentication request in response to the vehicle operator 50 initiating the authentication request by signing-in via the vehicle operator application 269, arriving with the user device 105 at a location that is proximate to the vehicle 30 (e.g., within a threshold distance from the vehicle 30), and providing the input including signed vehicle data 246. User device 105 can send first operator data 258 to the service entity computing system 109 via the first communication pathway 11.

First operator data 258 can include signed vehicle data 263. User device 105 can generate signed vehicle data 263 in response to obtaining signed vehicle data 246 from the vehicle 30. Signed vehicle data 263 can represent a copy or reference to signed vehicle data 246. In some implementations, signed vehicle data 263 can include vehicle identifier 264 and/or vehicle timestamp 265. If signed vehicle data 246 includes vehicle identifier 243 and/or vehicle timestamp 244, then user device 105 can generate vehicle identifier 264 and/or vehicle timestamp 265, respectively. Vehicle identifier 264 can represent a copy or reference to vehicle identifier 243, and vehicle timestamp 265 can represent a copy or reference to vehicle timestamp 244.

First operator data 258 can include operator identifier 259. Operator identifier 259 can include an operator identifier associated with the vehicle operator account corresponding to the credential information provided by the vehicle operator 50. User device 105 can receive data representing operator identifier 259 from the service entity computing system 109 in response to sending the credential information (e.g., as part of the authentication token).

First operator data 258 can include operator timestamp 261. Operator timestamp 261 can indicate a time when the user device 105 receives the input including signed vehicle data 246, and/or when the user device 105 sends first operator data 258 to the service entity computing system 109.

First operator data 258 can include first operator code 262. Specifically, the user device 105 can generate a cryptographic nonce O associated with the authentication request (and store the nonce O in the memory system 256). First operator code 262 can represent a copy or reference to the nonce O.

At (813), the service entity computing system 109 can receive authentication request data. The authentication request data can include the vehicle data from the third-party computing system 107 and the first operator data from the user device 105. For example, the service entity computing system 109 can receive vehicle data 242 from the third-party computing system 107, and first operator data 258 from the user device 105. In response to receiving vehicle data 242 and first operator data 258, the service entity computing system 109 can check if the signature on signed vehicle data 263 in first operator data 258 is associated with a vehicle account that corresponds to vehicle identifier 243 in vehicle data 242, based at least in part on autonomous vehicle data 278. If so, then the service entity computing system 109 can generate authentication request data 279 associated with the authentication request. Authentication request data 279 can include vehicle identifier 280, vehicle timestamp 281, first vehicle code 282, operator identifier 283, operator timestamp 284, first operator code 285, vehicle identifier 286, and vehicle timestamp 287. Vehicle identifier 280 can represent a copy or reference to vehicle identifier 243 in vehicle data 242. Vehicle timestamp 281 can represent a copy or reference to vehicle timestamp 244 in vehicle data 242. First vehicle code 282 can represent a copy or reference to first vehicle code 245 in vehicle data 242. Operator identifier 283 can represent a copy or reference to operator identifier 259 in first operator data 258. Operator timestamp 284 can represent a copy or reference to operator timestamp 261 in first operator data 258. First operator code 285 can represent a copy or reference to first operator code 262 in first operator data 258. Vehicle identifier 286 can represent a copy or reference to vehicle identifier 264 in first operator data 258. Vehicle timestamp 287 can represent a copy or reference to vehicle timestamp 265 in first operator data 258.

At (814), the service entity computing system 109 can validate the authentication request. For example, the service entity computing system 109 can validate the authentication request associated with authentication request data 279 based at least in part on security tier data 293. Specifically, the service entity computing system 109 can determine the set of authentication procedures corresponding to the third security tier (e.g., the third set of authentication procedures) based at least in part on the predetermined set of security tiers in security level data 293. The third set of authentication procedures can include, for example, the service entity computing system 109 determining whether the vehicle account associated with vehicle identifier 280 and the vehicle operator account associated with operator identifier 283 are valid accounts and belong to the same fleet, whether the vehicle 30 is configured to provide a vehicle service at the third security tier, whether the signature on signed vehicle data 263 is associated with vehicle identifier 280, whether vehicle identifier 280 matches vehicle identifier 286, whether vehicle timestamp 281 matches vehicle timestamp 287, and whether vehicle timestamp 281 is not too far in the past with respect to operator timestamp 284 (e.g., less than a threshold difference).

At (815), the service entity computing system 109 can generate and send a service code to the third-party computing system 107. For example, the service entity computing system 109 can generate service code 289 associated with the authentication request. Service entity computing system 109 can generate service code 289 in response to determining that the authentication request is valid. Specifically, the service entity computing system 109 can generate a cryptographic nonce S associated with the authentication request (and store the nonce S in the memory system 276). Service entity computing system 109 can generate service code 289 by performing a logical xor operation on the nonce S and the nonce O. Service entity computing system 109 can send service code 289 to the third-party computing system 107 via the third communication pathway(s) 13.

At (816), the third-party computing system 107 can receive the service code from the service entity computing system 109. For example, the third-party computing system 107 can receive service code 289 from the service entity computing system 109.

At (817), the third-party computing system 107 can send the service code to the vehicle computing system 103. For example, the third-party computing system 107 can send service code 289 (received from the service entity computing system 109) to the vehicle computing system 103.

At (818), the vehicle computing system 103 can receive the service code from the third-party computing system 107. For example, the vehicle computing system 103 can receive service code 289 from the third-party computing system 107

At (819), the vehicle computing system 103 can generate and display a vehicle code. For example, the vehicle computing system 103 can generate second vehicle code 247 associated with the authentication request, based at least in part on service code 289. Vehicle computing system 103 can display second vehicle code 247 on the display device(s) 248. Vehicle computing system 103 can generate second vehicle code 247 in response to receiving service code 289 from the third-party computing system 107. Specifically, the vehicle computing system 103 can perform a logical xor operation on service code 289 (S (xor) O) and the nonce N associated with the authentication request that was previously generated by the vehicle computing system 103. In some implementations, the vehicle computing system 103 can generate a bar code, two-dimensional code (e.g., QR code), or other visual representation of second vehicle code 247, and display the bar code, two-dimensional code, or other visual representation of signed vehicle code 247 on the display device(s) 248.

At (820), the user device 105 can receive input including the vehicle code. For example, the user device 105 can receive an input including second vehicle code 247 in response to second vehicle code 247 being displayed on the display device(s) 248. If the vehicle computing system 103 displays a bar code, two-dimensional code, or other visual representation, then the vehicle operator application 269 can display a scanner interface (e.g., that uses a camera attached to the user device 105), and the vehicle operator 50 can use the scanner interface to scan second vehicle code 247 being displayed on the display device(s) 248. User device 105 can process the scan (e.g., image data representing second vehicle code 247) using various techniques to decipher the bar code, two-dimensional code, or other visual representation and obtain second vehicle code 247. If the vehicle computing system 103 displays a sequence of alphanumeric characters on the display device(s) 248, then the vehicle operator 50 can manually input the sequence into the user device 105, or the vehicle operator 50 can use the scanner interface to scan the sequence of alphanumeric characters and process the scan using optical character recognition to obtain second vehicle code 247.

At (821), the user device 105 can generate and send second operator data to the service entity computing system 109. For example, the user device 105 can generate second operator data 266 associated with the authentication request, based at least in part on second vehicle code 247, in response to receiving the input including second vehicle code 247. Second operator data 266 can include vehicle identifier 267 and second operator code 268. Vehicle identifier 267 can represent a copy or reference to vehicle identifier 260. User device 105 can generate second operator code 268 (S (xor) N) by performing a logical xor operation on second vehicle code 247 (S (xor) O (xor) N) and the nonce O associated with the authentication request that was previously generated by the user device 105. User device 105 can send second operator data 268 to the service entity computing system 109 via the first communication pathway 11.

At (822), the service entity computing system 109 can receive the second operator data from the user device 105. For example, the service entity computing system 109 can receive second operator data 266 from the user device 105. If vehicle identifier 267 matches vehicle identifier 280, then the service entity computing system 109 can generate second operator code 290. Second operator code 290 can represent a copy or reference to second operator code 268. If vehicle identifier 267 does not match vehicle identifier 280, then the service entity computing system 109 can determine that authentication result 292 is negative and skip to (834).

At (823), the service entity computing system 109 can generate an intermediate result associated with the authentication request. For example, the service entity computing system 109 can generate intermediate result 291 by performing a logical xor operation on second operator code 290 (S (xor) N), the nonce S associated with the authentication request that was previously generated by the service entity computing system 109, and first vehicle code 282 (N (xor) V_k).

At (824), the service entity computing system 109 can send the intermediate result to the third-party computing system 107. For example, the service entity computing system 109 can send intermediate result 291 to the vehicle computing system 103 via the third communication pathway(s) 13.

At (825), the third-party computing system 107 can receive the intermediate result from the service entity computing system 109. For example, the third-party computing system 107 can receive intermediate result 291 from the service entity computing system 109.

At (826), the third-party computing system 107 can send the intermediate result to the vehicle computing system 103. For example, the third-party computing system 107 can send intermediate result 291 to the vehicle computing system 103.

At (827), the vehicle computing system 103 can receive the intermediate result from the third-party computing system 107. For example, the vehicle computing system 103 can receive intermediate result 291 from the third-party computing system 107.

At (828), the vehicle computing system 103 can generate an authentication result associated with the authentication request. For example, the vehicle computing system 103 can generate authentication result 250 in response to receiving intermediate result 291. Specifically, the vehicle computing system 103 can determine if intermediate result 291 matches the nonce V_k associated with the authentication request that was previously generated by the vehicle computing system 103. If intermediate result 291 matches the nonce V_k, then the vehicle computing system 103 can determine that authentication result 250 is positive. If intermediate result 291 does not match the nonce V_k, then the vehicle computing system 103 can determine that authentication result 250 is negative.

At (829), the vehicle computing system 103 can send the authentication result to the third-party computing system 107. For example, the vehicle computing system 103 can send authentication result 250 to the third-party computing system 107.

At (830), the third-party computing system 107 can receive the authentication result from the vehicle computing system 103. For example, the third-party computing system 107 can receive authentication result 250 from the vehicle computing system 103.

At (831), the third-party computing system 107 can send the authentication result to the service entity computing system 109. For example, the third-party computing system 107 can send authentication result 250 to the service entity computing system 109 via the third communication pathway(s) 13.

At (832), the service entity computing system 109 can receive the authentication result from the third-party computing system 107. For example, the service entity computing system 109 can receive authentication result 250 from the third-party computing system 107. In response to receiving authentication result 250, the service entity computing system 109 can generate authentication result 292. Authentication result 292 can represent a copy or reference to authentication result 250.

At (833), the service entity computing system 109 can complete the authentication. For example, if authentication result 292 is positive, then the service entity computing system 109 can authorize the vehicle operator 50 to provide secondary control of the vehicle 30 by generating an association between operator identifier 283 and vehicle identifier 280. If authentication result 292 is negative, then the service entity computing system 109 can determine that the authentication has failed, and the vehicle operator 50 can be denied access to and/or operation control of the vehicle 30.

At (834), the service entity computing system 109 can send the authentication to the user device 105. For example, the service entity computing system 109 can send authentication result 292 to the user device 105 via the first communication pathway 11.

At (835), the user device 105 can receive the authentication result from the service entity computing system 109. For example, the user device 105 can receive authentication result 292 from the service entity computing system 109. The user device 105 can output an indication representing authentication result 292 for the vehicle operator 50 in response to receiving authentication result 292.

Figure 9:
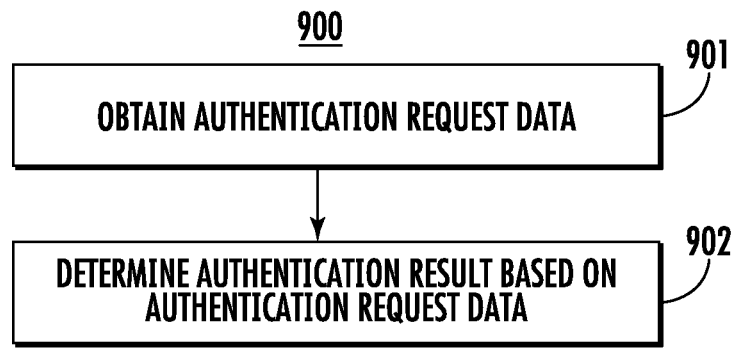
FIG. 9 depicts a flow diagram of an example method to authenticate a vehicle operator for an autonomous vehicle associated with a first security tier according to example embodiments of the present disclosure.
Figure 10:
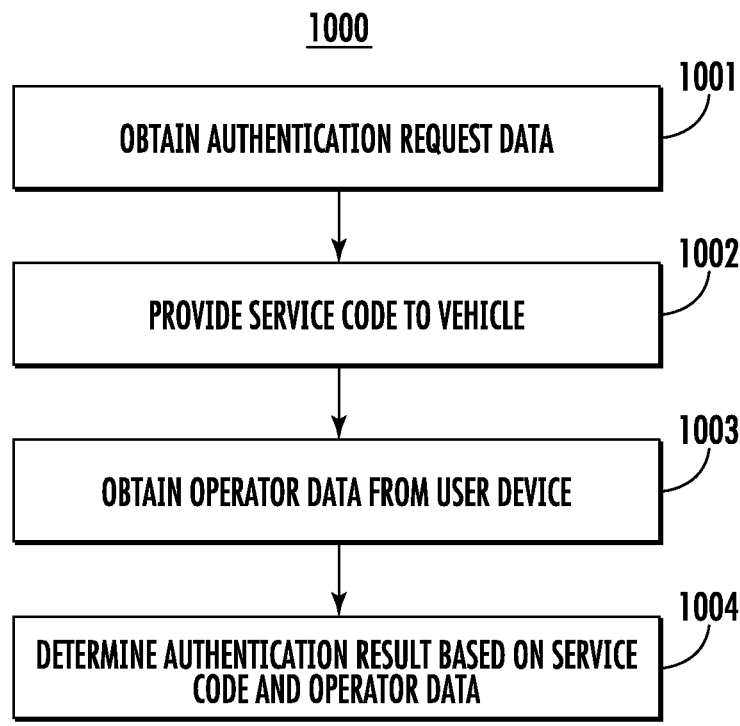
FIG. 10 depicts a flow diagram of an example method to authenticate a vehicle operator for an autonomous vehicle associated with a second security tier according to example embodiments of the present disclosure.
Figure 11:
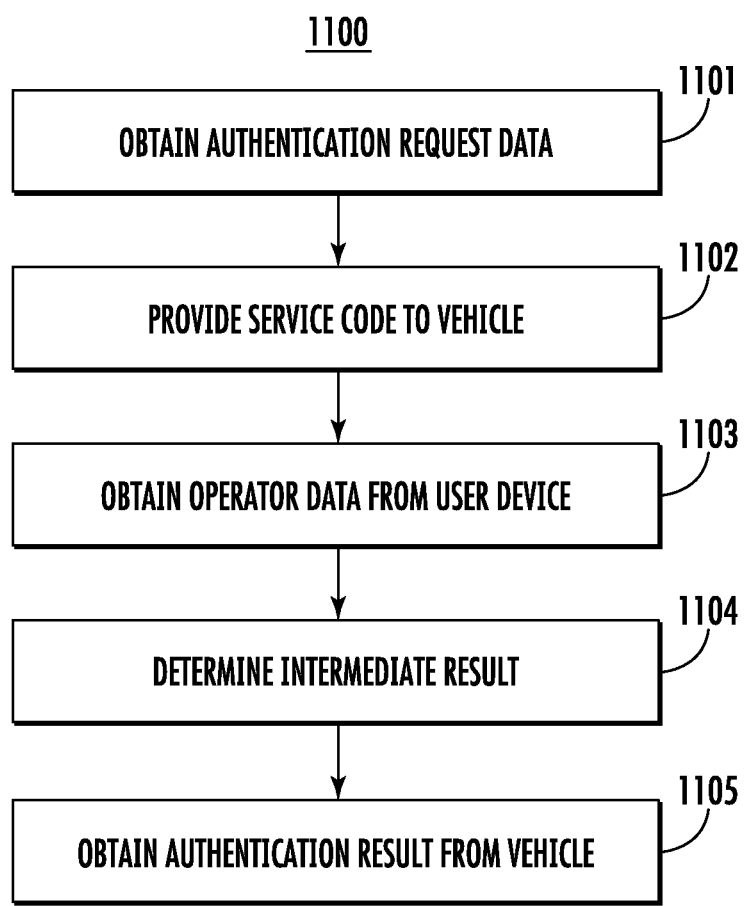
FIG. 11 depicts a flow diagram of an example method to authenticate a vehicle operator for an autonomous vehicle associated with a third security tier according to example embodiments of the present disclosure.

FIGS. 9-11 depict flow diagrams of example methods 900, 1000, and 1100 for authenticating a vehicle operator for an autonomous vehicle, according to example embodiments of the present disclosure. One or more portion(s) of the methods 900, 1000, and 1100 can be implemented as operations by one or more computing system(s) such as computing system(s) 103, 105, 107, 109, and 1210 shown in FIGS. 1A-1B, 2A-2C, and 12. For example, FIGS. 3-8 illustrate certain operations being performed by specific computing systems described herein. However, it should be appreciated that such operations may generally be performed by any suitable computing system or combination of computing systems consistent with the disclosure provided herein. Moreover, one or more portion(s) of the methods 900, 1000, and 1100 can be implemented as an algorithm on the hardware components of the system(s) described herein (e.g., as in 1A-1B, 2A-2C, and 12), for example, to authenticate a vehicle operator for an autonomous vehicle. FIGS. 9-11 depict elements performed in a particular order for purposes of illustration and discussion. Those of ordinary skill in the art, using the disclosures provided herein, will understand that the elements of methods 900, 1000, and 1100 discussed herein can be adapted, rearranged, expanded, omitted, combined, and/or modified in various ways without deviating from the scope of the present disclosure.

FIG. 9 depicts a flow diagram of method 900 to authenticate a vehicle operator for an autonomous vehicle associated with a first security tier according to example embodiments of the present disclosure. At (901), the method 900 includes obtaining authentication request data. For example, the service entity computing system 109 can obtain authentication request data 279 indicative of an authentication request. Authentication request data 279 can include at least operator identifier 283 associated with the vehicle operator 50 and vehicle identifier 286 associated with vehicle 30. In some implementations, the service entity computing system 109 can obtain authentication request data 279 from the user device 105 via the first communication pathway 11. In some implementations, the service entity computing system 109 can obtain authentication request data 279 from the third-party computing system 107 via the third communication pathway(s) 13, in response to the user device 105 providing such information to the third-party computing system 107. In particular, the third-party computing system 107 can obtain first operator data 258 indicative of an authentication request. First operator data 258 can include at least operator identifier 259 associated with the vehicle operator 50 and vehicle identifier 260 associated with the vehicle 30. Third-party computing system 107 can provide first operator data 258 to the service entity computing system 109 via the third communication pathway(s) 13.

At (902), the method 900 includes determining an authentication result based on the authentication request data. For example, the service entity computing system 109 can determine a validity of the authentication request based at least in part on a security tier associated with the vehicle 30. Specifically, the service entity computing system 109 can determine whether operator identifier 283 and vehicle identifier 286 are associated with a same fleet of vehicles operated by the service entity or the third-party entity. Service entity computing system 109 can determine an authentication result 292 associated with the authentication request based at least in part on the validity of the authentication request. Authentication result 292 can indicate whether the vehicle operator 50 is authorized to provide secondary control of the vehicle 30. In some implementations, the service entity computing system 109 can provide authentication result 292 to the user device 105 via the first communication pathway 11. In some implementations, the service entity computing system 109 can provide authentication result 292 to the third-party computing system 107 via the third communication pathway(s) 13, and the third-party computing system 107 can provide authentication result 292 to the user device 105 that is associated with operator identifier 283. In particular, the third-party computing system 107 can obtain authentication result 292 from the service entity computing system 109, and in response the third-party computing system 107 can provide authentication result 292 to the user device 105.

FIG. 10 depicts a flow diagram of method 1000 to authenticate a vehicle operator for an autonomous vehicle associated with a second security tier according to example embodiments of the present disclosure. At (1001), the method 1000 includes obtaining authentication request data. For example, the service entity computing system 109 can obtain authentication request data 279 indicative of an authentication request, authentication request data 279 can include at least operator identifier 283 associated with the vehicle operator 30 and vehicle identifier 286 associated with vehicle 30. In some implementations, the service entity computing system 109 can obtain first operator data 258 associated with the authentication request. First operator data 258 can include operator identifier 259 and vehicle identifier 260. Service entity computing system 109 can obtain first operator data 258 from the user device 105 via the first communication pathway 11. Authentication request data 279 can be based at least in part on first operator data.

At (1002), the method 1000 includes providing a service code to a vehicle. For example, the service entity computing system 109 can provide service code 289 associated with the authentication request to the vehicle 30 (e.g., vehicle computing system 103) associated with vehicle identifier 286. Specifically, the service entity computing system 109 can determine a validity of the authentication request based at least in part on a security tier associated with the vehicle 30. Service entity computing system 109 can generate service code 289 in response to determining that the authentication request is valid. In some implementations, the service entity computing system 109 can provide service code 289 to the vehicle 30 (e.g., vehicle computing system 103) via the second communication pathway 12. In some implementations, the service entity computing system 109 can provide service code 289 to the third-party computing system 107 via the third communication pathway(s) 13, and the third-party computing system 107 can provide service code 289 to the vehicle 30 (e.g., vehicle computing system 103). In particular, the third-party computing system 107 can obtain service code 289 from the service entity computing system 109, determine the vehicle 30 based at least in part on vehicle identifier 286, and provide service code 289 to the vehicle 30 (e.g., vehicle computing system 103). Vehicle 30 (e.g., vehicle computing system 103) can be configured to output service code 289 via an output device (e.g., display device(s) 248) onboard the vehicle 30. User device 105 can be configured to obtain service code 289 from the vehicle 30 via the output device (e.g., display device(s) 248), and to provide second operator ode 268 (based at least in part on service code 289) to the service entity computing system 109 to authenticate the vehicle operator 50 for the vehicle 30. In some implementations, the vehicle 30 (e.g., vehicle computing system 103) can output service code 289 such that service code 289 can be entered into the user device 105.

At (1003), the method 1000 includes obtaining operator data from a user device. For example, the service entity computing system 109 can obtain second operator data 266 associated with the authentication request, in response to providing service code 289 to the vehicle 30 (e.g., vehicle computing system 103). Service entity computing system 109 can obtain second operator data 266 from the user device 105 via the first communication pathway 11. Second operator data 266 can include second operator code 268 that is indicative of service code 289 output by the vehicle 30 (e.g., vehicle computing system 103) and obtained by the user device 105.

At (1004), the method 1000 includes determining an authentication result based on the service code and the operator data. For example, in response to obtaining second operator data 266 from the user device 105, the service entity computing system 109 can generate second operator code 290 can be based at least in part on second operator code 268 in second operator data 266. Service entity computing system 109 can determine authentication result 292 associated with the authentication request based at least in part on service code 289 and second operator code 290. Specifically, the service entity computing system 109 can determine that authentication result 292 is positive when the service code in the operator data (e.g., second operator code 290) matches the service code provided to the vehicle 30 (e.g., service code 289); and the service entity computing system 109 can determine that authentication result 292 is negative when the service code in the operator data (e.g., second operator code 290) does not match the service code provided to the vehicle 30 (e.g., service code 289). If authentication result 292 is positive, then the service entity computing system 109 can generate an association between operator identifier 283 and vehicle identifier 286 to indicate that the vehicle operator 50 is authorized to provide secondary control of the vehicle 30. In some implementations, the service entity computing system 109 can provide authentication result 292 to the user device 105.

FIG. 11 depicts a flow diagram of method 1100 to authenticate a vehicle operator for an autonomous vehicle associated with a third security tier according to example embodiments of the present disclosure. At (1101), the method 1100 includes obtaining authentication request data. For example, the service entity computing system 109 can obtain authentication request data 279 indicative of an authentication request. Authentication request data 279 can include vehicle identifier 280 associated with the vehicle 30, first vehicle code 282, operator identifier 283 associated with the vehicle operator 50, and first operator code 285. In some implementations, the service entity computing system 109 can obtain vehicle data 242 from the vehicle 30 (e.g., vehicle computing system 103). Vehicle data 242 can be generated by the vehicle 30 (e.g., vehicle computing system 103) and be associated with the authentication request. Vehicle data 242 can include vehicle identifier 243, vehicle timestamp 244, and first vehicle code 245. In some implementations, the vehicle 30 (e.g., vehicle computing system 103) can be configured to generate signed vehicle data 246 based at least in part on vehicle data 242, and the vehicle 30 (e.g., vehicle computing system 103) can output signed vehicle data 246 (e.g., via the display device(s) 248). In some implementations, the service entity computing system 109 can obtain first operator data 258 from the user device 105. First operator data 258 can be generated by the user device 105 and be associated with the authentication request. First operator data 258 can include operator identifier 259, first operator code 262, and signed vehicle data 263. Specifically, the user device 105 can obtain signed vehicle data 246 from the vehicle 30, and generate signed vehicle data 263 based at least in part on signed vehicle data 246. Service entity computing system 109 can generate vehicle identifier 280, first vehicle code 282, operator identifier 283, and first operator code 285 based at least in part on vehicle data 242 and first operator data 258.

In some implementations, the third-party computing system 107 can obtain (at least) vehicle identifier 243 and first vehicle code 245 from the vehicle 30 (e.g., vehicle computing system 103), and the third-party computing system 107 can provide vehicle identifier 243 and first vehicle code 245 to the service entity computing system 109. In particular, the third-party computing system 107 can open a communication session with the service entity computing system 109 based at least in part on vehicle identifier 243 and first vehicle code 245.

At (1102), the method 1100 includes providing a service code to a vehicle. For example, the service entity computing system 109 can provide service code 289 to the vehicle 30 (e.g., vehicle computing system 103). Service code 289 can be associated with the authentication request, and the service entity computing system 109 can generate service code 289 in response to obtaining authentication request data 279. In some implementations, the service entity computing system 109 can determine a validity of the authentication request based at least in part on a security tier associated with the vehicle 30, and the service entity computing system 109 can generate service code 289 in response to determining that the authentication request is valid. Service code 289 can be based at least in part on first operator code 262. In some implementations, the vehicle 30 (e.g., vehicle computing system 103) can be configured to generate second vehicle code 247 based at least in part on service code 289, and to output second vehicle code 247 via an output device (e.g., display device(s) 248) onboard the vehicle 30. In some implementations, the user device 105 can be configured to generate second operator code 268 based at least in part on second vehicle code 247 generated by the vehicle 30 (e.g., vehicle computing system 103).

In some implementations, the third-party computing system 107 can obtain service code 289 from the service entity computing system 109. In some implementations, the service entity computing system 109 can obtain first operator data 258 during the open communication session, and service code 289 can be based at least in part on vehicle identifier 243, first vehicle code 245, and first operator data 258. Third-party computing system 107 can provide service code 289 to the vehicle 30 (e.g., vehicle computing system 103) in response to obtaining it from the service entity computing system 109.

At (1103), the method 1100 includes obtaining operator data from a user device. For example, the service entity computing system 109 can obtain second operator data 266 from the user device 105, in response to providing service code 289 to the vehicle 30 (e.g., vehicle computing system 103). Second operator data 266 can be associated with the authentication request, and can include second operator code 268.

At (1104), the method 1100 includes determining an intermediate result. For example, the service entity computing system 109 can determine intermediate result 291 based at least in part on second operator code 290 and first vehicle code 282. Second operator code 290 can be based at least in part on second operator code 268, and first vehicle code 282 can be based at least in part on first vehicle code 245.

In some implementations, the third-party computing system 107 can obtain intermediate result 291 (based at least in part on second operator code 290 (based at least in part on second vehicle code 247 (based at least in part on service code 289))) from the service entity computing system 109. Third-party computing system 107 can provide intermediate result 291 to the vehicle 30 (e.g., vehicle computing system 103) in response to obtaining it from the service entity computing system 109.

At (1105), the method 1100 includes obtaining an authentication result from the vehicle. For example, the service entity computing system 109 can obtain authentication result 292 based at least in part on intermediate result 291. Authentication result 292 can be associated with the authentication request, and the service entity computing system 109 can obtain authentication result 292 from the vehicle 30 (e.g., vehicle computing system 103). In some implementations, the service entity computing system 109 can provide intermediate result 291 to the vehicle 30 (e.g., vehicle computing system 103). Vehicle 30 (e.g., vehicle computing system 103) can be configured to determine authentication result 250 based at least in part on intermediate result 291, and to provide authentication result 250 to the service entity computing system 109. Service entity computing system 109 can obtain authentication result 292 (based at least in part on authentication result 250) from the vehicle 30 (e.g., vehicle computing system 103) in response to providing intermediate result 291 to the vehicle 30 (e.g., vehicle computing system 103). In some implementations, the service entity computing system 109 can provide authentication result 292 to the user device 105.

In some implementations, the third-party computing system 107 can obtain authentication result 250 from the vehicle 30 (e.g., vehicle computing system 103), and authentication result 250 can be based at least in part on intermediate result 291 and first vehicle code 245. Third-party computing system 107 can provide authentication result 250 to the service entity computing system 109.

Figure 12:
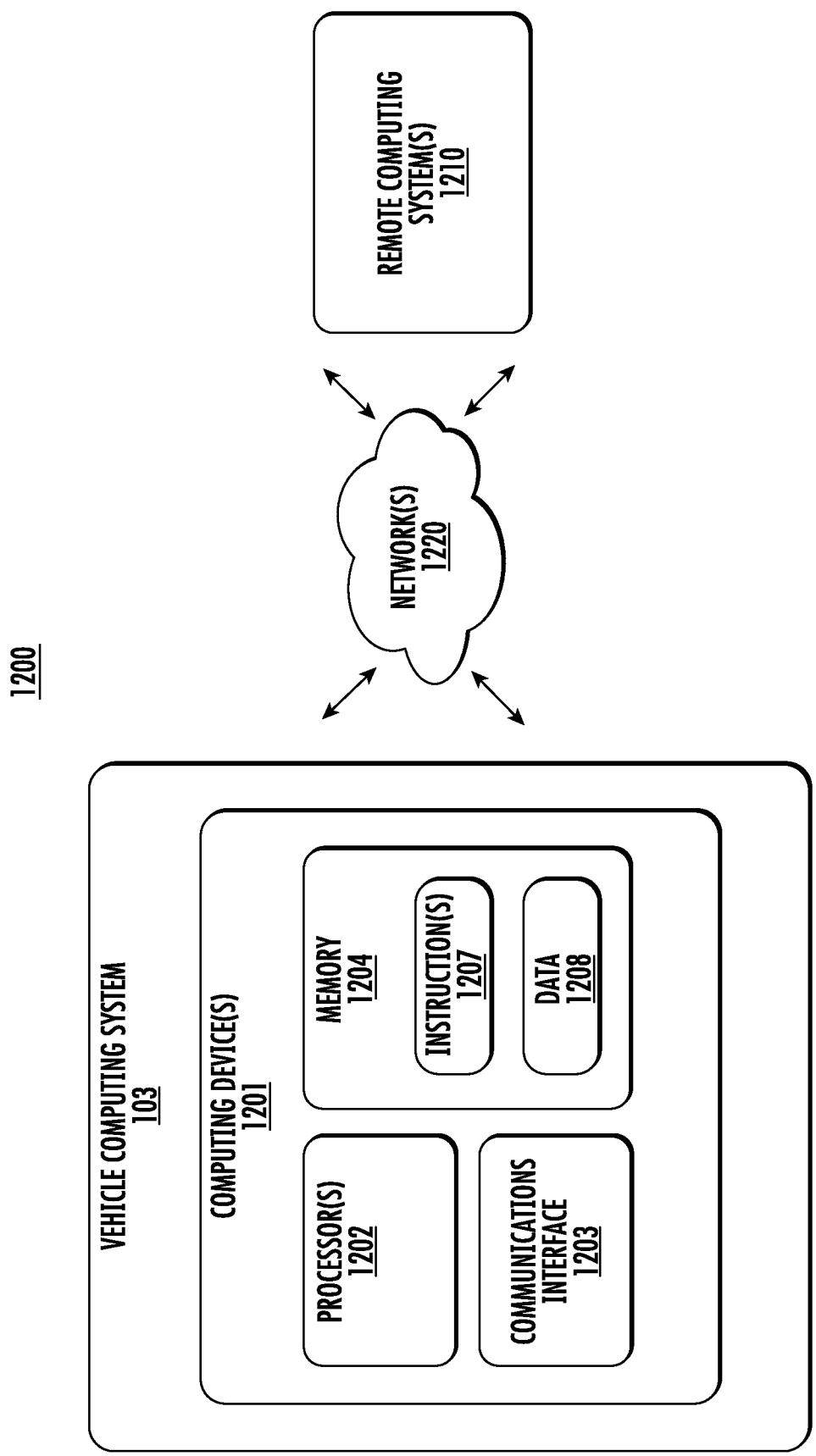
FIG. 12 depicts example system components according to example embodiments of the present disclosure.

FIG. 12 depicts an example computing system 1200 according to example embodiments of the present disclosure. The example system 1200 illustrated in FIG. 12 is provided as an example only. The components, systems, connections, and/or other aspects illustrated in FIG. 12 are optional and are provided as examples of what is possible, but not required, to implement the present disclosure. The example system 1200 can include vehicle computing system 103 of vehicle(s) 30 and, in some implementations, remote computing system(s) 1210 including one or more remote computing system(s) that are remote from vehicle(s) 30 that can be communicatively coupled to one another over one or more networks 1220. The remote computing system 1210 can be associated with a central operations system and/or an entity associated with the vehicle(s) 30 such as, for example, a fleet operator, service provider, etc.

The computing device(s) 1201 of the vehicle computing system 103 can include processor(s) 1202 and a memory 1204. The one or more processors 1202 can be any suitable processing device (e.g., a processor core, a microprocessor, an ASIC, a FPGA, a controller, a microcontroller, etc.) and can be one processor or a plurality of processors that are operatively connected. The memory 1204 can include one or more non-transitory computer-readable storage media, such as RAM, ROM, EEPROM, EPROM, one or more memory devices, flash memory devices, etc., and combinations thereof.

The memory 1204 can store information that can be accessed by the one or more processors 1202. For instance, the memory 1204 (e.g., one or more non-transitory computer-readable storage mediums, memory devices) on-board the vehicle(s) 30 can include computer-readable instructions 1206 that can be executed by the one or more processors 1202. The instructions 1206 can be software written in any suitable programming language or can be implemented in hardware. Additionally, or alternatively, the instructions 1206 can be executed in logically and/or virtually separate threads on processor(s) 1202.

For example, the memory 1204 on-board the vehicle(s) 30 can store instructions 1206 that when executed by the one or more processors 1202 on-board the vehicle(s) 30 cause the one or more processors 1202 (the vehicle computing system 103) to perform operations such as any of the operations and functions of the vehicle computing system 103, as described herein, one or more operations of methods 900-1100, and/or any other operations and functions of the vehicle computing system 103, as described herein.

The memory 1204 can store data 1208 that can be obtained, received, accessed, written, manipulated, created, and/or stored. The data 1208 can include, for instance, data associated with sensors, perception, prediction, motion plan, and/or other data/information as described herein. In some implementations, the computing device(s) 1201 can obtain data from one or more memory device(s) that are remote from the vehicle(s) 30.

The computing device(s) 1201 can also include a communication interface 1203 used to communicate with one or more other system(s) on-board the vehicle(s) 30 and/or a remote computing device that is remote from the vehicle(s) 30 (e.g., of remote computing system(s) 1210). The communication interface 1203 can include any circuits, components, software, etc. for communicating via one or more networks (e.g., 1220). In some implementations, the communication interface 1203 can include, for example, one or more of a communications controller, receiver, transceiver, transmitter, port, conductors, software, and/or hardware for communicating data.

The network(s) 1220 can be any type of network or combination of networks that allows for communication between devices. In some embodiments, the network(s) can include one or more of a local area network, wide area network, the Internet, secure network, cellular network, mesh network, peer-to-peer communication link, and/or some combination thereof, and can include any number of wired or wireless links. Communication over the network(s) 1220 can be accomplished, for instance, via a communication interface using any type of protocol, protection scheme, encoding, format, packaging, etc.

The remote computing system 1210 can include one or more remote computing devices that are remote from the vehicle computing system 103. The remote computing devices can include components (e.g., processor(s), memory, instructions, and data) similar to that described herein for the computing device(s) 1201. Moreover, the remote computing system(s) 1210 can be configured to perform one or more operations of the vehicle computing system 103, service entity computing system 109, third party computing system 107, user device, 105 and/or any other computing system, as described herein. Moreover, the computing systems of other vehicle(s) 30 described herein can include components similar to that of vehicle computing system 103.

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

The communications between computing systems described herein can occur directly between the systems or indirectly between the systems. For example, in some implementations, the computing systems can communicate via one or more intermediary computing systems. The intermediary computing systems may alter the communicated data in some manner before communicating it to another computing system.

The number and configuration of elements shown in the figures is not meant to be limiting. More or less of those elements and/or different configurations can be utilized in various embodiments.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method to authenticate a vehicle operator for an autonomous vehicle, the method comprising:

obtaining from a service entity computing system, by a computing system including one or more computing devices, a service code associated with an authentication request, wherein the service code is generated by the service entity computing system based at least in part on authentication request data including at least an operator identifier associated with the vehicle operator and a vehicle identifier associated with the autonomous vehicle, the authentication request data being provided to the service entity computing system from a user device;

determining, by the computing system, an autonomous vehicle based at least in part on the vehicle identifier; and providing, by the computing system, the service code to the autonomous vehicle, wherein the autonomous vehicle is configured to output the service code such that the service code can be entered into the user device, and wherein the user device is configured to provide the service code to the service entity computing system to authenticate the vehicle operator for the autonomous vehicle.

2. The computer-implemented method of claim 1, wherein the autonomous vehicle is configured to output the service code via an output device onboard the autonomous vehicle, and the user device is configured to obtain the service code from the autonomous vehicle via the output device.

3. The computer-implemented method of claim 1, wherein the authentication request data is obtained via a first communication pathway, and the service code is provided to the autonomous vehicle through a third-party computing system via a third communication pathway.

4. The computer-implemented method of claim 1, wherein the autonomous vehicle is configured to generate a second vehicle code based at least in part on the service code, and to output the second vehicle code via an output device onboard the autonomous vehicle.

5. The computer-implemented method of claim 4, wherein the user device is configured to generate a second operator code based at least in part on the second vehicle code generated by the autonomous vehicle.

6. The computer-implemented method of claim 1, further comprising:

obtaining, by the computing system from the autonomous vehicle, an authentication result for the vehicle operator; and providing, by the computing system, the authentication result to the service entity computing system.

7. The computer-implemented method of claim 6, wherein obtaining the authentication result comprises:

obtaining, by the computing system from the service entity computing system, an intermediate result based at least in part on the service code;

providing, by the computing system, the intermediate result to the autonomous vehicle, wherein the autonomous vehicle is configured to determine the authentication result based at least in part on the intermediate result; and obtaining, by the computing system, the authentication result from the autonomous vehicle in response to providing the intermediate result.

8. A computer-implemented method to authenticate a vehicle operator for an autonomous vehicle on a vehicle service platform, the method comprising:
- obtaining, by a computing system including one or more computing devices, a vehicle identifier associated with the autonomous vehicle and a first vehicle code associated with the autonomous vehicle;
- providing, by the computing system, the vehicle identifier and the first vehicle code to a service entity computing system, wherein a communication session associated with the service entity computing system is opened based at least in part on the vehicle identifier and the first vehicle code;
- obtaining, by the computing system from the service entity computing system, a service code, the service code based at least in part on the vehicle identifier, the first vehicle code, and operator data that is obtained by the service entity computing system during the open communication session;
- providing, by the computing system, the service code to the autonomous vehicle in response to Obtaining the service code from the service entity computing system;
- obtaining, by the computing system from the service entity computing system, an intermediate authentication result based at least in part on the service code;
- providing, by the computing system, the intermediate authentication result to the autonomous vehicle in response to obtaining the intermediate authentication result from the service entity computing system;
- obtaining, by the computing system from the autonomous vehicle, an authentication result for the vehicle operator based at least in part on the intermediate authentication result and the first vehicle code; and
- providing, by the computing system, the authentication result to the service entity computing system.

9. The computer-implemented method of claim 8, wherein obtaining the authentication result based at least in part on the intermediate authentication result comprises:
- providing, by the computing system, the intermediate authentication result to the autonomous vehicle, wherein the autonomous vehicle is configured to determine the authentication result based at least in part on the intermediate authentication result; and
- obtaining, by the computing system, the authentication result from the autonomous vehicle in response to providing the intermediate authentication result.

10. A non-transitory computer-readable medium comprising instructions thereon that, when executed by one or more processors, cause the one or more processors to perform operations comprising:
- obtaining from a service entity computing system, a service code associated with an authentication request, wherein the service code is generated by the service entity computing system based at least in part on authentication request data including at least an operator identifier associated with a vehicle operator for an autonomous vehicle and a vehicle identifier associated with the autonomous vehicle, the authentication request data being provided to the service entity computing system from a user device;
- determining an autonomous vehicle based at least in part on the vehicle identifier; and
- providing the service code to the autonomous vehicle, wherein the autonomous vehicle is configured to output the service code such that the service code can be entered into the user device, and wherein the user device is configured to provide the service code to the service entity, computing system to authenticate the vehicle operator for the autonomous vehicle.

11. The medium of claim 10, wherein the autonomous vehicle is configured to output the service code via an output device onboard the autonomous vehicle, and the user device is configured to obtain the service code from the autonomous vehicle via the output device.

12. The medium of claim 10, wherein the authentication request data is obtained via a first communication pathway, and the service code is provided to the autonomous vehicle through a third-party computing system via a third communication pathway.

13. The medium of claim 10, wherein the autonomous vehicle is configured to generate a second vehicle code based at least in part on the service code, and to output the second vehicle code via an output device onboard the autonomous vehicle.

14. The medium of claim 13, wherein the user device is configured to generate a second operator code based at least in part on the second vehicle code generated by the autonomous vehicle.

15. The medium of claim 10, the operations further comprising:
- obtaining, from the autonomous vehicle, an authentication result for the vehicle operator; and
- providing the authentication result to the service entity computing system.

16. The medium of claim 15, wherein obtaining the authentication result comprises:
- obtaining, from the service entity computing system, an intermediate result based at least in part on the service code;
- providing the intermediate result to the autonomous vehicle, wherein the autonomous vehicle is configured to determine the authentication result based at least in part on the intermediate result; and
- obtaining the authentication result from the autonomous vehicle in response to providing the intermediate result.

17. A computing system comprising one or more computing devices, the computing system being programmed to perform operations comprising:
- obtaining from a service entity computing system, a service code associated with an authentication request, wherein the service code is generated by the service entity computing system based at least in part on authentication request data including at least an operator identifier associated with a vehicle operator for an autonomous vehicle and a vehicle identifier associated with the autonomous vehicle, the authentication request data being provided to the service entity computing system from a user device;
- determining an autonomous vehicle based at least in part on the vehicle identifier; and
- providing the service code to the autonomous vehicle, wherein the autonomous vehicle is configured to output the service code such that the service code can be entered into the user device, and wherein the user device is configured to provide the service code to the service entity computing system to authenticate the vehicle operator for the autonomous vehicle.

18. The computing system of claim 17, wherein the autonomous vehicle is configured to output the service code via an output device onboard the autonomous vehicle, and the user device is configured to obtain the service code from the autonomous vehicle via the output device.

19. The computing system of claim 17, wherein the authentication request data and the operator data are obtained via a first communication pathway, and the service code is provided to the autonomous vehicle through a third-party computing system via a third communication pathway.

20. The computing system of claim 17, wherein the autonomous vehicle is configured to generate a second vehicle code based at least in part on the service code, and to output the second vehicle code via an output device onboard the autonomous vehicle.

* * * * *

UNITED STATES PATENT AND TRADEMARK OFFICE
CERTIFICATE OF CORRECTION

PATENT NO. : 11,580,207 B2
APPLICATION NO. : 16/660379
DATED : February 14, 2023
INVENTOR(S) : Yen et al.

Page 1 of 1

It is certified that error appears in the above-identified patent and that said Letters Patent is hereby corrected as shown below:

In the Claims

In Column 61, Line 21, in Claim 8, delete "Obtaining" and insert --obtaining-- therefor In Column 62, Line 1, in Claim 10, delete "entity," and insert --entity-- therefor Signed and Sealed this
Eighth Day of August, 2023

Katherine Kelly Vidal
*Director of the United States Patent and Trademark Office*